(12) United States Patent
Weeldreyer et al.

(10) Patent No.: US 8,766,928 B2
(45) Date of Patent: Jul. 1, 2014

(54) DEVICE, METHOD, AND GRAPHICAL USER INTERFACE FOR MANIPULATING USER INTERFACE OBJECTS

(75) Inventors: Christopher Douglas Weeldreyer, San Carlos, CA (US); Peter William Rapp, Pittsburgh, PA (US); Jason Robert Marr, Sunnyvale, CA (US); Akiva Dov Leffert, San Francisco, CA (US); Jay Christopher Capela, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 623 days.

(21) Appl. No.: 12/768,623

(22) Filed: Apr. 27, 2010

(65) Prior Publication Data
US 2011/0074710 A1  Mar. 31, 2011

Related U.S. Application Data

(60) Provisional application No. 61/277,603, filed on Sep. 25, 2009.

(51) Int. Cl.
G06F 3/048 (2013.01)
G06F 3/041 (2006.01)

(52) U.S. Cl.
USPC ............. 345/173; 715/808; 715/810

(58) Field of Classification Search
USPC ............. 345/156–184, 104; 715/863
See application file for complete search history.

(56) References Cited

U.S. PATENT DOCUMENTS 4,885,786 A 12/1989 Anderson et al.
5,283,561 A 2/1994 Lumelsky et al.
(Continued)

FOREIGN PATENT DOCUMENTS

EP 1 577 746 A2 9/2005
EP 1 840 717 A1 10/2007
(Continued)

OTHER PUBLICATIONS

Baudisch, P., "The Cage: Efficient Construction in 3D using a Cubic Adaptive Grid," Proceedings of the 9th Annual ACM Symposium on User Interface Software and Technology, Nov. 6, 1996, 2 pages.

(Continued)

Primary Examiner — Alexander Eisen
Assistant Examiner — Patrick F Marinelli
(74) Attorney, Agent, or Firm — Morrison & Foerster LLP

(57) ABSTRACT

A method is performed at a multifunction device with a display and a touch-sensitive surface. The method includes: displaying a first user interface for an application at a first magnification level. The first user interface includes a first plurality of user interface objects. The application has a range of magnification levels, including a predefined magnification level for requesting a second user interface with a multi-finger pinch gesture. The method also includes: detecting a first multi-finger pinch gesture on the touch-sensitive surface; and, in response: when the first magnification level is the predefined magnification level, displaying the second user interface simultaneously with the first user interface, wherein the second user interface includes a second plurality of user interface objects that are distinct from the first plurality of user interface objects in the first user interface; and when the first magnification level is greater than the predefined magnification level, zooming out the first user interface in accordance with the first multi-finger pinch gesture.

25 Claims, 55 Drawing Sheets

(56) References Cited

U.S. PATENT DOCUMENTS

| | | |
|---|---|---|
| 5,327,161 A | 7/1994 | Logan et al. |
| 5,359,703 A | 10/1994 | Robertson et al. |
| 5,371,845 A | 12/1994 | Newell et al. |
| 5,483,261 A | 1/1996 | Yasutake |
| 5,490,241 A | 2/1996 | Mallgren et al. |
| 5,511,148 A | 4/1996 | Wellner |
| 5,533,183 A | 7/1996 | Henderson, Jr. et al. |
| 5,581,670 A | 12/1996 | Bier et al. |
| 5,675,753 A | 10/1997 | Hansen et al. |
| 5,729,673 A | 3/1998 | Cooper et al. |
| 5,808,601 A | 9/1998 | Leah et al. |
| 5,825,352 A | 10/1998 | Bisset et al. |
| 5,872,559 A | 2/1999 | Shieh |
| 5,880,743 A | 3/1999 | Moran et al. |
| 5,910,800 A | 6/1999 | Shields et al. |
| 6,025,844 A | 2/2000 | Parsons |
| 6,065,021 A | 5/2000 | George |
| 6,073,036 A | 6/2000 | Heikkinen et al. |
| 6,075,531 A | 6/2000 | DeStefano |
| 6,175,364 B1 | 1/2001 | Wong et al. |
| 6,208,329 B1 | 3/2001 | Ballare |
| 6,215,490 B1 | 4/2001 | Kaply |
| 6,253,218 B1 | 6/2001 | Aoki et al. |
| 6,278,443 B1 | 8/2001 | Amro et al. |
| 6,323,846 B1 | 11/2001 | Westerman et al. |
| 6,346,935 B1 | 2/2002 | Nakajima et al. |
| 6,392,673 B1 | 5/2002 | Andrew et al. |
| 6,480,813 B1 | 11/2002 | Bloomquist et al. |
| 6,565,608 B1* | 5/2003 | Fein et al. ............. 715/255 |
| 6,570,557 B1 | 5/2003 | Westerman et al. |
| 6,646,655 B1 | 11/2003 | Brandt et al. |
| 6,657,615 B2 | 12/2003 | Harada |
| 6,677,932 B1 | 1/2004 | Westerman |
| 6,686,935 B1 | 2/2004 | Richard |
| 6,690,365 B2 | 2/2004 | Hinckley et al. |
| 6,807,361 B1* | 10/2004 | Girgensohn et al. ......... 386/227 |
| 6,888,536 B2 | 5/2005 | Westerman et al. |
| 6,903,751 B2 | 6/2005 | Saund et al. |
| 6,928,619 B2 | 8/2005 | Clow et al. |
| 7,030,861 B1 | 4/2006 | Westerman et al. |
| 7,093,192 B2 | 8/2006 | Mullen et al. |
| 7,110,005 B2 | 9/2006 | Arvin et al. |
| 7,134,093 B2 | 11/2006 | Etgen et al. |
| 7,158,158 B1 | 1/2007 | Fleming et al. |
| 7,190,379 B2 | 3/2007 | Nissen |
| 7,216,293 B2 | 5/2007 | Kataoka et al. |
| 7,218,226 B2 | 5/2007 | Wehrenberg |
| 7,287,241 B2 | 10/2007 | Balsiger |
| 7,454,717 B2 | 11/2008 | Hinckley et al. |
| 7,456,823 B2 | 11/2008 | Poupyrev et al. |
| 7,469,381 B2 | 12/2008 | Ording |
| 7,469,833 B1 | 12/2008 | Kelley et al. |
| 7,477,233 B2 | 1/2009 | Duncan et al. |
| 7,489,324 B2 | 2/2009 | Royal et al. |
| 7,555,710 B2 | 6/2009 | Kobashi et al. |
| 7,557,797 B2* | 7/2009 | Ludwig ............ 345/163 |
| 7,614,008 B2 | 11/2009 | Ording |
| 7,619,618 B2 | 11/2009 | Westerman et al. |
| 7,633,076 B2 | 12/2009 | Huppi et al. |
| 7,634,725 B2 | 12/2009 | Nishikawa |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,688,306 B2 | 3/2010 | Wehrenberg et al. |
| 7,694,231 B2 | 4/2010 | Kocienda et al. |
| 7,705,830 B2 | 4/2010 | Westerman et al. |
| 7,728,823 B2 | 6/2010 | Lyon et al. |
| 7,743,348 B2 | 6/2010 | Robbins et al. |
| 7,812,826 B2 | 10/2010 | Ording et al. |
| 7,856,605 B2 | 12/2010 | Ording et al. |
| 7,904,810 B2 | 3/2011 | Chen et al. |
| 7,934,156 B2 | 4/2011 | Forstall et al. |
| 7,936,341 B2 | 5/2011 | Weiss |
| 7,956,847 B2 | 6/2011 | Christie |
| 8,023,158 B2 | 9/2011 | Maki et al. |
| 8,024,667 B2 | 9/2011 | Shaw et al. |
| 8,095,884 B2 | 1/2012 | Karunakaran et al. |
| 8,161,400 B2 | 4/2012 | Kwon |
| 8,171,401 B2 | 5/2012 | Sun |
| 8,171,431 B2* | 5/2012 | Grossman et al. ............. 715/863 |
| 8,176,435 B1* | 5/2012 | Jitkoff et al. ................... 715/788 |
| 8,176,438 B2* | 5/2012 | Zaman et al. ................. 715/815 |
| 8,209,630 B2 | 6/2012 | Thimbleby et al. |
| 8,276,085 B2 | 9/2012 | Sherwani |
| 8,291,349 B1* | 10/2012 | Park et al. ...................... 715/863 |
| 8,291,350 B1* | 10/2012 | Park et al. ...................... 715/863 |
| 8,312,387 B2 | 11/2012 | Williams et al. |
| 2002/0015024 A1 | 2/2002 | Westerman et al. |
| 2002/0018075 A1 | 2/2002 | Maulik et al. |
| 2002/0057292 A1 | 5/2002 | Holtz |
| 2002/0062321 A1 | 5/2002 | Shibata |
| 2002/0109668 A1 | 8/2002 | Rosenberg et al. |
| 2002/0109708 A1 | 8/2002 | Peurach et al. |
| 2002/0161772 A1 | 10/2002 | Bergelson et al. |
| 2003/0014382 A1 | 1/2003 | Iwamoto et al. |
| 2003/0128192 A1 | 7/2003 | van Os |
| 2003/0142137 A1 | 7/2003 | Brown et al. |
| 2003/0210268 A1 | 11/2003 | Kataoka et al. |
| 2004/0066407 A1 | 4/2004 | Regan et al. |
| 2004/0088656 A1 | 5/2004 | Washio |
| 2004/0141009 A1 | 7/2004 | Hinckley et al. |
| 2004/0150668 A1 | 8/2004 | Myers et al. |
| 2004/0174399 A1 | 9/2004 | Wu et al. |
| 2004/0225968 A1 | 11/2004 | Look et al. |
| 2004/0239691 A1 | 12/2004 | Sprang et al. |
| 2005/0052427 A1 | 3/2005 | Wu et al. |
| 2005/0068290 A1 | 3/2005 | Jaeger |
| 2005/0071774 A1 | 3/2005 | Lipsky et al. |
| 2005/0088423 A1 | 4/2005 | Keely et al. |
| 2005/0091008 A1 | 4/2005 | Green et al. |
| 2005/0108620 A1 | 5/2005 | Allyn |
| 2005/0108656 A1 | 5/2005 | Wu et al. |
| 2005/0231512 A1 | 10/2005 | Niles et al. |
| 2005/0289476 A1 | 12/2005 | Tokkonen |
| 2006/0001650 A1* | 1/2006 | Robbins et al. ................. 345/173 |
| 2006/0022955 A1 | 2/2006 | Kennedy |
| 2006/0026521 A1* | 2/2006 | Hotelling et al. ............. 715/702 |
| 2006/0033724 A1 | 2/2006 | Chaudhri et al. |
| 2006/0055662 A1 | 3/2006 | Rimas-Ribikauskas et al. |
| 2006/0055684 A1 | 3/2006 | Rimas-Ribikauskas et al. |
| 2006/0085757 A1 | 4/2006 | Andre et al. |
| 2006/0085767 A1 | 4/2006 | Hinckley et al. |
| 2006/0112335 A1 | 5/2006 | Hofmeister et al. |
| 2006/0125803 A1 | 6/2006 | Westerman et al. |
| 2006/0129945 A1 | 6/2006 | Dettinger et al. |
| 2006/0136246 A1 | 6/2006 | Tu |
| 2006/0136833 A1 | 6/2006 | Dettinger et al. |
| 2006/0161870 A1 | 7/2006 | Hotelling et al. |
| 2006/0174568 A1 | 8/2006 | Kinoshita et al. |
| 2006/0184966 A1 | 8/2006 | Hunleth et al. |
| 2006/0190833 A1 | 8/2006 | SanGiovanni et al. |
| 2006/0197750 A1 | 9/2006 | Kerr et al. |
| 2006/0197753 A1 | 9/2006 | Hotelling |
| 2006/0238517 A1 | 10/2006 | King et al. |
| 2006/0238521 A1 | 10/2006 | Westerman et al. |
| 2006/0248469 A1 | 11/2006 | Czerwinski et al. |
| 2006/0279532 A1 | 12/2006 | Olszewski et al. |
| 2007/0050726 A1 | 3/2007 | Wakai et al. |
| 2007/0067711 A1 | 3/2007 | Woodall et al. |
| 2007/0079236 A1 | 4/2007 | Schrier et al. |
| 2007/0113198 A1 | 5/2007 | Robertson et al. |
| 2007/0126732 A1 | 6/2007 | Robertson et al. |
| 2007/0152980 A1 | 7/2007 | Kocienda et al. |
| 2007/0152984 A1* | 7/2007 | Ording et al. .................. 345/173 |
| 2007/0160345 A1 | 7/2007 | Sakai et al. |
| 2007/0177803 A1 | 8/2007 | Elias et al. |
| 2007/0186178 A1 | 8/2007 | Schiller |
| 2007/0192744 A1 | 8/2007 | Reponen |
| 2007/0192749 A1 | 8/2007 | Baudisch |
| 2007/0198942 A1 | 8/2007 | Morris |
| 2007/0220444 A1* | 9/2007 | Sunday et al. ................. 715/788 |
| 2007/0229471 A1 | 10/2007 | Kim et al. |
| 2007/0236475 A1 | 10/2007 | Wherry |
| 2007/0245257 A1 | 10/2007 | Chan et al. |

(56) References Cited

U.S. PATENT DOCUMENTS

| | | |
|---|---|---|
| 2007/0247435 A1 | 10/2007 | Benko et al. |
| 2007/0253025 A1 | 11/2007 | Terayoko |
| 2007/0257890 A1 | 11/2007 | Hotelling |
| 2008/0022197 A1 | 1/2008 | Bargeron et al. |
| 2008/0034317 A1 | 2/2008 | Fard et al. |
| 2008/0036743 A1 | 2/2008 | Westerman et al. |
| 2008/0042978 A1* | 2/2008 | Perez-Noguera ............. 345/168 |
| 2008/0052945 A1 | 3/2008 | Matas et al. |
| 2008/0066016 A1 | 3/2008 | Dowdy et al. |
| 2008/0072173 A1 | 3/2008 | Brunner et al. |
| 2008/0094368 A1 | 4/2008 | Ording et al. |
| 2008/0100642 A1* | 5/2008 | Betancourt et al. .......... 345/663 |
| 2008/0109751 A1 | 5/2008 | Fitzmaurice et al. |
| 2008/0140868 A1 | 6/2008 | Kalayjian et al. |
| 2008/0147664 A1 | 6/2008 | Fujiwara et al. |
| 2008/0148181 A1 | 6/2008 | Reyes et al. |
| 2008/0150715 A1 | 6/2008 | Tang et al. |
| 2008/0165141 A1 | 7/2008 | Christie |
| 2008/0165142 A1 | 7/2008 | Kocienda et al. |
| 2008/0167834 A1 | 7/2008 | Herz et al. |
| 2008/0180404 A1 | 7/2008 | Han et al. |
| 2008/0180405 A1 | 7/2008 | Han et al. |
| 2008/0180406 A1 | 7/2008 | Han et al. |
| 2008/0186285 A1* | 8/2008 | Shimizu ........................ 345/173 |
| 2008/0211766 A1 | 9/2008 | Westerman et al. |
| 2008/0244410 A1 | 10/2008 | Schormann |
| 2008/0259040 A1 | 10/2008 | Ording et al. |
| 2008/0267468 A1 | 10/2008 | Geiger et al. |
| 2008/0270886 A1 | 10/2008 | Gossweiler et al. |
| 2008/0278455 A1 | 11/2008 | Atkins et al. |
| 2008/0284799 A1 | 11/2008 | Hollemans et al. |
| 2008/0297482 A1 | 12/2008 | Weiss |
| 2008/0303786 A1 | 12/2008 | Nakamura et al. |
| 2008/0309632 A1* | 12/2008 | Westerman et al. .......... 345/173 |
| 2008/0320391 A1 | 12/2008 | Lemay et al. |
| 2009/0013350 A1 | 1/2009 | Ohlfs et al. |
| 2009/0051660 A1 | 2/2009 | Feland, III et al. |
| 2009/0051946 A1 | 2/2009 | Hibi |
| 2009/0079700 A1 | 3/2009 | Abernathy |
| 2009/0113330 A1 | 4/2009 | Garrison et al. |
| 2009/0122018 A1 | 5/2009 | Vymenets et al. |
| 2009/0150775 A1 | 6/2009 | Miyazaki et al. |
| 2009/0158326 A1 | 6/2009 | Hunt et al. |
| 2009/0164936 A1 | 6/2009 | Kawaguchi |
| 2009/0172606 A1 | 7/2009 | Dunn et al. |
| 2009/0174679 A1 | 7/2009 | Westerman |
| 2009/0183930 A1 | 7/2009 | Yang et al. |
| 2009/0184939 A1 | 7/2009 | Wohlstadter et al. |
| 2009/0228792 A1 | 9/2009 | van Os et al. |
| 2009/0231275 A1 | 9/2009 | Odgers |
| 2009/0237363 A1 | 9/2009 | Levy et al. |
| 2009/0239587 A1* | 9/2009 | Negron et al. ................. 455/566 |
| 2009/0256809 A1 | 10/2009 | Minor |
| 2009/0256857 A1 | 10/2009 | Davidson et al. |
| 2009/0259964 A1 | 10/2009 | Davidson et al. |
| 2009/0282332 A1 | 11/2009 | Porat |
| 2009/0303231 A1 | 12/2009 | Robinet et al. |
| 2009/0307589 A1 | 12/2009 | Inose et al. |
| 2009/0309881 A1 | 12/2009 | Zhao et al. |
| 2009/0327975 A1 | 12/2009 | Stedman |
| 2010/0002002 A1 | 1/2010 | Lipsky et al. |
| 2010/0007623 A1 | 1/2010 | Kaneko et al. |
| 2010/0017734 A1 | 1/2010 | Cummins et al. |
| 2010/0031203 A1 | 2/2010 | Morris et al. |
| 2010/0053111 A1 | 3/2010 | Karlsson |
| 2010/0058238 A1 | 3/2010 | Ben Moshe |
| 2010/0088624 A1 | 4/2010 | Bligh et al. |
| 2010/0088641 A1 | 4/2010 | Choi |
| 2010/0090971 A1 | 4/2010 | Choi et al. |
| 2010/0095205 A1 | 4/2010 | Kinoshita |
| 2010/0095206 A1 | 4/2010 | Kim |
| 2010/0107101 A1 | 4/2010 | Shaw et al. |
| 2010/0134425 A1 | 6/2010 | Storrusten |
| 2010/0146436 A1* | 6/2010 | Jakobson et al. ............. 715/800 |
| 2010/0156813 A1 | 6/2010 | Duarte et al. |
| 2010/0162105 A1 | 6/2010 | Beebe et al. |
| 2010/0185949 A1 | 7/2010 | Jaeger |
| 2010/0214571 A1 | 8/2010 | Luo |
| 2010/0218100 A1 | 8/2010 | Simon et al. |
| 2010/0228746 A1 | 9/2010 | Harada |
| 2010/0231533 A1 | 9/2010 | Chaudhri |
| 2010/0235794 A1 | 9/2010 | Ording |
| 2010/0283743 A1* | 11/2010 | Coddington ................. 345/173 |
| 2010/0283750 A1 | 11/2010 | Kang et al. |
| 2010/0302176 A1 | 12/2010 | Nikula et al. |
| 2010/0313125 A1 | 12/2010 | Fleizach et al. |
| 2010/0313126 A1 | 12/2010 | Jung et al. |
| 2010/0318904 A1 | 12/2010 | Hillis et al. |
| 2010/0325529 A1 | 12/2010 | Sun |
| 2010/0333044 A1 | 12/2010 | Kethireddy |
| 2011/0004830 A1* | 1/2011 | Von Kaenel et al. .......... 715/751 |
| 2011/0010672 A1 | 1/2011 | Hope |
| 2011/0012848 A1* | 1/2011 | Li et al. ........................ 345/173 |
| 2011/0012856 A1 | 1/2011 | Maxwell et al. |
| 2011/0029927 A1 | 2/2011 | Lietzke et al. |
| 2011/0029934 A1 | 2/2011 | Locker et al. |
| 2011/0069017 A1 | 3/2011 | Victor |
| 2011/0069018 A1 | 3/2011 | Atkins et al. |
| 2011/0074710 A1 | 3/2011 | Weeldreyer et al. |
| 2011/0093812 A1 | 4/2011 | Fong |
| 2011/0109581 A1 | 5/2011 | Ozawa et al. |
| 2011/0128367 A1 | 6/2011 | Yoshioka et al. |
| 2011/0145759 A1 | 6/2011 | Leffert et al. |
| 2011/0163944 A1 | 7/2011 | Bilbrey et al. |
| 2011/0163968 A1 | 7/2011 | Hogan |
| 2011/0179368 A1 | 7/2011 | King et al. |
| 2011/0179373 A1 | 7/2011 | Moore et al. |
| 2011/0185316 A1 | 7/2011 | Reid et al. |
| 2011/0185321 A1 | 7/2011 | Capela et al. |
| 2011/0209104 A1 | 8/2011 | Hinckley et al. |
| 2011/0231796 A1 | 9/2011 | Vigil |
| 2011/0252370 A1 | 10/2011 | Chaudhri |
| 2011/0252380 A1 | 10/2011 | Chaudhri |
| 2011/0252381 A1 | 10/2011 | Chaudhri |
| 2011/0258537 A1 | 10/2011 | Rives et al. |
| 2011/0302519 A1 | 12/2011 | Fleizach et al. |
| 2012/0023453 A1 | 1/2012 | Wagner |
| 2012/0023459 A1 | 1/2012 | Westerman |
| 2012/0030569 A1 | 2/2012 | Migos et al. |
| 2012/0044150 A1 | 2/2012 | Karpin et al. |

FOREIGN PATENT DOCUMENTS

| | | | |
|---|---|---|---|
| EP | 2 060 970 A1 | 5/2009 | |
| EP | 2 068 237 A2 | 6/2009 | |
| EP | 2 284 676 A2 | 2/2011 | |
| WO | WO 00/16186 A2 | 3/2000 | |
| WO | WO 2006/020305 A2 | 2/2006 | |
| WO | WO 2007/098243 A2 | 8/2007 | |
| WO | WO 2008/138046 A1 | 11/2008 | |

OTHER PUBLICATIONS

Hudson, S., "Adaptive Semantic Snapping—A technique for Semantic Feedback at the Lexical Level," Proceedings of the ACM CHI 90 Human Factors in Computing Systems Conference Apr. 1990, Seattle, Washington, 6 pages.

Karsenty et al., "Inferring Graphical Constraints with Rockit," Digital-Paris Research Laboratory, Mar. 1992, www.hpl.hp.com/techreports/Compaq-DEC/PRL-RR-17.pdf, 30 pages.

Mueller et al., "Visio 2007 for Dummies," John Wiley & Sons, Dec. 2006, pp. 178-181.

Angell, "Is Bimanual the Future Paradigm for Human Computer Interaction?" University of Plymouth, 2006, 36 pages.

Apple.com, "Pages Keyboard Shortcuts," Apple.com, downloaded Jan. 18, 2010, http://www.apple.com/support/pages/shortcuts/, 6 pages.

Apted et al., "Tabletop Sharing of Digital Photographs for the Elderly," CHI 2006 Proceedings, Apr. 2006, Montreal, Quebec, Canada, 10 pages.

(56) References Cited

OTHER PUBLICATIONS

Beaudouin-Lafon et al., "CPN/Tools: A Post-WIMP Interface for Editing and Simulating Coloured Petri Nets," Proceeding of 22nd International Conference on Applications and Theory of Petri Nets 2001, 10 pages.
Bederson, B., "PhotoMesa: A Zoomable Image Browser Using Quantum Treemaps and Bubblemaps," UIST 2001, Orlando, Florida, Nov. 2001, 10 pages.
Benko et al., "Precise Selection Techniques for Multi-Touch Screens," CHI 2006, Apr. 22-27, 2006, 10 pages.
Brandi, et al., "Combining and Measuring the Benefits of Bimanual Pen and Direct-Touch Interation on Horizontal Interfaces," AVI '08, May 2008, Naples, Italy, 8 pages.
Brandl, P. "Combining and Measuring the Benefits of Bimanual Pen and Direct-Touch Interaction on Horizontal Interfaces," Media Interaction Lab, May 2008, slide presentation, 26 pages.
Butz et al., "Hybrid Widgets on an interactive Tabletop," Ubicomp '07, Sep. 2007, Innsbruck, Austria, 7 pages.
Buxton, W. et al., "A Study in Two-Handed Input," Proceedings of CHI '86, Apr. 1986, Boston, MA, 10 pages.
Buxton, W, et al., "Issues and Techniques in Touch-Sensitive Tablet Input," Computer Graphics 19(3), http://www.dgp.toronto.edu/OTP/papers/bill.buxton/touch.html, Proceedings of SIGGRAPH'85, 15 pages.
Buxton, W. et al., "Multi-Touch Systems that I Have Known and Loved," Jan. 12, 2007, 14 pages, http://www.billbuxton.com/multitouchOverview.html.
Buxton, W., "Chapter 5: Case Study 1: Touch Tablets," Haptic Input, Jan. 4, 2009, 20 pages.
Buxton, W., "Chapter 11: Two-Handed Input in Human-Computer Interaction," Aug. 22, 2008, 16 pages.
Chen et al., "Relative role of merging and two-handed operation on command selection speed," Int. J. Human-Computer Studies 66 (2008) 729-740 (12), Jun. 2008.
Cho et al,, "Interaction for Tabletop Computing Environment: An Analysis and Implementation," Science and Technology (2005), ACM, pp. 11-18.
Couturier et ai., "Pointing Fingers: Using Multiple Direct Interactions with Visual Objects to Perform Music," Proceedings of the 2003 Conference on New Interfaces for Musical Expression, May 2003, Montreal, Canada, 4 pages.
Cutedraw, "Moving, Rotating, Resizing and Flipping Shapes," Cutedraw.com, 2007, http://www.cutedraw.com/Moving,%20Rotating,%20Resizing%20Flipping%20Shapes.php, 5 pages.
Derene, G., "Microsoft Surface: Behind-the-Scenes First Look," Popular Mechanics.com, Jul. 1, 2007, http://www.popularmechanics.com/technology/gadgets/news/4217348?page=3, 4 pages.
Faas, R., "Spaces: A look at Apple's take on virtual desktops in Leopard," Computerworig, Nov. 21, 2006, http://www.computerworld.com/s/article/print/9005267/Spaces_A_Ico...tual_desktops_in_Leoparad?taxonomyName..., 3 pages.
FingerWorks, "Installation and Operation Guide for the TouchStream," Copyright© 2002, 14 pages, www.fingerworks.com.
FingerWorks, "Quick Reference Guide for iGesture Products," Copyright© 1999-2002,4 pages, www.fingerworks.com.
FingerWorks, "QuickReference Guide for TouchStrearn ST/LP," Copyright© 2001-2003, 4 pages, www.fingerworks.com.
FingerWorks, "Installation and Operation Guide for Igesture Products w/Keys," Copyright© 2002, 10 pages, www.fingerworks.com.
FingerWorks "TouchStream LP Silver," Apr. 27, 2005, 18 pages, http://www.fingerworks.com.
FingerWorks Forums, "Finger works Support Forums—Product Comments—TouchStream KeyBoards—Is the Multitouch Lemur," Dec. 24, 2004, http://64233.167.104/search?q=cache:sjVdtyFBvRMJ:forums.finger, 2 pages.
Google docs, "Drawings: Moving, resizing and rotating objects," Google.com, downloaded Jan. 18, 2010, http://docs.google.com/support/bin/answer.py?hl=en&answer=141914, 1 pages.

Guimbretière, et al. "Benefits of Merging Command Selection and Direct Manipulation," ACM Transaction on Computer-Human Interaction, vol. 12, No. 3, Sep. 2005, 17 pages.
Guimbretière, F., "Curriculum Vitae," 2008, 5 pages.
Hinckley, K., "Haptic Issues for Virtual Manipulation," University of Virginia, Dissertation presented Dec. 1996, http://research.microsoft.com/en-us/um/people/kenh/all-published-papers/hinckley-thesis-haptic-issues-for-virtual-manipulation.pdf, 216 pages.
Hinckley et al., "Interaction and Modeling Techniques for Desktop Two-Handed Input," UIST '98, San Francisco, CA, Nov. 1998, 10 pages.
Hodges et al., "ThinSight: Versatile Multi-touch Sensing for Thin Form-factor Displays," UIST'07, Oct. 7-10, 2007, Newport, Rhode Island, USA, 10 pages.
IBM, "Resizing shapes by dragging sizing handles," IBM WebSphere Help System, 1999, http://publib.boulder.ibm.com/infocenter/wsadhelp/v5r1m2/index.jsp?topic=/com.rational.xtools.umivisualizer.doc/topics/tresizedrag.html, 1 pages.
Inkscape, "Inkscape tutorial: Basic," Inkscape.org, Apr. 20, 2005, http://web.archive.org/web/20051225021958/http://inkscape.org/doc/basic/tutorial-basic.html, 6 pages.
Jin et al, "GIA: design of a gesture-based Interaction photo album," Pers Ubiquit Comput, Jul. 1, 2004, 7 pages.
Kane et al., "Slide Rule: Making Mobile Touch Screens Accessible to Blind People Using Multi-Touch Interaction Techniques," Proceedings of ACM SIGACCESS Conference on Computers and Accessibility, Halifax, Nova Scotia, Canada, Oct. 2008, 8 pages.
Kristensson et al., "InfoTouch: An Explorative Multi-Touch Visualization Interface for Tagged Photo Collections," Proceedings NordiCHI 2008, Oct. 20-22, 2008, 4 pages.
Kurata et al,, "Tangible Tabletop Interface for an Expert to Collaborate with Remote Field Workers," CollabTech2005, Jul. 16, 2005, slides, 27 pages.
Kurata et al., "Tangible Tabletop Interface for an Expert to Collaborate with Remote Field Workers," CollabTech2005, Jul. 16, 2005, 6 pages.
Kurtenback et al., The Design of a GUI Paradigm based on Tablets, Two hands, and Transparency, Mar. 27, 1997, 8 pages.
Lee et al., "A Multi-Touch Three Dimensional Touch-Sensitive Tablet," CHI 85 Proceedings, Apr. 1985, pp. 21-25.
Malik, S. et al, "Visual Touchpad: A Two-handed Gestural Input Device," ICMI'04, Oct. 13-15, 2004, 8 pages.
Markandtanya, "Imagng multi-touch in outlook," May 2008, 3 pages.
Markusson, D., "Interface Development of a Multi-Touch Photo Browser," Umeá University, Master's Thesis presented Apr. 18, 2008, 76 pages.
Matsushita et al., "Dual Touch: A Two-Handed interface for Pen-Based PDSs," UIST '00, Nov. 2000, San Diego, Caiifornia, 2 pages.
Matsushita et al., "HoloWall: Designing a Finger, Hand, Body, and Object Sensitive Wall," UIST'97 Banff, Alberta, Canada; Oct. 1997, 2 pages.
Media Interaction Lab, "Bimanual Pen & Touch," Nov. 2008, http://mi-lab.org/projects/bimanual-pen-touch, 5 pages.
Microsoft.com, "Quickly copy formatting with the Format Painter," Microsoft.com, 2003, http://office.microsoft.com/enus/help/HA012176101033.asx, 1 page.
Microsoft.com, "Resize an object," Microsoft Office Online, 2010, http://office.microsoft.com/en-us/publisher/HP051139751033.aspx, 2 pages.
Moscovich et al., "Indirect Mappings of Multi-touch Input Using One and Two Hands," CHI 2008, Apr. 2008, Florence, Italy, 9 pages.
Moscovich et al., "Multi-finger Cursor Techniques," GI '06 Proceedings of Graphics Interface 2006, Jun. 2006, Quebec City, Quebec, Canada, 7 pages.
Moscovich, T., "Multi-touch Interaction" CHI 2006, Montréal, Canada, Apr. 2006, 4 pages.
Moscovich, T., "Principles and Applications of Multi-touch Interaction," Brown University, Dissertation presented May 2007, 114 pages.

(56) References Cited

OTHER PUBLICATIONS

Murphy, P., "Review: SBSH Calendar Touch," justanothermobilemonday.com, Dec. 8, 2008, http://justanothermobilemonday.com/Wordpress/2008/12/08/review-sbsh-calendar-touch/, 7 pages.

Raskin, A. "Enso 2.0 Design Thoughts," Aza's Thoughts, Dec. 6, 2008, http://www.azarask.in/blog/post/enso-20-design-thoughts/, 16 pages.

Raskin, A., "Visual Feedback;Why Modes Kill," Humanized, Dec. 2006, 18 pages.

Sahlin et al., "Flash® CS4 All-in-One for Durnmies®," Dec. 3, 2008, John Wiley & Sons, 4 pages.

Shen, C., "Interactive tabletops: User Interface, Metaphors and Gestures," SIGGRAPH2007, Aug. 2007, 14 pages.

Shen et al., "Informing the Design of Direct-Touch Tabletops," IEEE Sep./Oct. 2006, pp. 36-46.

Tse et al., "Enabling Interaction with Single User ApplicatIons through Speech and Gestures on a Multi-User Tabletop," Mitsubishi Electric Research Laboratories, Dec. 2005, 9 pages.

Ullmer et al., "The metaDESK: Models and Prototypes for Tangible User Interfaces," UIST '97, Oct. 1997, Banff, Alberta, Canada, 10 pages.

Westerman, W., "Hand Tracking Finger Identification and Chordic Manipulation on a Multi-touch Surface," Doctoral Dissertation, submitted Spring 1999, 363 pages.

Wikipedia, "Spaces (software)," Wikipedia, the free encyclopedia, Jul. 15, 2009, http://en.wikipedia.org/wiki/Spaces_(software) 3 pages.

Wikipedia, "Virtual desktop," Wikipedia, the free encyclopedia, Jul. 20, 2009, http://en.wikipedia.org/wiki/Virtual_desktop, 3 pages.

Wilson, A., "Robust Computer Vision-Based Detection of Pinching for One and Two-Handed Gesture Input" UIST '06, Oct. 2006, Montreux, Switzerland, 4 pages.

Wu, et al., "Multi-Finger and Whole Hand Gestural Interaction Techniques for Multi-User Tabletop Displays," UIST '03, Nov. 5-7, 2003, Vancouver, BC, Canada, © ACM 2003, 10 pages.

Yee, K., "Two-Handed Interaction on a Tablet Display," SIGCHI 2004, Apr. 2004, Vienna, Austria, 4 pages.

YouTube, "A Multi-Touch Three Dimensional Touch-Sensitive Tablet," 3 minute video uploaded to YouTube by wasbuxton on Nov. 18, 2009, http//www.youtube.com/watch?v=Arrus9CxUiA, 3 pages.

YouTube, "3d desktop," 6:50 minute video uploaded to YouTube by frankcde on Sep. 18, 2006, http://www.youtube.com/watch?v=j_lxBwvf3Vk&feature=related, 2 pages.

YouTube, "Auto Design on Jeff Han's Perceptive Pixel Multi-Touch," 2:11 minute video uploaded to YouTube by AutodeskLabs on Jul. 27, 2007, http://www.youtube.com/watch?v=O7ENumwMohs&feature=related, 2 pages.

YouTube, "Cubit—Open Source Multi-touch Display," 5:04 minute video uploaded to YouTube by Krisharava on May 2, 2008, http://www.youtube.com/watch?v=RJTULGnZQ0, 3 pages.

YouTube, "Gesture Registration, Relaxation, and Reuse for Multi-Point," 4:22 minute video uploaded to YouTube by tabletopresearch201 on May 19, 2008, http://www.youtube.com/watch?v=dT4dXuah2yM, 2 pages.

YouTube, "HP TouchSmart tx2—Multi-Touch Part 2," 0:15 minute video uploaded to YouTube by unwirelife on Dec. 19, 2008, http://www.youtube.com/watch?v=Yon3vRwc94A, 3 pages.

YouTube, "I3 MultiTouch Interactive Table," 2:15 minute video uploaded by i3pgroup on Nov. 16, 2007, http://www.youtube.com/watch?v=M2oijV-bRrw&feature=related, 2 pages.

YouTube, "IdentityMine's multitude of Multi-Touch apps," 3:27 minute video uploaded to YouTube by ContinuumShow on Nov. 6, 2008, http://www.youtube.com/watch?v=HcpdNb9LHns, 3 pages.

YouTube, "Jeff Han's 8 ft. Multi-Touch Display Wall," 4:39 minute video uploaded to YouTube by alai6666 on May 16, 2007, http://www.youtube.com/watch?v=JfFwgPuEdSk&feature=related, 2 pages.

YouTube, "LG Phillips 52-inch multi-touch display," 1:36 minute video uploaded to YouTube by engadget on Jan. 8, 2008, http://www.youtube.com/watch?v=9qO-diu4jq4&feature=related, 2 pages.

YouTube, "Lucid Touch: a See-Through Multi-Touch Mobile Device," 3:29 minute video upload by dwigdor Aug. 21, 2007, http://www.youtube.com/watch?v=qbMQ7urAvuc, 2 pages.

YouTube, "Microsoft Surface Demo," 2:10 minute video uploaded to YouTube by zac96 on Aug. 17, 2007, http://www.youtube.com/watch?v=rKgU6ubBgJA&feature=related, 2 pages.

YouTube, "Microsoft Surface Demo E CES 2008," 9:58 minute video uploaded to YouTube by GerbiBod7 on Jan. 8, 2008, http://www.youtube.com/watch?v=Zxk_WymMTzc&feature=related, 2 pages.

YouTube, "Minority Report Interface Prototype," 1:52 minute video uploaded to YouTube by alevalli on Jul. 12, 2006, http://www.youtube.com/watch?v=3bn-zZX9kdc, 3 pages.

YouTube, "Multi-touch Interaction: Browser Control," 1:12 minute video uploaded to YouTube by HCiKonstanz on Sep. 12, 2008, http://www.youtube.com/watch?v=jTOK5Zbfm4U, 2 pages.

YouTube, "Multi-touch interface (from Adobe TED)," 9:33 minute video uploaded to YouTube by f0xmuld3r on Aug. 3, 2006, http://www.youtube.com/watch?v=UcKgyn-gUbY, 2 pages.

YouTube, "Multi Touch (new touchscreen technology)," 3:31 minute video uploaded to YouTube by chanfrado on Mar. 17, 2006, http://www.youtube.com/watch?v=ifJhDBZqss&feature=related, 2 pages.

YouTube, "Multi-touch Time and Geo Tagging Photosharing with IntuiFace," 2:21 minute video uploaded to YouTube by IntuiLab on Jan. 31, 2008, http://www.youtube.com/watch?v=ftsx21liFvo, 3 pages.

YouTube, "PhotoApp (Multi-Touch)," 1:45 video uploaded to YouTude by NePsihus on Dec. 30, 2007http://www.youtube.com/watch?v=RJTVULGnZQ0, 3 pages.

YouTube, "Photoshop MT-Desktop Digital Imaging on FTIR multitouch," 5:38 minute video uploaded to YouTube by thomasglaeser on Feb. 7, 2007, http://www.youtube.com/watch?v=JmHNr9EH1lU&feature=related, 2 pages.

YouTube, "Photo Touch: Multi-touch Photo Organization for your Mac," 8:03 minute video uploaded to YouTube by cocoadex on Mar. 30, 2008, http://www.youtube.com/watch2v=D7x7jV3P1-0, 3 pages.

YouTube, "Smart Surface Beta," 1:56 minute video, uploaded to YouTube by vanderlin on Mar. 29, 2008, http://www.youtube.com/watch?v=68wFqxdXENw&feature=related, 3 pages.

YouTube, "TDesk Multiuser," 1:11 minute video uploaded to YouTube by bestsheep1 on Sep. 6, 2007, http://www.youtube.com/watch?v=PjsO-lbll34&feature=related, 2 pages.

YouTube, "Wii Multi-touch Photo Gallery," 1:25 minute video uploaded to YouTube by darthstoo on Apr. 10 2008, http://www.youtube.com/watch?v=0CYVxQ2OM9s, 3 pages.

Invitation to Pay Additional Fees dated Apr. 29, 2010, received in International Application No. PCT/US2009/057899, which corresponds to U.S. Appl. No. 12/567,405, 8 pages (Victor).

International Search Report and Written Opinion dated Jun. 14, 2010, received in International Application No. PCT/US2009/057899, which corresponds to U.S. Appl. No. 12/567,405, 23 pages, (Victor).

International Search Report and Written Opinion dated Jul. 1, 2011, received in International Application No. PCT/US2011/022519, which corresponds to U.S. Appl. No. 12/790,504, 11 pages, (Capela).

International Search Report and Written Opinion dated Apr. 27, 2011, received in International Application No. PCT/US2011/022525, which corresponds to U.S. Appl. No. 12/790,508.

International Search Report and Written Opinion dated May 24, 2011, received in International Application No. PCT/US2011/022532, which corresponds to U.S. Appl. No. 12/790,524, 18 pages (Capela).

International Search Report and Written Opinion dated Dec. 13, 2011, received in International Patent Application No. PCT/US2011/045552, which corresponds to U.S. Appl. No. 12/848,067, 12 pages (Migos).

International Preliminary Report on Patentability dated Feb. 14, 2013, received in International Application No. PCT/US2011/045552, which corresponds to U.S. Appl. No. 12/848,067, 8 pages (Migos).

(56) References Cited

OTHER PUBLICATIONS

Office Action dated May 17, 2012, received in U.S. Appl. No. 12/587,405, 21 pages (Victor).
Final Office Action dated Dec. 17 2012, received in U.S. Appl. No. 12/567,405, 19 pages (Victor).
Office Action dated Jul. 6, 2012, received in U.S. Appl. No. 12/567,171, 13 pages (Missig).
Final Office Action dated Jan. 3, 2013, received in U.S. Appl. No. 12/567,171, 20 pages (Missig).
Office Action dated Aug. 30, 2012, received in U.S. Appl. No. 12/567,206, 13 pages (Missig).
Final Office Action dated Apr. 4, 2013, received in U.S. Appl. No. 12/587,206, 30 pages (Missig).
Office Action dated Aug. 4, 2011, received in U.S. Appl. No. 12/567,460, 14 pages (Victor).
Notice of Allowance dated Jan. 18, 2012, received in U.S. Appl. No. 12/567,460, 8 pages (Victor).
Notice of Allowance dated Aug. 10, 2012, received in U.S. Appl. No. 12/567,460, 14 pages (Victor).
Notice of Allowance dated Dec. 24, 2012, received in U.S. Appl. No. 12/567,460, 17 pages (Nictor).
Notice of Allowance dated Apr. 10, 2013, received in U.S. Appl. No. 12/567,460, 11 pages (Victor).
Office Action dated Sep. 16, 2011, received in U.S. Appl. No. 12/567,553, 12 pages (Victor).
Final Office Action dated Mar. 12, 2012, received in U.S. Appl. No. 12/567,553, 15 pages (Victor).
Notice of Allowance dated Jun. 12, 2012, received in U.S. Appl. No. 12/567,553, 8 pages (Victor).
Notice of Allowance dated Aug. 10, 2012, received in U.S. Appl. No. 12/567,553, 13 pages (Victor).
Notice of Allowance dated Dec. 24, 2012, received in U.S. Appl. No. 12/567,553, 12 pages (Victor).
Notice of Allowance dated Apr. 2, 2013, received in U.S. Appl. No. 12/567,553, 11 pages (Victor).
Notice of Allowance dated Dec. 19, 2012, received in U.S. Appl. No. 12/567,570, 10 pages (Victor).
Notice of Allowance dated Mar. 27, 2013, received in U.S. Appl. No. 12/567,570, 11 pages (Victor).
Office Action dated Oct. 3, 2012, received in U.S. Appl. No. 12/790,504, 23 pages (Capela).
Final Office Action dated Apr. 1, 2013, received in U.S. Appl. No. 12/790,504, 29 pages (Capela).
Office Action dated Nov. 7, 2012, received in U.S. Appl. No. 12/790,508, 33 pages (Capela).
Office Action dated Feb. 2, 2012, received in U.S. Appl. No. 12/790,516, 11 page (Capela).
Office Aciton dated Aug. 27, 2012, received in U.S. Appl. No. 12/790,516, 10 pages (Capela).
Notice of Allowance dated May 15, 2013, received in U.S. Appl. No. 12/790,516, 21 pages (Capela).
Office Action dated Sep. 24 2012, received in U.S. Appl. No. 12/790,524, 23 pages (Capela).
Notice of Allowance dated Feb. 5, 2013, received in U.S. Appl. No. 12/790,524, 9 pages (Capela).
Notice of Allowance dated May 13, 2013, received in U.S. Appl. No. 12/790,524, 19 pages (Capela).
Office Action dated Aug. 9, 2012, received in U.S. Appl. No. 12/848,063, 14 pages (Migos).
Office Action dated Mar. 29, 2013, received in U.S. Appl. No. 12/848,063, 21 pages (Migos).
Office Action dated Mar. 7, 2013, received in U.S. Appl. No. 12/848,087, 27 pages (Migos).
Office Action dated Jun. 6. 2012, received in U.S. Appl. No. 12/848,067, 17 pages (Migos).
Final Office Action dated Jan. 10, 2013, received in U.S. Appl. No. 12/848,067, 43 (Migos).
Office Action dated Jun. 29, 2012, received in U.S. Appl. No. 12/848,074, 12 pages (Migos).
Final Office Action dated Apr. 3, 2013, received in U.S. Appl. No. 12/848,074, 25 pages (Migos).

\* cited by examiner

In response to detecting the two-contact gesture: when the difference between the first time and the second time is less than a predefined amount, perform a first user interface object modification operation on the first user interface object; and when the difference between the first time and the second time is greater than the predefined amount, perform a second user interface object modification operation on the first user interface object. The first user interface object modification operation is distinct from the second user interface object modification operation. — 1010

The first user interface object modification operation is a symmetrical object resizing operation and the second user interface object modification operation is an asymmetrical object resizing operation. — 1012

The first user interface object has a first axis and a second axis. The first axis is perpendicular to the second axis. The two-contact gesture has a primary gesture axis that is substantially parallel to the first axis. The first user interface object modification operation includes resizing the first user interface object along the first axis and maintaining the size of the user interface object along the second axis, while maintaining a centroid of the user interface object in a fixed position on the display. The second user interface object modification operation includes resizing the user interface object along the first axis and maintaining the size of the user interface object along the second axis, while moving the centroid of the user interface object on the display in accordance with the movement of a centroid of the first contact and the second contact on the touch-sensitive surface. — 1020

Figure 10C

DEVICE, METHOD, AND GRAPHICAL USER INTERFACE FOR MANIPULATING USER INTERFACE OBJECTS

RELATED APPLICATIONS

This application claims benefit under 35 U.S.C. 119 to U.S. Provisional Application Ser. No. 61/277,603, filed Sep. 25, 2009, entitled "Device, Method, and Graphical User Interface for Manipulating User Interface Objects."

TECHNICAL FIELD

The disclosed embodiments relate generally to electronic devices with touch-sensitive surfaces, and more particularly, to electronic devices that use touch-sensitive surfaces to manipulate user interface objects.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position, rotation, size, aspect ratio, and/or shape of one or more user interface objects. Exemplary user interface objects include digital images, video, text, icons, and other graphics. A user may need to perform such manipulations on user interface objects in, an electronic document authoring application such as a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), or a spreadsheet application (e.g., Numbers from Apple Inc. of Cupertino, Calif.).

But existing methods for performing these manipulations are cumbersome and inefficient, thereby creating a significant cognitive burden on a user. In addition, existing methods take longer than necessary, thereby wasting energy. This latter consideration is particularly important in battery-operated devices.

Accordingly, there is a need for multifunction devices with faster, more efficient methods and interfaces for manipulating user interface objects, while reducing the number of user inputs required to perform the manipulation tasks. Such methods and interfaces may complement or replace conventional methods for manipulating user interface objects. Such methods and interfaces reduce the cognitive burden on a user and produce a more efficient human-machine interface. For battery-operated multifunction devices, such methods and interfaces conserve power and increase the time between battery charges.

SUMMARY

The above deficiencies and other problems associated with user interfaces for multifunction devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. The method includes: displaying a first user interface for an application at a first magnification level. The first user interface includes a first plurality of user interface objects. The application has a range of magnification levels, including a predefined magnification level for requesting a second user interface with a multi-finger pinch gesture. The method also includes: detecting a first multi-finger pinch gesture on the touch-sensitive surface; and, in response to detecting the first multi-finger pinch gesture: when the first magnification level is the predefined magnification level, displaying the second user interface simultaneously with the first user interface, wherein the second user interface includes a second plurality of user interface objects that are distinct from the first plurality of user interface objects in the first user interface; and when the first magnification level is greater than the predefined magnification level, zooming out the first user interface in accordance with the first multi-finger pinch gesture.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: displaying a first user interface for an application at a first magnification level. The first user interface includes a first plurality of user interface objects. The application has a range of magnification levels, including a predefined magnification level for requesting a second user interface with a multi-finger pinch gesture. The device also includes instructions for: detecting a first multi-finger pinch gesture on the touch-sensitive surface; and, in response to detecting the first multi-finger pinch gesture: when the first magnification level is the predefined magnification level, displaying the second user interface simultaneously with the first user interface, wherein the second user interface includes a second plurality of user interface objects that are distinct from the first plurality of user interface objects in the first user interface; and when the first magnification level is greater than the predefined magnification level, zooming out the first user interface in accordance with the first multi-finger pinch gesture.

In accordance with some embodiments, a computer readable storage medium has stored therein instructions which when executed by a multifunction device with a display and a touch-sensitive surface, cause the device to: display a first user interface for an application at a first magnification level. The first user interface includes a first plurality of user interface objects. The application has a range of magnification levels, including a predefined magnification level for requesting a second user interface with a multi-finger pinch gesture. The instructions also cause the device to: detect a first multi-finger pinch gesture on the touch-sensitive surface; and, in response to detecting the first multi-finger pinch gesture: when the first magnification level is the predefined magnification level, display the second user interface simultaneously with the first user interface, wherein the second user interface includes a second plurality of user interface objects that are distinct from the first plurality of user interface objects in the first user interface; and when the first magnification level is greater than the predefined magnification level, zoom out the first user interface in accordance with the first multi-finger pinch gesture.

In accordance with some embodiments, a graphical user interface on a multifunction device with a display, a touch-sensitive surface, a memory, and one or more processors to execute one or more programs stored in the memory includes a first user interface for an application at a first magnification level. The first user interface includes a first plurality of user interface objects. The application has a range of magnification levels, including a predefined magnification level for requesting a second user interface with a multi-finger pinch gesture. In response to detecting a first multi-finger pinch gesture on the touch-sensitive surface: when the first magnification level is the predefined magnification level, the second user interface is displayed simultaneously with the first user interface, wherein the second user interface includes a second plurality of user interface objects that are distinct from the first plurality of user interface objects in the first user interface; and when the first magnification level is greater than the predefined magnification level, the first user interface is zoomed out in accordance with the first multi-finger pinch gesture.

In accordance with some embodiments, a multifunction device includes: a display; a touch-sensitive surface; and means for displaying a first user interface for an application at a first magnification level. The first user interface includes a first plurality of user interface objects. The application has a range of magnification levels, including a predefined magnification level for requesting a second user interface with a multi-finger pinch gesture. The device also includes: means for detecting a first multi-finger pinch gesture on the touch-sensitive surface; and, in response to detecting the first multi-finger pinch gesture: means for, when the first magnification level is the predefined magnification level, displaying the second user interface simultaneously with the first user interface, wherein the second user interface includes a second plurality of user interface objects that are distinct from the first plurality of user interface objects in the first user interface; and means for, when the first magnification level is greater than the predefined magnification level, zooming out the first user interface in accordance with the first multi-finger pinch gesture.

In accordance with some embodiments, an information processing apparatus for use in a multifunction device with a display and a touch-sensitive surface includes: means for displaying a first user interface for an application at a first magnification level. The first user interface includes a first plurality of user interface objects. The application has a range of magnification levels, including a predefined magnification level for requesting a second user interface with a multi-finger pinch gesture. The apparatus also includes: means for detecting a first multi-finger pinch gesture on the touch-sensitive surface; and, in response to detecting the first multi-finger pinch gesture: means for, when the first magnification level is the predefined magnification level, displaying the second user interface simultaneously with the first user interface, wherein the second user interface includes a second plurality of user interface objects that are distinct from the first plurality of user interface objects in the first user interface; and means for, when the first magnification level is greater than the predefined magnification level, zooming out the first user interface in accordance with the first multi-finger pinch gesture.

In accordance with some embodiments, a method is performed at a multifunction device with a display and a touch-sensitive surface. The method includes: displaying a user interface for an electronic document authoring application, the user interface including a plurality of user interface objects; detecting a first contact at a first time with the touch-sensitive surface at a first location that is associated with a first user interface object on the display; detecting a second contact at a second time with the touch-sensitive surface at a second location that is also associated with the first user interface object; detecting a two-contact gesture by the first contact and the second contact; and, in response to detecting the two-contact gesture: when the difference between the first time and the second time is less than a predefined amount, performing a first user interface object modification operation on the first user interface object; and when the difference between the first time and the second time is greater than the predefined amount, performing a second user interface object modification operation on the first user interface object. The first user interface object modification operation is distinct from the second user interface object modification operation.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for: displaying a user interface for an electronic document authoring application, the user interface including a plurality of user interface objects; detecting a first contact at a first time with the touch-sensitive surface at a first location that is associated with a first user interface object on the display; detecting a second contact at a second time with the touch-sensitive surface at a second location that is also associated with the first user interface object; detecting a two-contact gesture by the first contact and the second contact; and, in response to detecting the two-contact gesture: when the difference between the first time and the second time is less than a predefined amount, performing a first user interface object modification operation on the first user interface object; and when the difference between the first time and the second time is greater than the predefined amount, performing a second user interface object modification operation on the first user interface object. The first user interface object modification operation is distinct from the second user interface object modification operation.

In accordance with some embodiments, a computer readable storage medium has stored therein instructions which when executed by a multifunction device with a display and a touch-sensitive surface, cause the device to: display a user interface for an electronic document authoring application, the user interface including a plurality of user interface objects; detect a first contact at a first time with the touch-sensitive surface at a first location that is associated with a first user interface object on the display; detect a second contact at a second time with the touch-sensitive surface at a second location that is also associated with the first user interface object; detect a two-contact gesture by the first contact and the second contact; and, in response to detecting the two-contact gesture: when the difference between the first time and the second time is less than a predefined amount, perform a first user interface object modification operation on the first user interface object; and when the difference between the first time and the second time is greater than the predefined amount, perform a second user interface object modification operation on the first user interface object. The first user interface object modification operation is distinct from the second user interface object modification operation.

In accordance with some embodiments, a graphical user interface on a multifunction device with a display, a touch-sensitive surface, a memory, and one or more processors to execute one or more programs stored in the memory includes a plurality of user interface objects for an electronic document authoring application, the plurality of user interface objects including a first user interface object. A first contact is detected at a first time with the touch-sensitive surface at a first location that is associated with the first user interface object on the display. A second contact is detected at a second time with the touch-sensitive surface at a second location that is also associated with the first user interface object. In response to detecting a two-contact gesture by the first contact and the second contact: when the difference between the first time and the second time is less than a predefined amount, a first user interface object modification operation is performed on the first user interface object; and when the difference between the first time and the second time is greater than the predefined amount, a second user interface object modification operation is performed on the first user interface object. The first user interface object modification operation is distinct from the second user interface object modification operation.

In accordance with some embodiments, a multifunction device includes: a display; a touch-sensitive surface; means for displaying a user interface for an electronic document authoring application, the user interface including a plurality of user interface objects; means for detecting a first contact at a first time with the touch-sensitive surface at a first location that is associated with a first user interface object on the display; means for detecting a second contact at a second time with the touch-sensitive surface at a second location that is also associated with the first user interface object; means for detecting a two-contact gesture by the first contact and the second contact; and, in response to detecting the two-contact gesture: when the difference between the first time and the second time is less than a predefined amount, means for performing a first user interface object modification operation on the first user interface object; and when the difference between the first time and the second time is greater than the predefined amount, means for performing a second user interface object modification operation on the first user interface object. The first user interface object modification operation is distinct from the second user interface object modification operation.

In accordance with some embodiments, an information processing apparatus for use in a multifunction device with a display and a touch-sensitive surface includes: means for displaying a user interface for an electronic document authoring application, the user interface including a plurality of user interface objects; means for detecting a first contact at a first time with the touch-sensitive surface at a first location that is associated with a first user interface object on the display; means for detecting a second contact at a second time with the touch-sensitive surface at a second location that is also associated with the first user interface object; means for detecting a two-contact gesture by the first contact and the second contact; and, in response to detecting the two-contact gesture: when the difference between the first time and the second time is less than a predefined amount, means for performing a first user interface object modification operation on the first user interface object; and when the difference between the first time and the second time is greater than the predefined amount, means for performing a second user interface object modification operation on the first user interface object. The first user interface object modification operation is distinct from the second user interface object modification operation.

In accordance with some embodiments, a method is performed at a multifunction device with a display and a touch-sensitive surface. The method includes simultaneously displaying on the display: a plurality of user interface objects, wherein at least some of the user interface objects are configured to be resizable; a currently selected user interface object that has a shape with an aspect ratio; and a plurality of resizing handles for the currently selected user interface object. Each respective resizing handle has a corresponding handle activation region. The method also includes: detecting a first input on a first handle activation region for a first resizing handle in the plurality of resizing handles; detecting lateral movement of the first input; and snapping the shape of the currently selected user interface object to a plurality of aspect ratios in accordance with the lateral movement of the first input. The plurality of aspect ratios include: a current aspect ratio, wherein the current aspect ratio is the aspect ratio of the currently selected user interface object when the first input is initially detected; and a native aspect ratio of the currently selected user interface object.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for simultaneously displaying on the display: a plurality of user interface objects, wherein at least some of the user interface objects are configured to be resizable; a currently selected user interface object that has a shape with an aspect ratio; and a plurality of resizing handles for the currently selected user interface object. Each respective resizing handle has a corresponding handle activation region. The device also includes instructions for: detecting a first input on a first handle activation region for a first resizing handle in the plurality of resizing handles; detecting lateral movement of the first input; and snapping the shape of the currently selected user interface object to a plurality of aspect ratios in accordance with the lateral movement of the first input. The plurality of aspect ratios include: a current aspect ratio, wherein the current aspect ratio is the aspect ratio of the currently selected user interface object when the first input is initially detected; and a native aspect ratio of the currently selected user interface object.

In accordance with some embodiments, a computer readable storage medium has stored therein instructions which when executed by a multifunction device with a display and a touch-sensitive surface, cause the device to simultaneously display on the display: a plurality of user interface objects, wherein at least some of the user interface objects are configured to be resizable; a currently selected user interface object that has a shape with an aspect ratio; and a plurality of resizing handles for the currently selected user interface object. Each respective resizing handle has a corresponding handle activation region. The instructions also cause the device to: detect a first input on a first handle activation region for a first resizing handle in the plurality of resizing handles; detect lateral movement of the first input; and snap the shape of the currently selected user interface object to a plurality of aspect ratios in accordance with the lateral movement of the first input. The plurality of aspect ratios include: a current aspect ratio, wherein the current aspect ratio is the aspect ratio of the currently selected user interface object when the first input is initially detected; and a native aspect ratio of the currently selected user interface object.

In accordance with some embodiments, a graphical user interface on a multifunction device with a display, a touch-sensitive surface, a memory, and one or more processors to execute one or more programs stored in the memory includes: a plurality of user interface objects, wherein at least some of the user interface objects are configured to be resizable; a currently selected user interface object that has a shape with an aspect ratio; and a plurality of resizing handles for the currently selected user interface object. Each respective resizing handle has a corresponding handle activation region. A first input is detected on a first handle activation region for a first resizing handle in the plurality of resizing handles. Lateral movement of the first input is detected. The shape of the currently selected user interface object is snapped to a plurality of aspect ratios in accordance with the lateral movement of the first input. The plurality of aspect ratios include: a current aspect ratio, wherein the current aspect ratio is the aspect ratio of the currently selected user interface object when the first input is initially detected; and a native aspect ratio of the currently selected user interface object.

In accordance with some embodiments, a multifunction device includes: a display; a touch-sensitive surface; and means for simultaneously displaying on the display: a plurality of user interface objects, wherein at least some of the user interface objects are configured to be resizable; a currently selected user interface object that has a shape with an aspect ratio; and a plurality of resizing handles for the currently selected user interface object. Each respective resizing handle has a corresponding handle activation region. The device also includes: means for detecting a first input on a first handle activation region for a first resizing handle in the plurality of resizing handles; means for detecting lateral movement of the first input; and means for snapping the shape of the currently selected user interface object to a plurality of aspect ratios in accordance with the lateral movement of the first input. The plurality of aspect ratios include: a current aspect ratio, wherein the current aspect ratio is the aspect ratio of the currently selected user interface object when the first input is initially detected; and a native aspect ratio of the currently selected user interface object.

In accordance with some embodiments, an information processing apparatus for use in a multifunction device with a display and a touch-sensitive surface includes means for simultaneously displaying on the display: a plurality of user interface objects, wherein at least some of the user interface objects are configured to be resizable; a currently selected user interface object that has a shape with an aspect ratio; and a plurality of resizing handles for the currently selected user interface object. Each respective resizing handle has a corresponding handle activation region. The apparatus also includes: means for detecting a first input on a first handle activation region for a first resizing handle in the plurality of resizing handles; means for detecting lateral movement of the first input; and means for snapping the shape of the currently selected user interface object to a plurality of aspect ratios in accordance with the lateral movement of the first input. The plurality of aspect ratios include: a current aspect ratio, wherein the current aspect ratio is the aspect ratio of the currently selected user interface object when the first input is initially detected; and a native aspect ratio of the currently selected user interface object.

In accordance with some embodiments, a method is performed at a multifunction device with a display and a touch-sensitive surface. The method includes simultaneously displaying on the display: a plurality of user interface objects, wherein at least some of the user interface objects are configured to be repositioned and resized on the display; and a currently selected user interface object. The method also includes: detecting a first input on the touch-sensitive surface at a location that corresponds to the currently selected user interface object; detecting lateral movement of the first input; displaying one or more alignment guides emanating from the currently selected user interface object; and moving or resizing the currently selected user interface object in accordance with the lateral movement of the first input. The one or more alignment guides move in accordance with the moving or resizing of the user interface object.

In accordance with some embodiments, a multifunction device includes a display, a touch-sensitive surface, one or more processors, memory, and one or more programs. The one or more programs are stored in the memory and configured to be executed by the one or more processors. The one or more programs include instructions for simultaneously displaying on the display: a plurality of user interface objects, wherein at least some of the user interface objects are configured to be repositioned and resized on the display; and a currently selected user interface object. The device also includes instructions for: detecting a first input on the touch-sensitive surface at a location that corresponds to the currently selected user interface object; detecting lateral movement of the first input; displaying one or more alignment guides emanating from the currently selected user interface object; and moving or resizing the currently selected user interface object in accordance with the lateral movement of the first input. The one or more alignment guides move in accordance with the moving or resizing of the user interface object.

In accordance with some embodiments, a computer readable storage medium has stored therein instructions which when executed by a multifunction device with a display and a touch-sensitive surface, cause the device to simultaneously display on the display: a plurality of user interface objects, wherein at least some of the user interface objects are configured to be repositioned and resized on the display; and a currently selected user interface object. The instructions also cause the device to: detect a first input on the touch-sensitive surface at a location that corresponds to the currently selected user interface object; detect lateral movement of the first input; display one or more alignment guides emanating from the currently selected user interface object; and move or resize the currently selected user interface object in accordance with the lateral movement of the first input. The one or more alignment guides move in accordance with the moving or resizing of the user interface object.

In accordance with some embodiments, a graphical user interface on a multifunction device with a display, a touch-sensitive surface, a memory, and one or more processors to execute one or more programs stored in the memory includes a plurality of user interface objects, wherein at least some of the user interface objects are configured to be repositioned and resized on the display; and a currently selected user interface object. A first input is detected on the touch-sensitive surface at a location that corresponds to the currently selected user interface object. Lateral movement of the first input is detected. One or more alignment guides are displayed emanating from the currently selected user interface object. The currently selected user interface object is moved or resized in accordance with the lateral movement of the first input. The one or more alignment guides move in accordance with the moving or resizing of the user interface object.

In accordance with some embodiments, a multifunction device includes: a display; a touch-sensitive surface; and means for simultaneously displaying on the display: a plurality of user interface objects, wherein at least some of the user interface objects are configured to be repositioned and resized on the display; and a currently selected user interface object. The device also includes: means for detecting a first input on the touch-sensitive surface at a location that corresponds to the currently selected user interface object; means for detecting lateral movement of the first input; means for displaying one or more alignment guides emanating from the currently selected user interface object; and means for moving or resizing the currently selected user interface object in accordance with the lateral movement of the first input. The one or more alignment guides move in accordance with the moving or resizing of the user interface object.

In accordance with some embodiments, an information processing apparatus for use in a multifunction device with a display and a touch-sensitive surface includes means for simultaneously displaying on the display: a plurality of user interface objects, wherein at least some of the user interface objects are configured to be repositioned and resized on the display; and a currently selected user interface object. The apparatus also includes: means for detecting a first input on the touch-sensitive surface at a location that corresponds to the currently selected user interface object; means for detecting lateral movement of the first input; means for displaying one or more alignment guides emanating from the currently selected user interface object; and means for moving or resizing the currently selected user interface object in accordance with the lateral movement of the first input. The one or more alignment guides move in accordance with the moving or resizing of the user interface object.

Thus, multifunction devices with displays and touch-sensitive surfaces are provided with faster, more efficient methods and interfaces for manipulating user interface objects, thereby increasing the effectiveness, efficiency, and user satisfaction with such devices. Such methods and interfaces may complement or replace conventional methods for manipulating user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 10A-10C are flow diagrams illustrating a method of modifying an object in response to time-sensitive two-contact gestures in accordance with some embodiments.

DESCRIPTION OF EMBODIMENTS

Figure 1A:
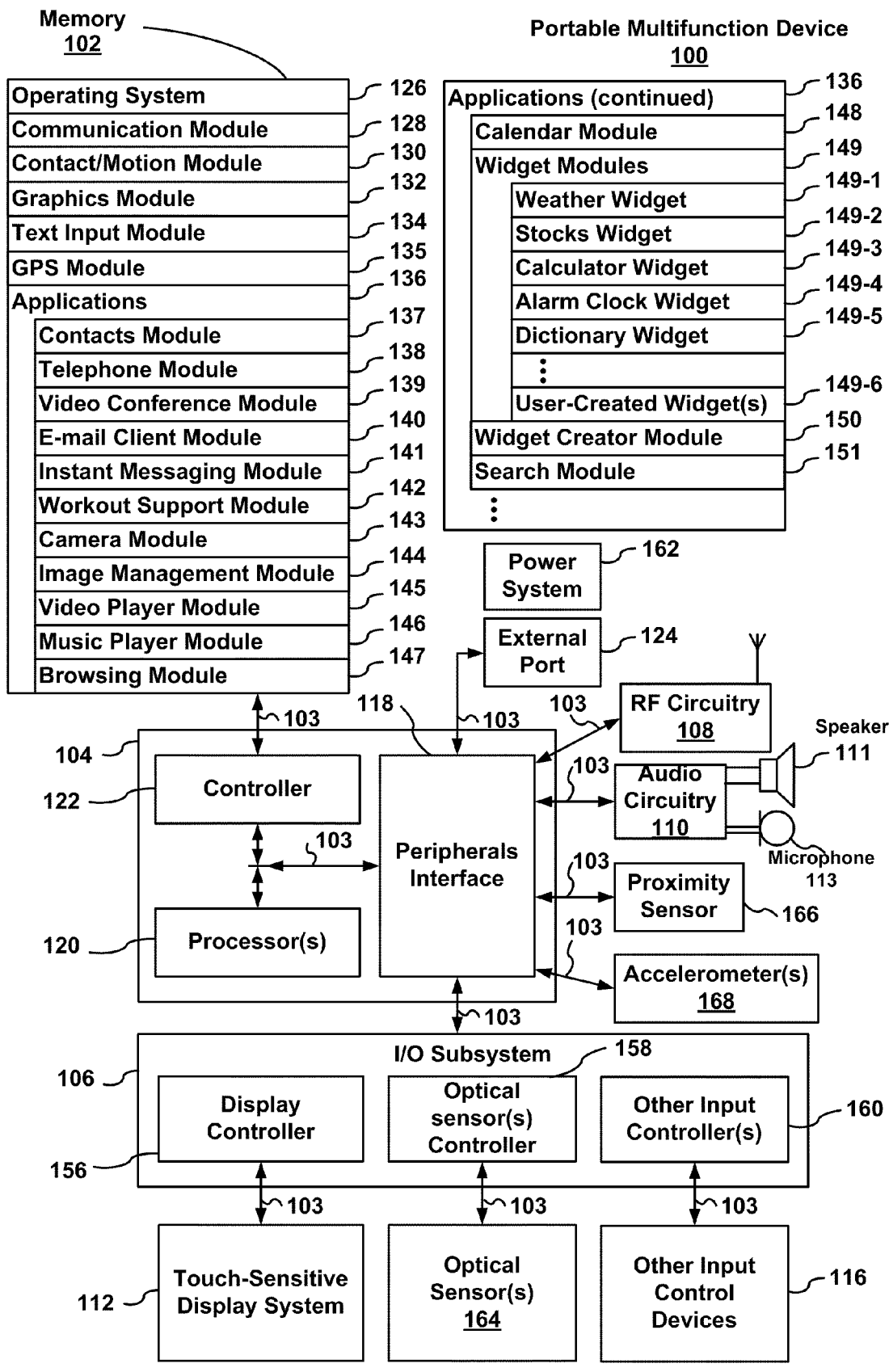
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
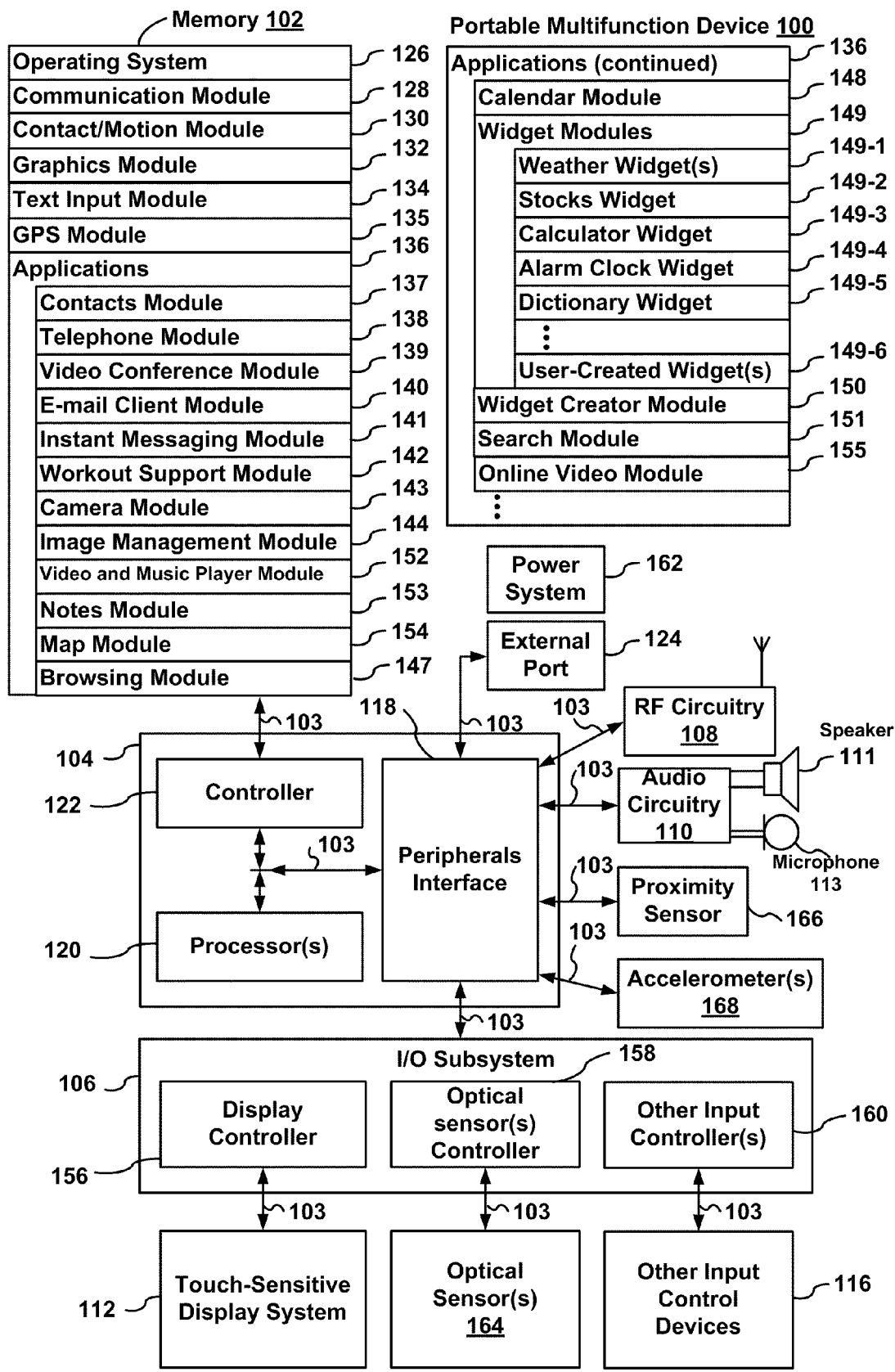

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of the touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive touchpads do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 1C:
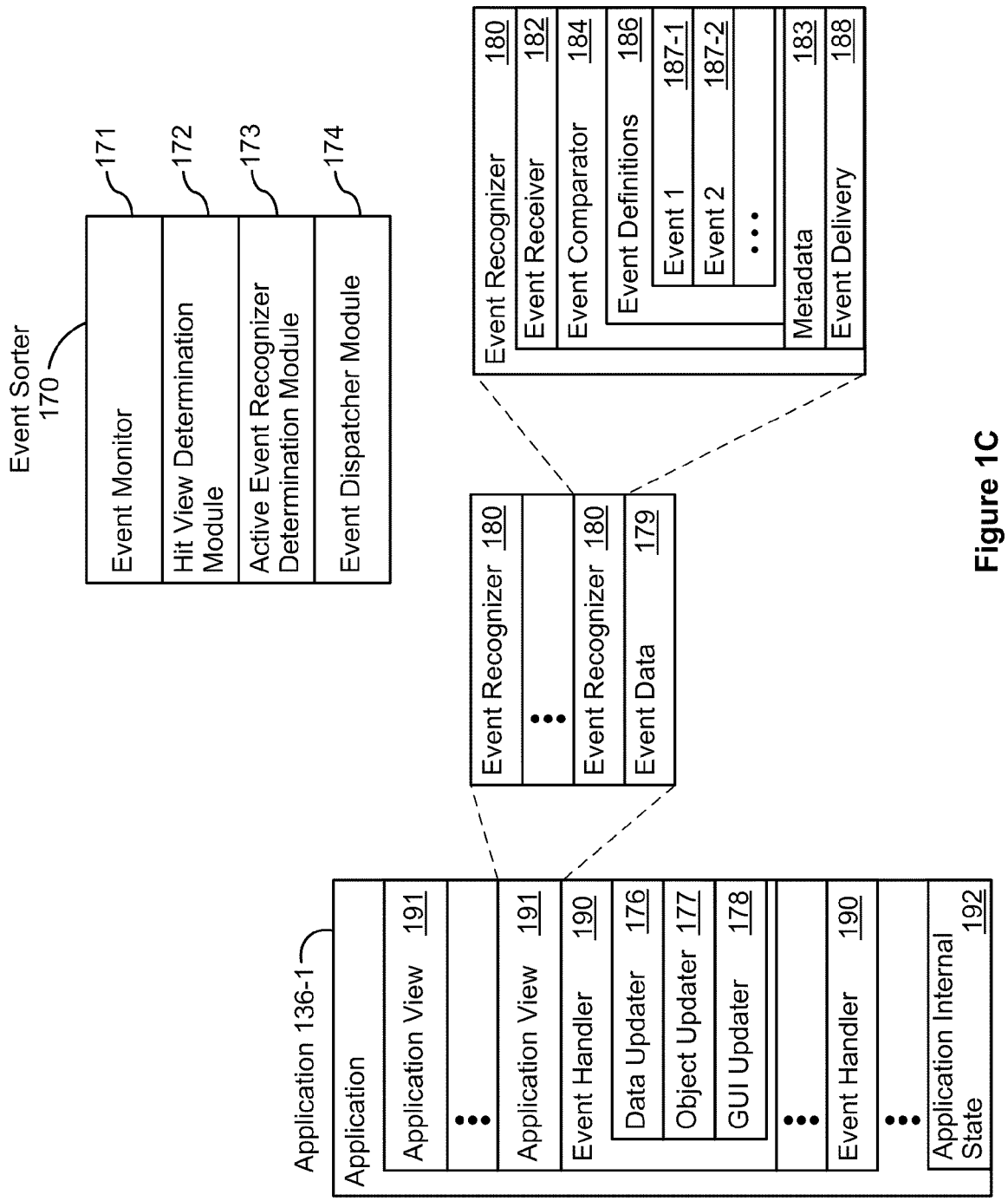
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
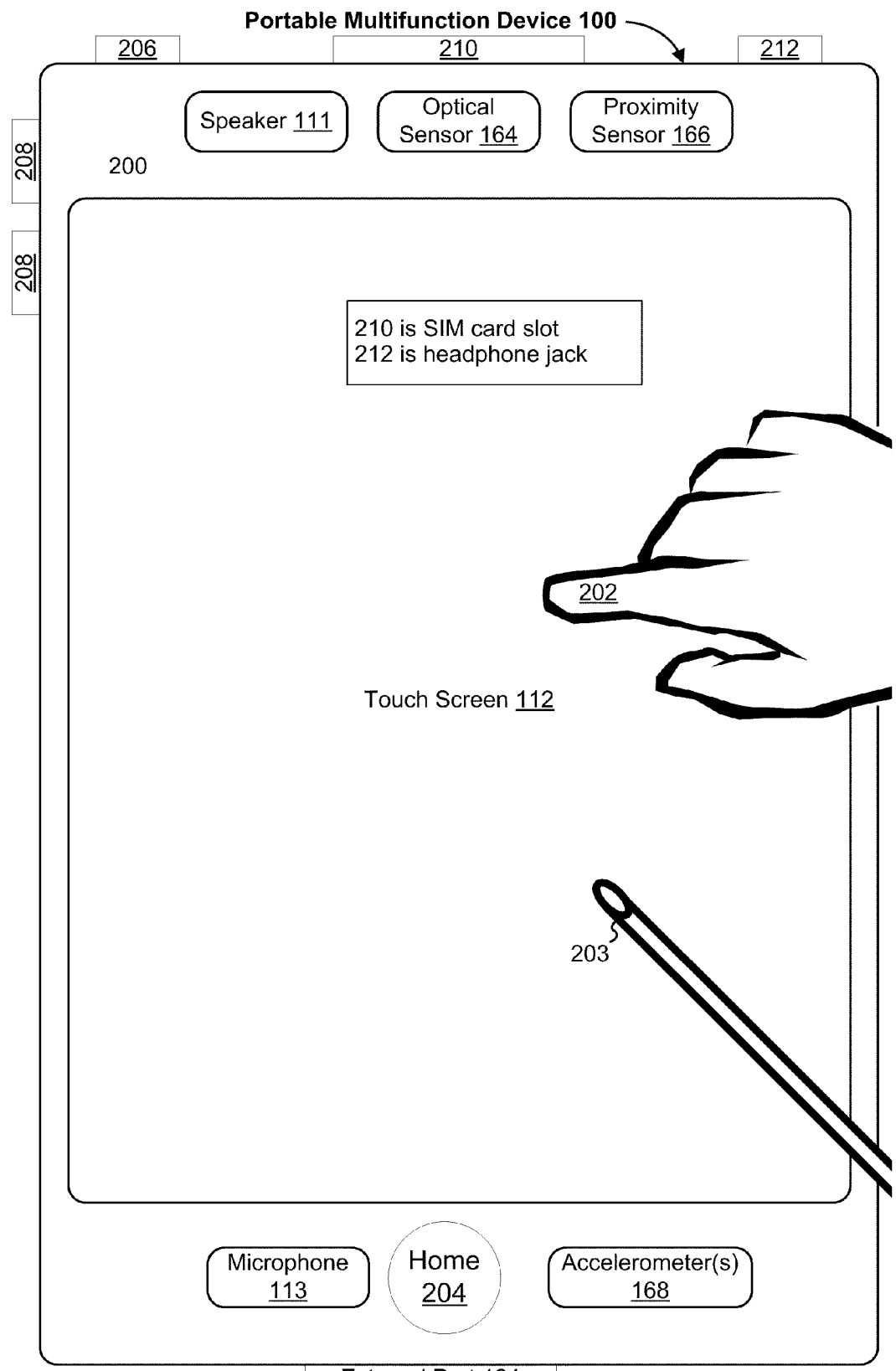
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
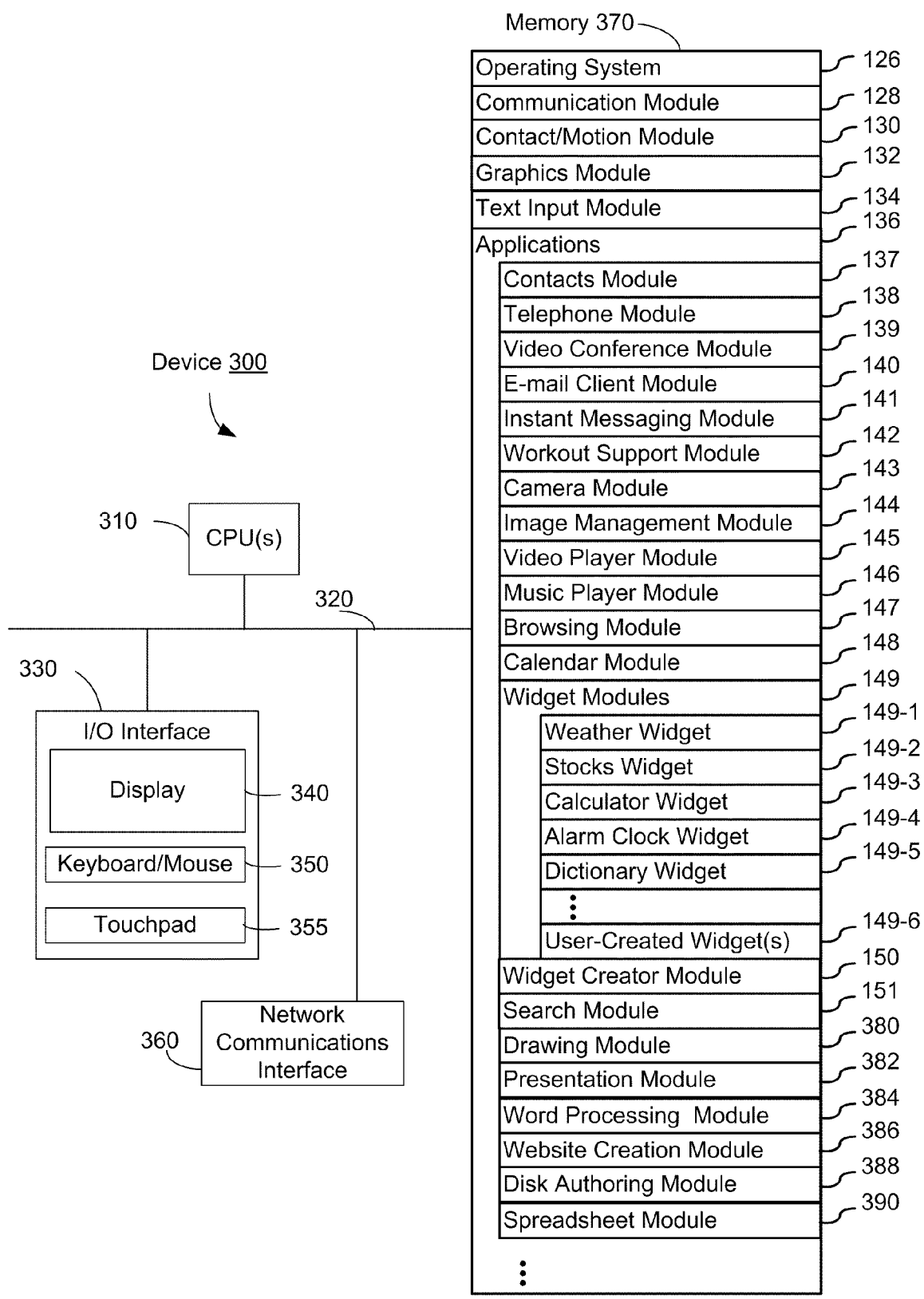
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which is typically a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
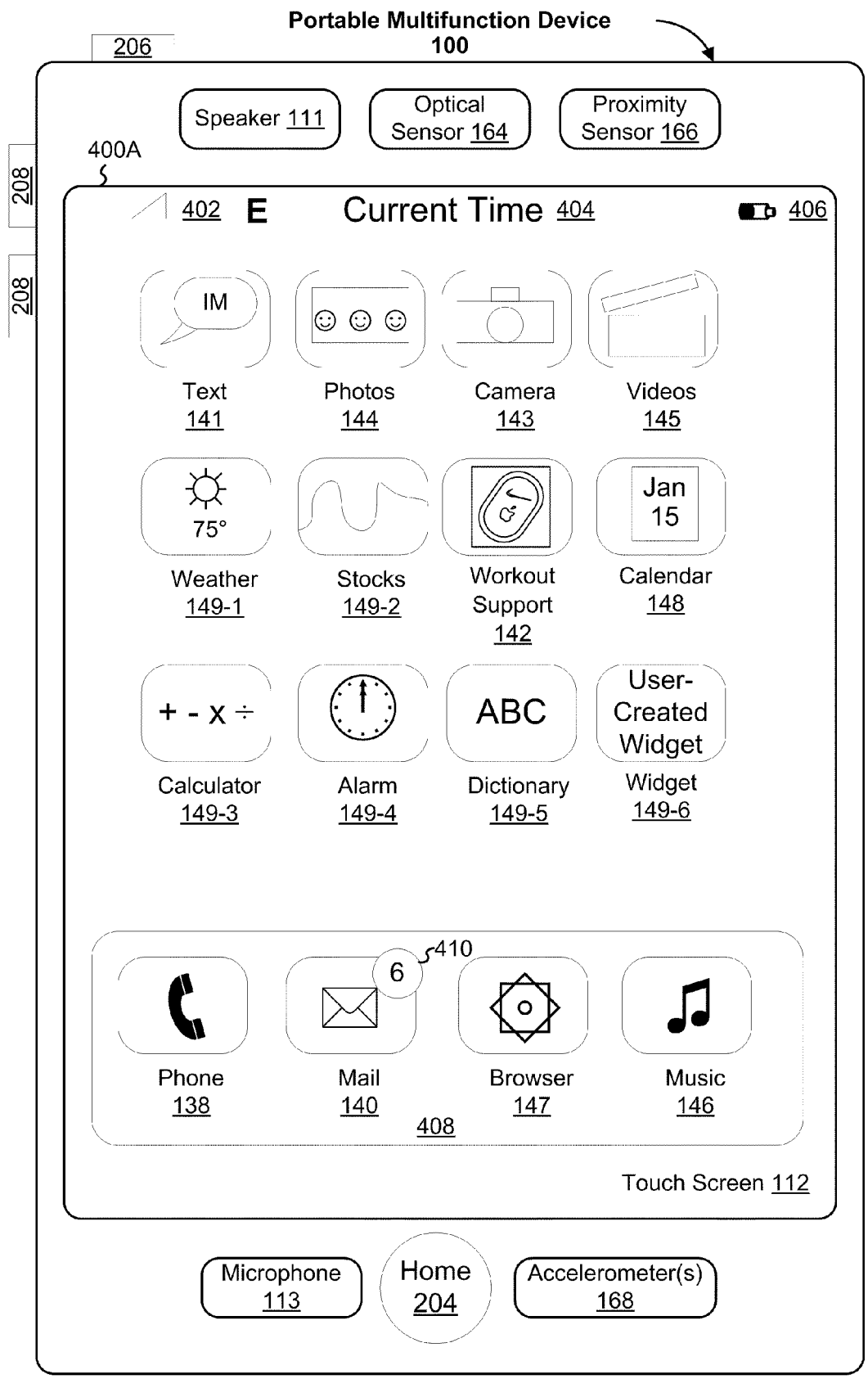
FIGS. 4A and 4B illustrate exemplary user interfaces for a menu of applications on a portable multifunction device in accordance with some embodiments.
Figure 4B:
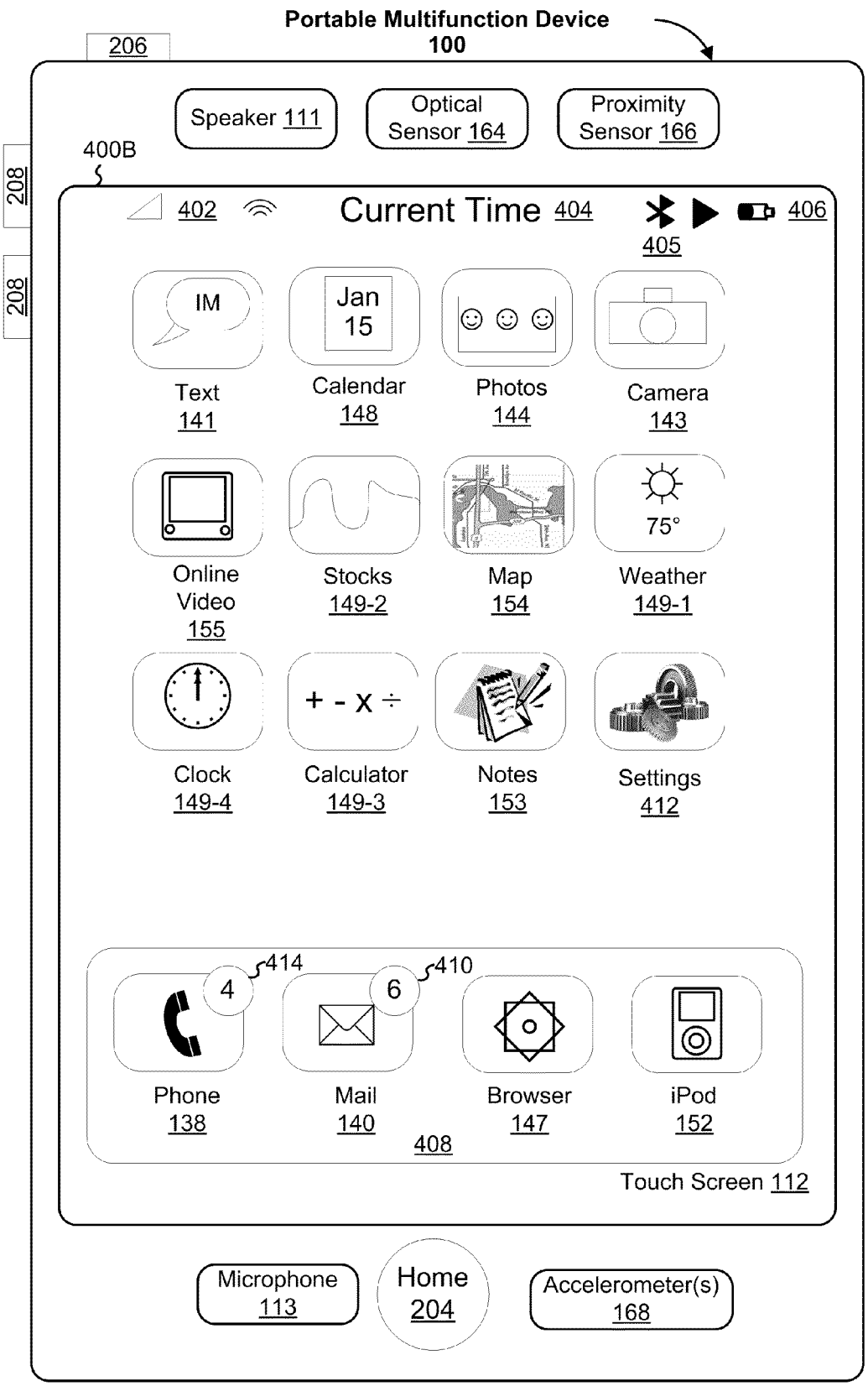

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;

Stocks 149-2;
Workout support 142;
Calendar 148;
Calculator 149-3;
Alarm clock 149-4;
Dictionary 149-5; and
User-created widget 149-6.

In some embodiments, user interface 400B includes the following elements, or a subset or superset thereof:
- 402, 404, 405, 406, 141, 148, 144, 143, 149-3, 149-2, 149-1, 149-4, 410, 414, 138, 140, and 147, as described above;
- Map 154;
- Notes 153;
- Settings 412, which provides access to settings for the device 100 and its various applications 136, as described further below;
- Video and music player module 152, also referred to as iPod (trademark of Apple Inc.) module 152; and
- Online video module 155, also referred to as YouTube (trademark of Google Inc.) module 155.

Figure 4C:
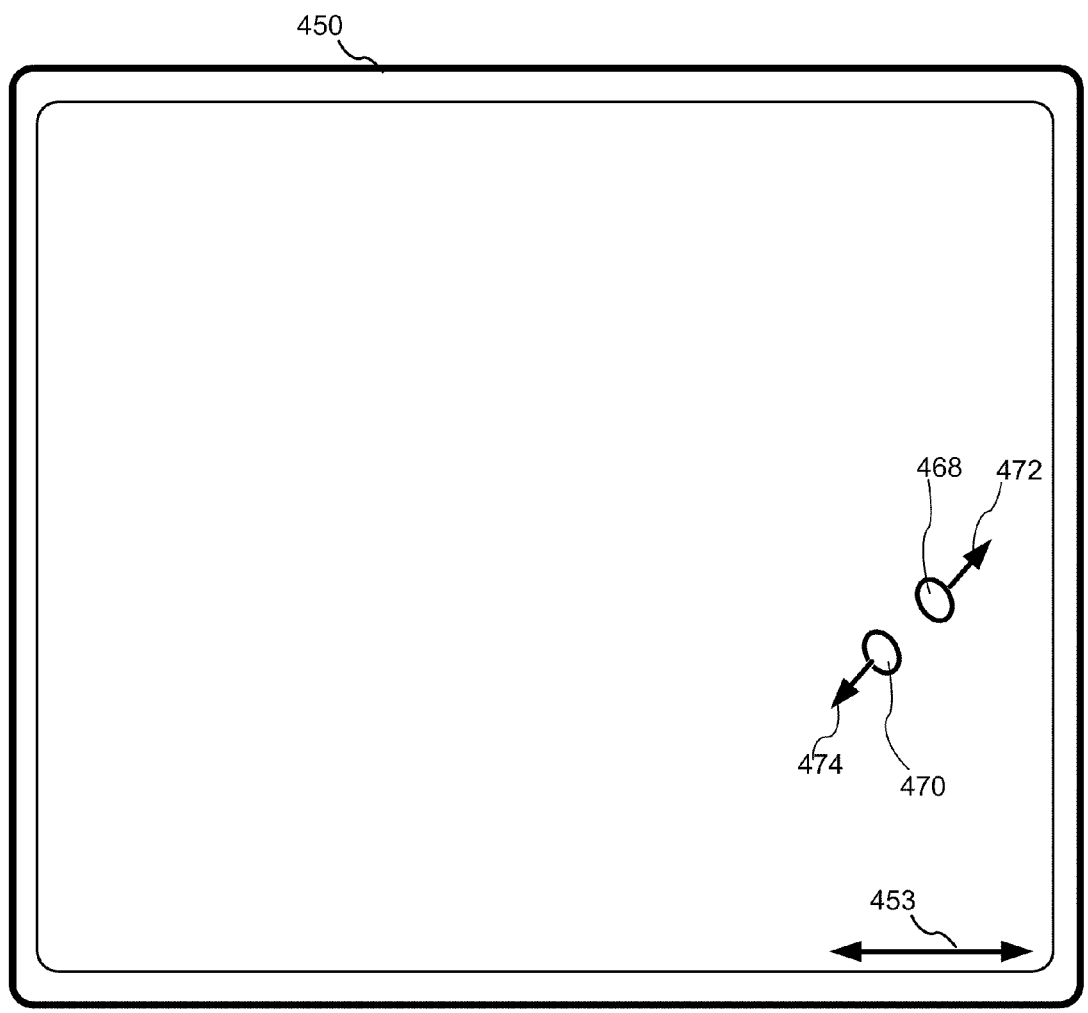
FIG. 4C illustrates an exemplary user interface for a multifunction device with a touch-sensitive surface that is separate from the display in accordance with some embodiments.
Figure 4C:
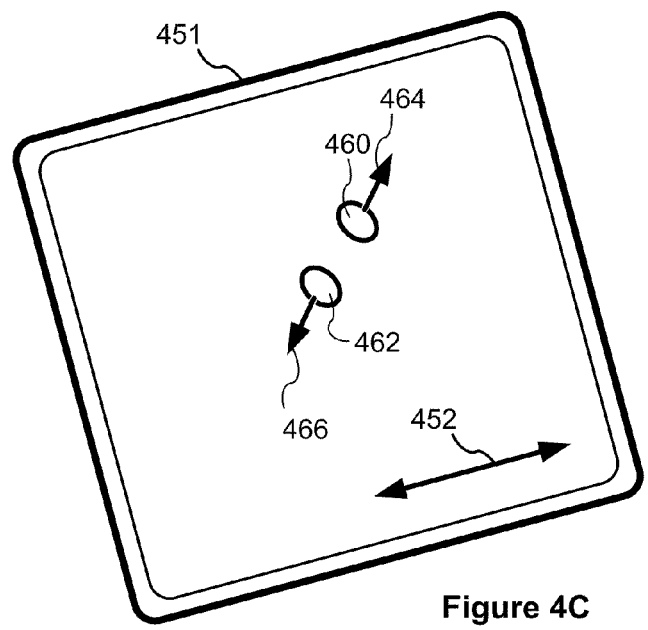

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on a touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462) detected by the device on the touch-sensitive surface (e.g., 451 in FIG. 4C) are used by the device to manipulate the user interface on the display (e.g., 450 in FIG. 4C) of the multifunction device when the touch-sensitive surface and the display are separate. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

FIGS. 5A-5G illustrate exemplary user interfaces for a contextual multi-finger pinch gesture for an application in accordance with some embodiments. The user interfaces in these figures are used to illustrate the processes described below, including the processes in FIGS. 9A-9C.

Figure 5A:
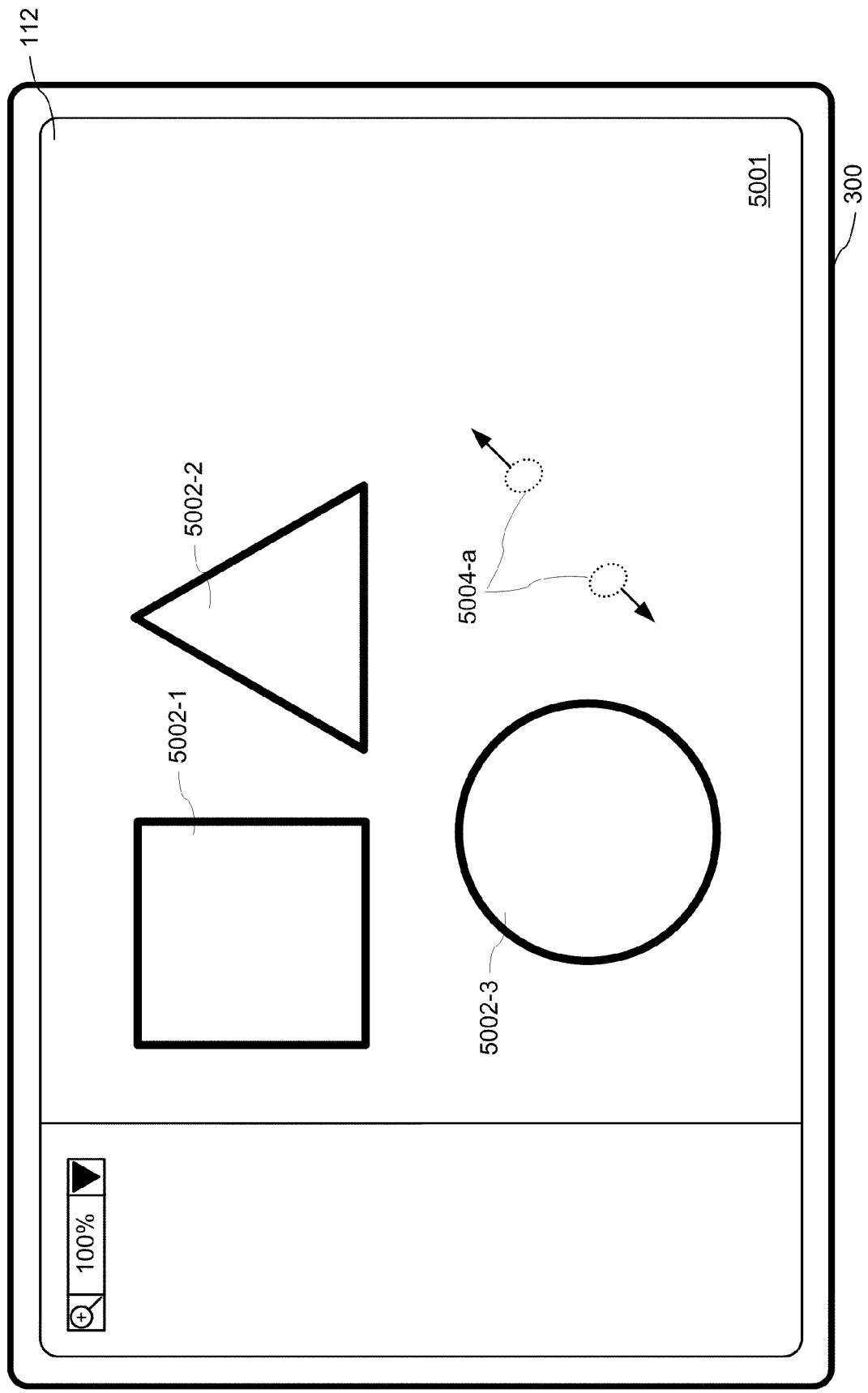
FIGS. 5A-5G illustrate exemplary user interfaces for a contextual multi-finger pinch gesture for an application in accordance with some embodiments.
Figure 5B:
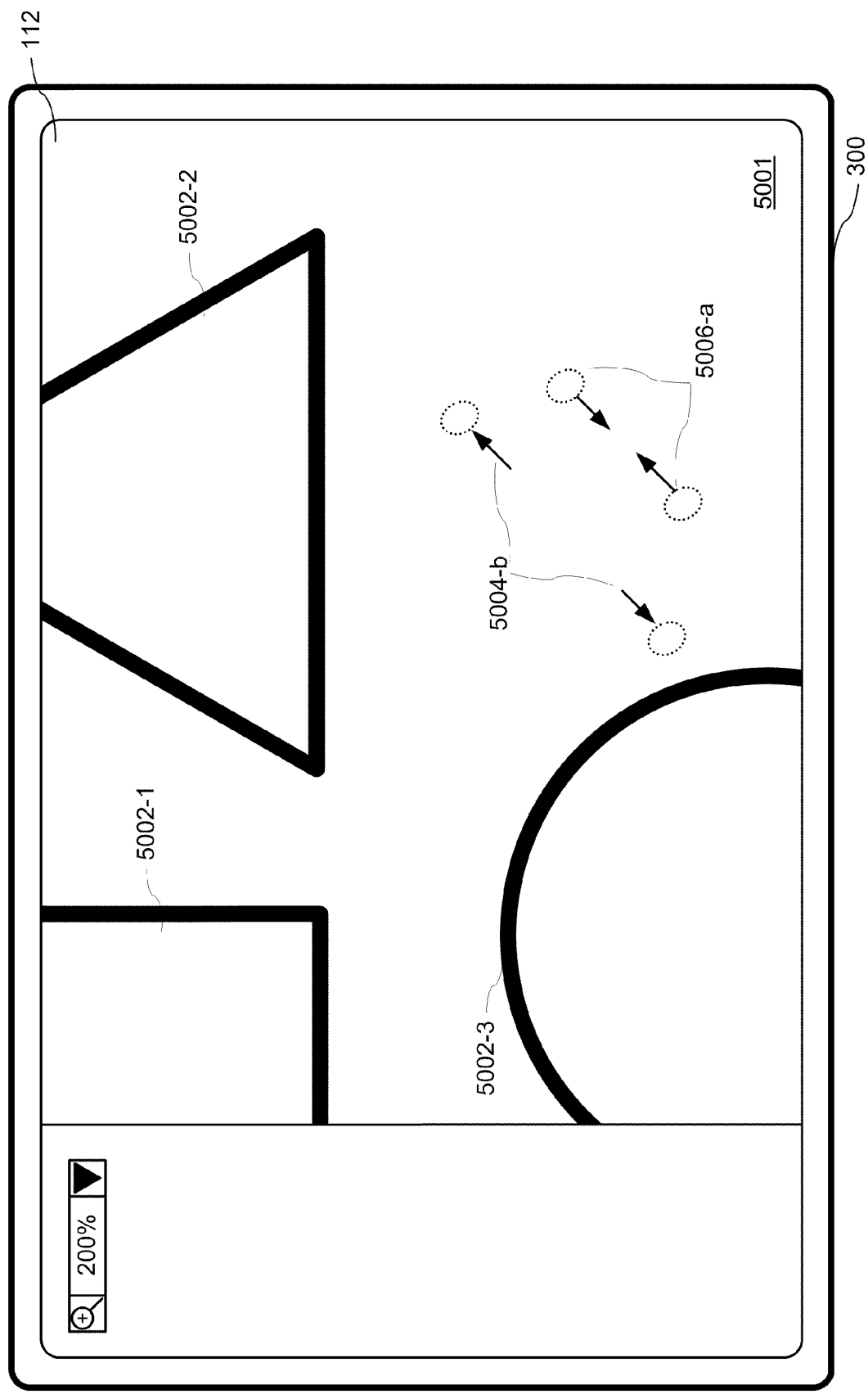

FIGS. 5A and 5B illustrate zooming in to a magnification level (200%) in a first user interface 5001 in an application in response to detecting a two-finger depinch gesture 5004. The first user interface 5001 displays a plurality of user interface objects 5002.

Figure 5C:
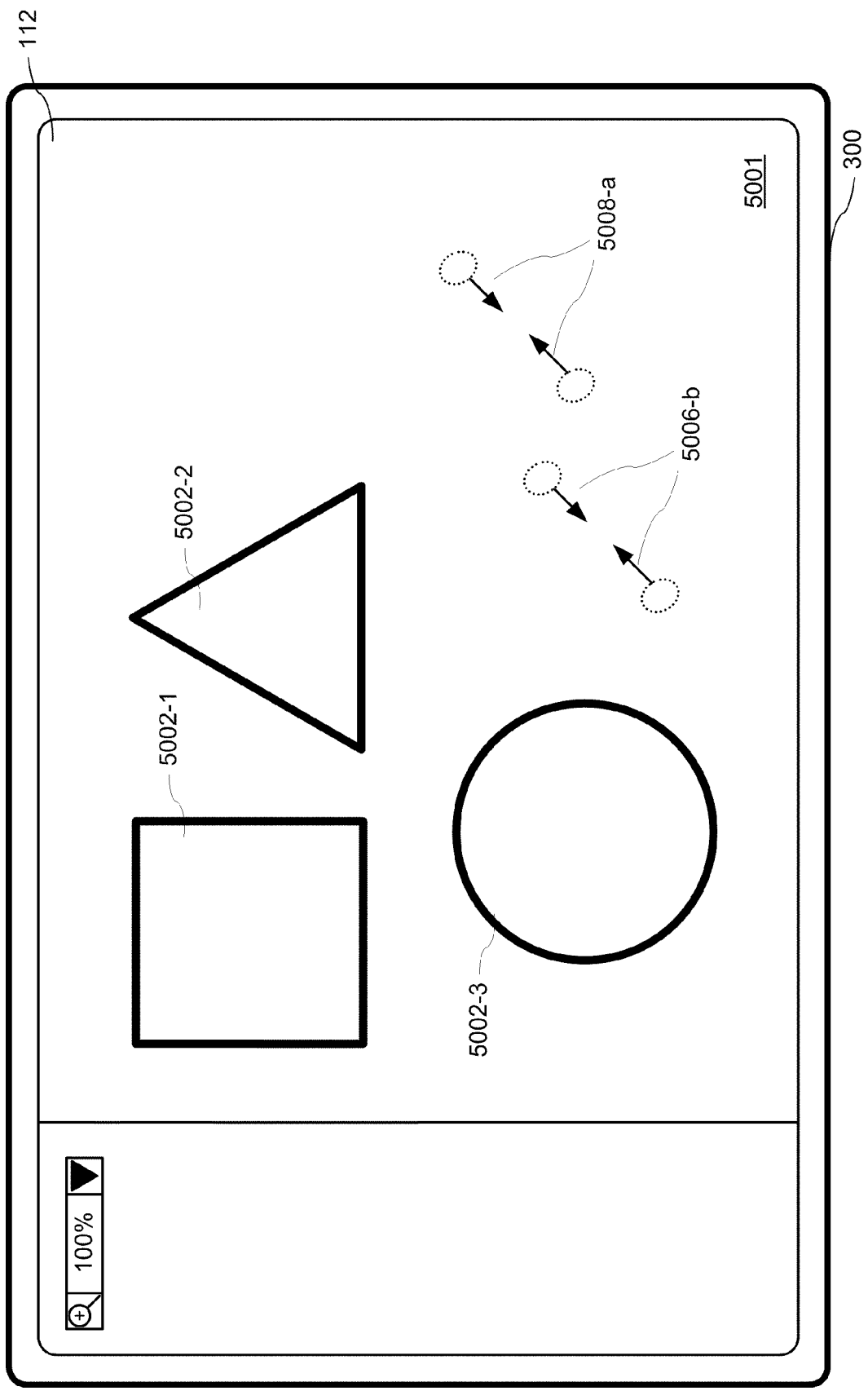

FIGS. 5B and 5C illustrate zooming out to a magnification level (e.g., 100%) in a set of predefined magnification levels in response to detecting a two-finger pinch gesture 5006 (from 5006-a in FIG. 5B to 5006-b in FIG. 5C).

Figure 5D:
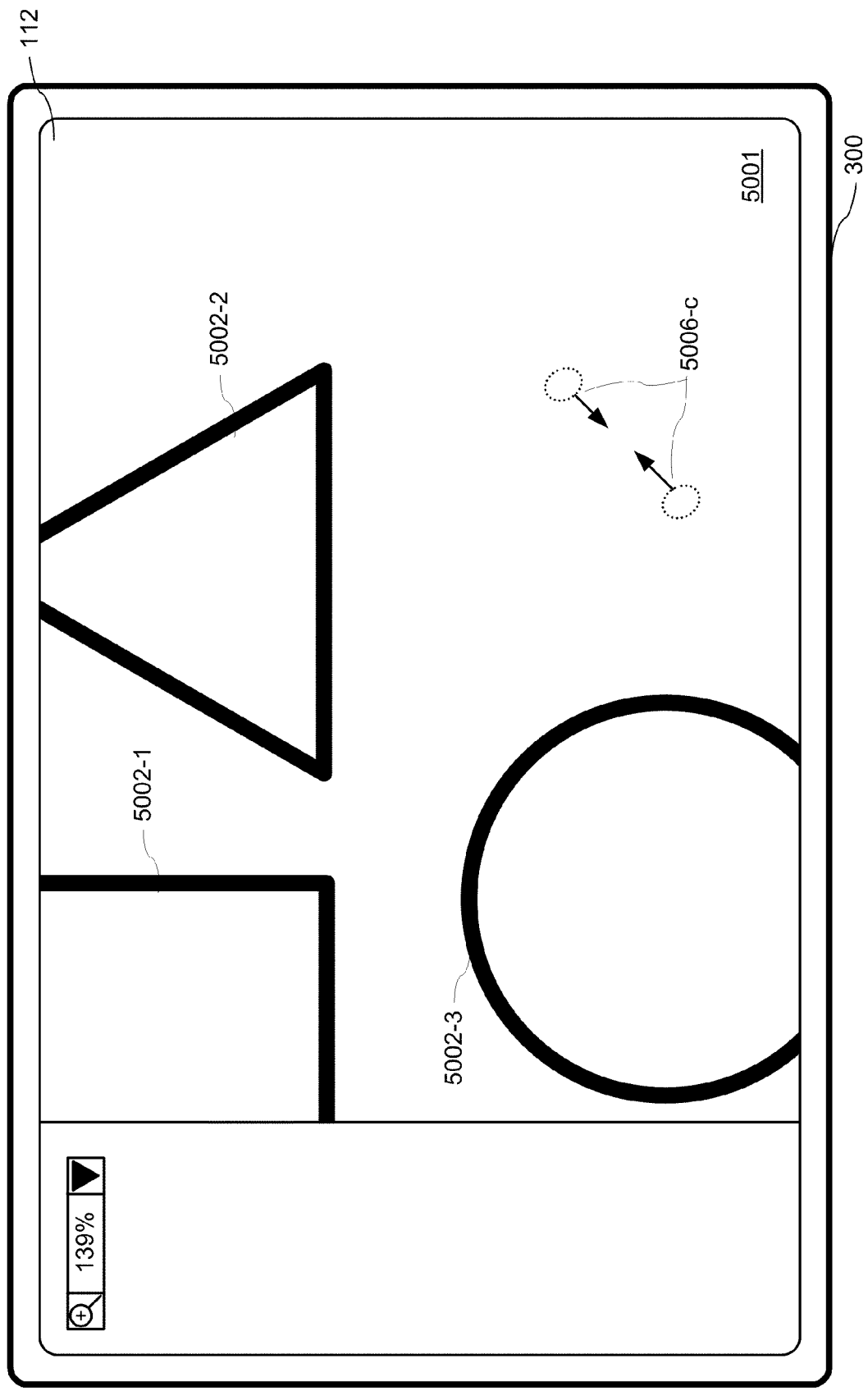

FIGS. 5B and 5D illustrate zooming out to a variable magnification level (e.g., 139%) in response to detecting a two-finger pinch gesture 5006 (from 5006-a in FIG. 5B to 5006-c in FIG. 5D).

Figure 5E:
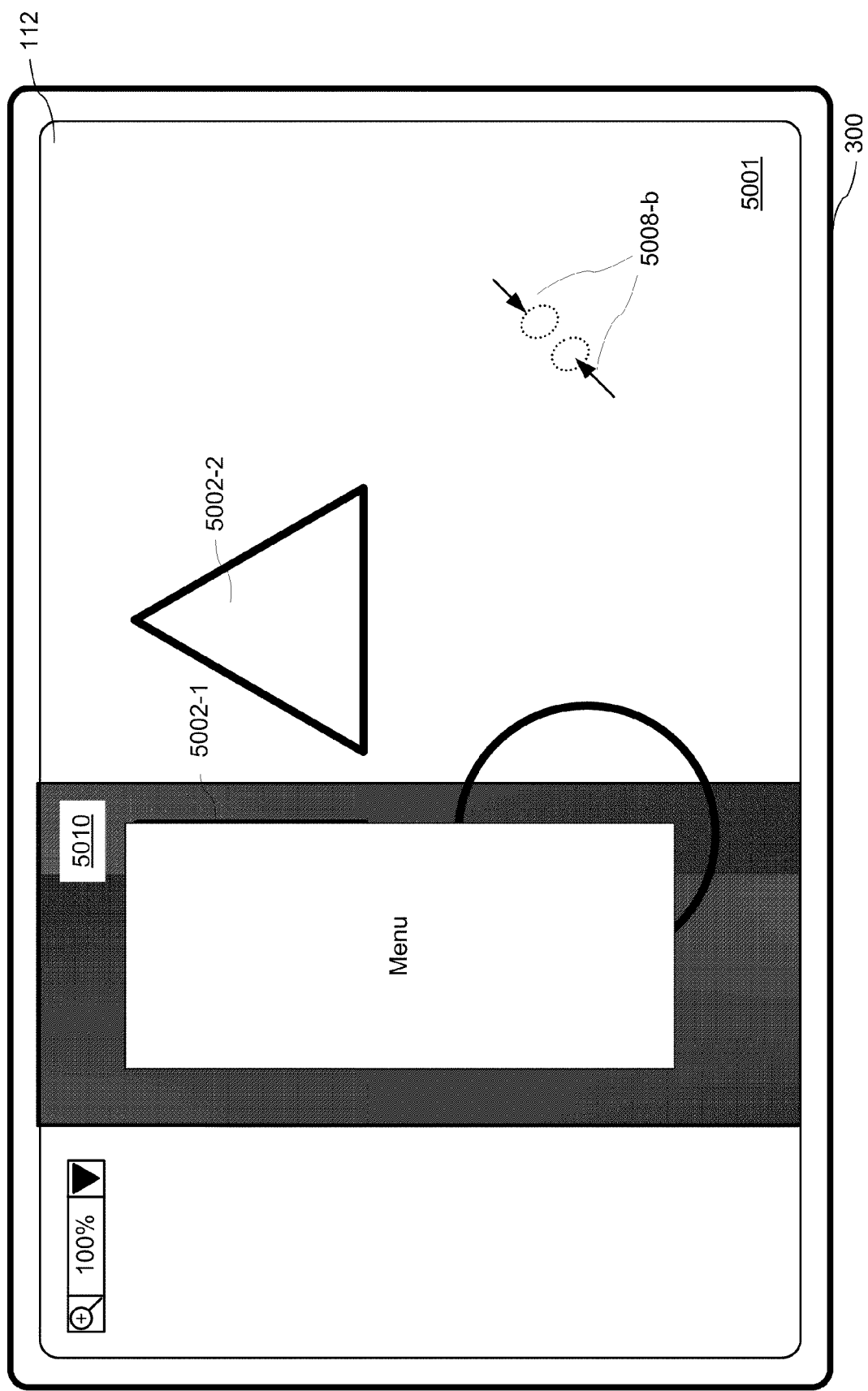

FIGS. 5C and 5E illustrate displaying a second user interface 5010 (e.g., a menu) simultaneously with the first user interface 5001 in response to detecting a multi-finger pinch gesture 5008 (from 5008-a in FIG. 5C to 5008-b in FIG. 5E) when the magnification level is a predefined magnification level (e.g., 100%) for requesting the second user interface 5010 with the multi-finger pinch gesture.

Figure 5F:
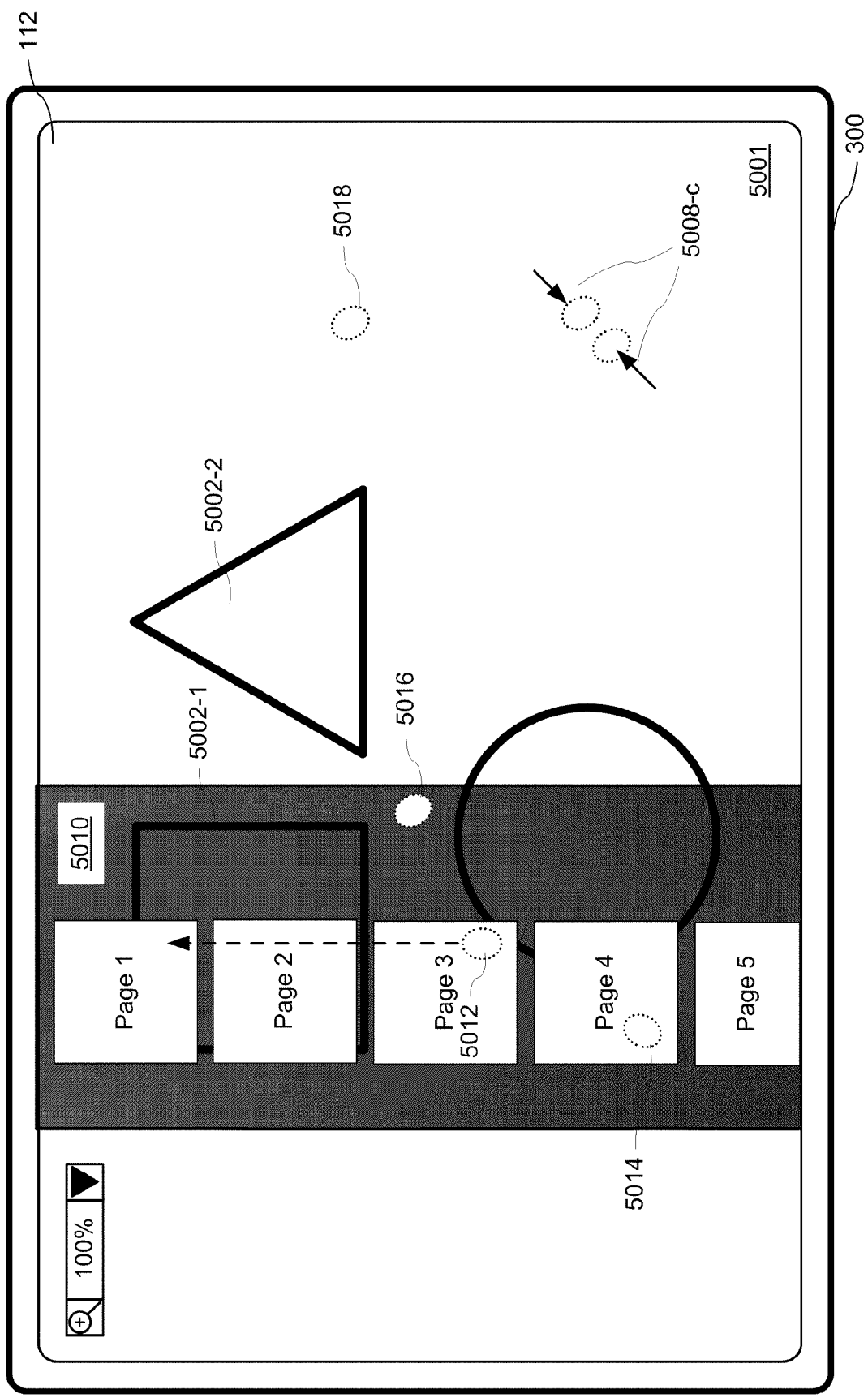

FIGS. 5C and 5F illustrate displaying a second user interface 5010 (e.g., a navigation pane) simultaneously with the first user interface 5001 in response to detecting a multi-finger pinch gesture 5008 (from 5008-a in FIG. 5C to 5008-c in FIG. 5F) when the magnification level is a predefined magnification level (e.g., 100%) for requesting the second user interface 5010 with the multi-finger pinch gesture. Pages in the navigation pane are scrolled in response to detecting a swipe gesture 5012. The navigation pane is dismissed and another page in the application is displayed in response to detecting a gesture (e.g., tap gesture 5014) on a page (e.g., Page 4) in the navigation pane. The navigation pane is dismissed in response to detecting a gesture elsewhere in navigation pane (e.g., tap gesture 5016). The navigation pane is dismissed in response to detecting a gesture in the first user interface 5001 (e.g., tap gesture 5018).

Figure 5G:
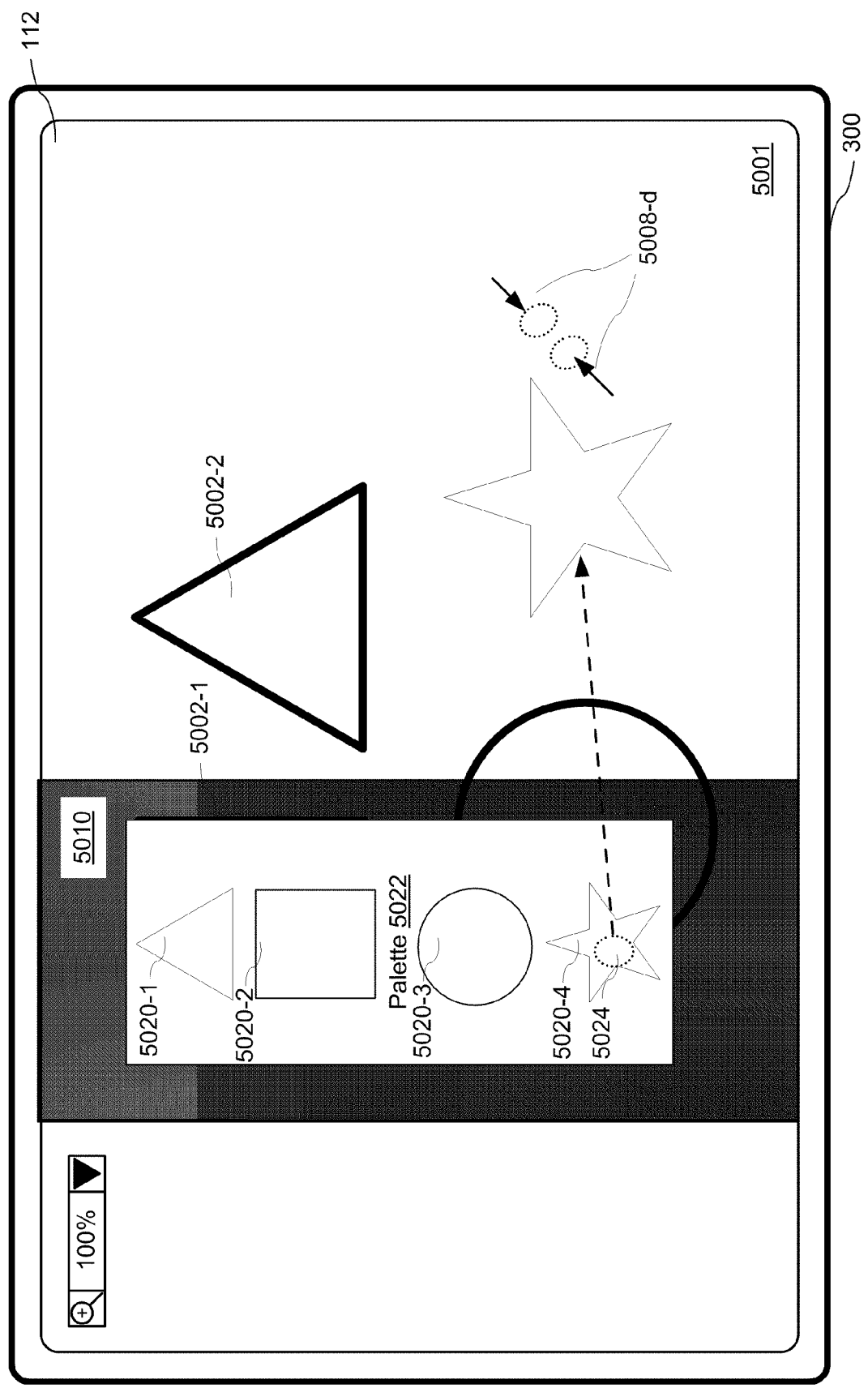

FIGS. 5C and 5G illustrate displaying a second user interface 5010 (e.g., an object palette 5022 with triangle, rectangle, circle, and star objects 5020) simultaneously with the first user interface 5001 in response to detecting a multi-finger pinch gesture 5008 (from 5008-a in FIG. 5C to 5008-d in FIG. 5G) when the magnification level is a predefined magnification level (e.g., 100%) for requesting the second user interface 5010 with the multi-finger pinch gesture. An object (e.g., star 5020-4) is inserted into the first user interface 5001 in response to detecting a gesture (e.g., a tap and drag gesture 5024) on the object in the object palette FIGS. 6A-6E illustrate exemplary user interfaces for object modification in response to time-sensitive two-contact gestures in accordance with some embodiments. The user interfaces in these figures are used to illustrate the processes described below, including the processes in FIGS. 10A-10C.

Figure 6A:
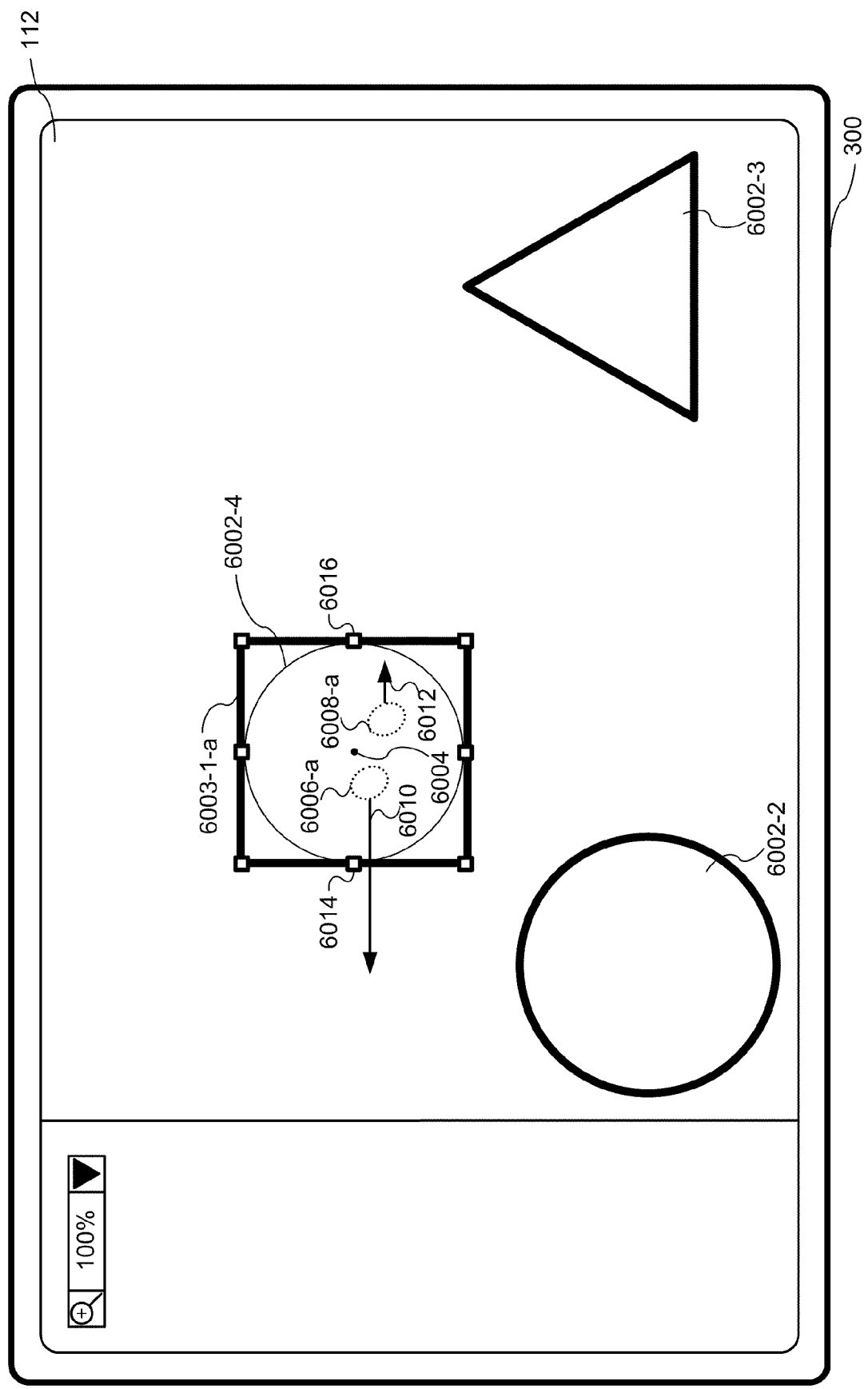
FIGS. 6A-6E illustrate exemplary user interfaces for object modification in response to time-sensitive two-contact gestures in accordance with some embodiments.
Figure 6B:
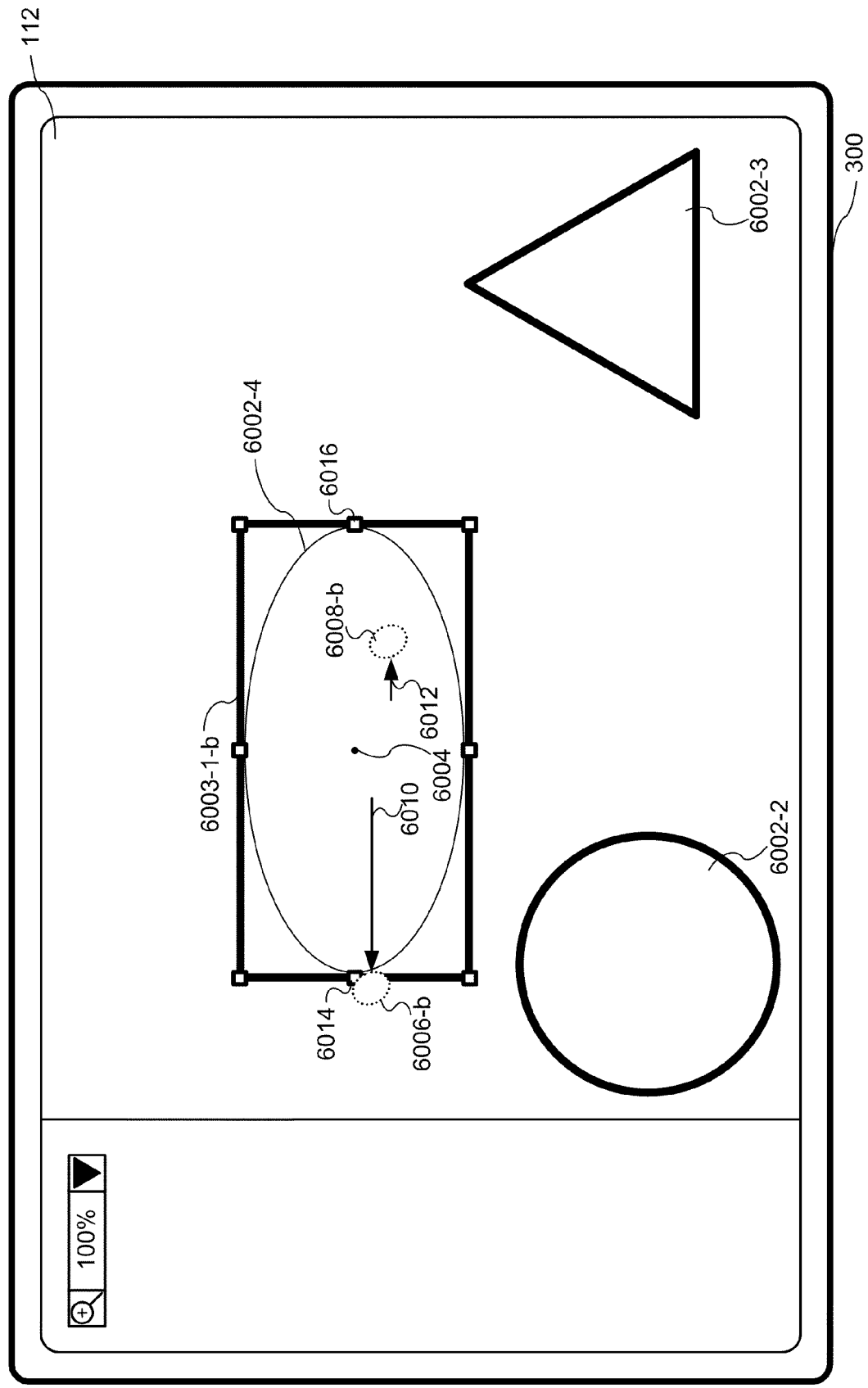

FIGS. 6A and 6B illustrate exemplary user interfaces for symmetrically resizing a first user interface object in a bounding box 6003-1 in one dimension around an initial centroid 6004 of the user interface object. The device displays a plurality of user interface objects 6002 including a currently selected user interface object having a bounding box 6003-1-a that is displayed with resizing handles. The device detects a first contact 6006-a at a location on the touch screen display 112 that is associated with the bounding box 6003-1 for a first user interface object at a first time, and detects a first contact 6008-*a* at a location on the touch screen display 112 that is associated with the bounding box 6003-1 for the first user interface object at a second time in FIG. 6A. In response to detecting a two-contact gesture by the two contacts (e.g., a de-pinch gesture including the movement 6010 of the first contact from a first location 6006-*a* to a second location 6006-*b* in FIG. 6B, and the movement 6012 of the second contact from a first location 6008-*a* to a second location 6008-*b* in FIG. 6B), when the difference between the first time and the second time is less than a predefined amount (e.g., 0.05 seconds, 0.1 seconds, 0.2 seconds), the first user interface object is symmetrically resized in one dimension (e.g., horizontally) around the initial centroid 6004 of the user interface object, as illustrated by the resized bounding box 6003-1-*b* for the resized user interface object in FIG. 6B. In other words, the centroid of the resized user interface object in FIG. 6B is collocated with the initial centroid 6004, even though the user interface object has been resized horizontally, and despite the asymmetrical nature of the movement (e.g., 6010 or 6012) of the contacts (e.g., 6006 and 6008).

Figure 6C:
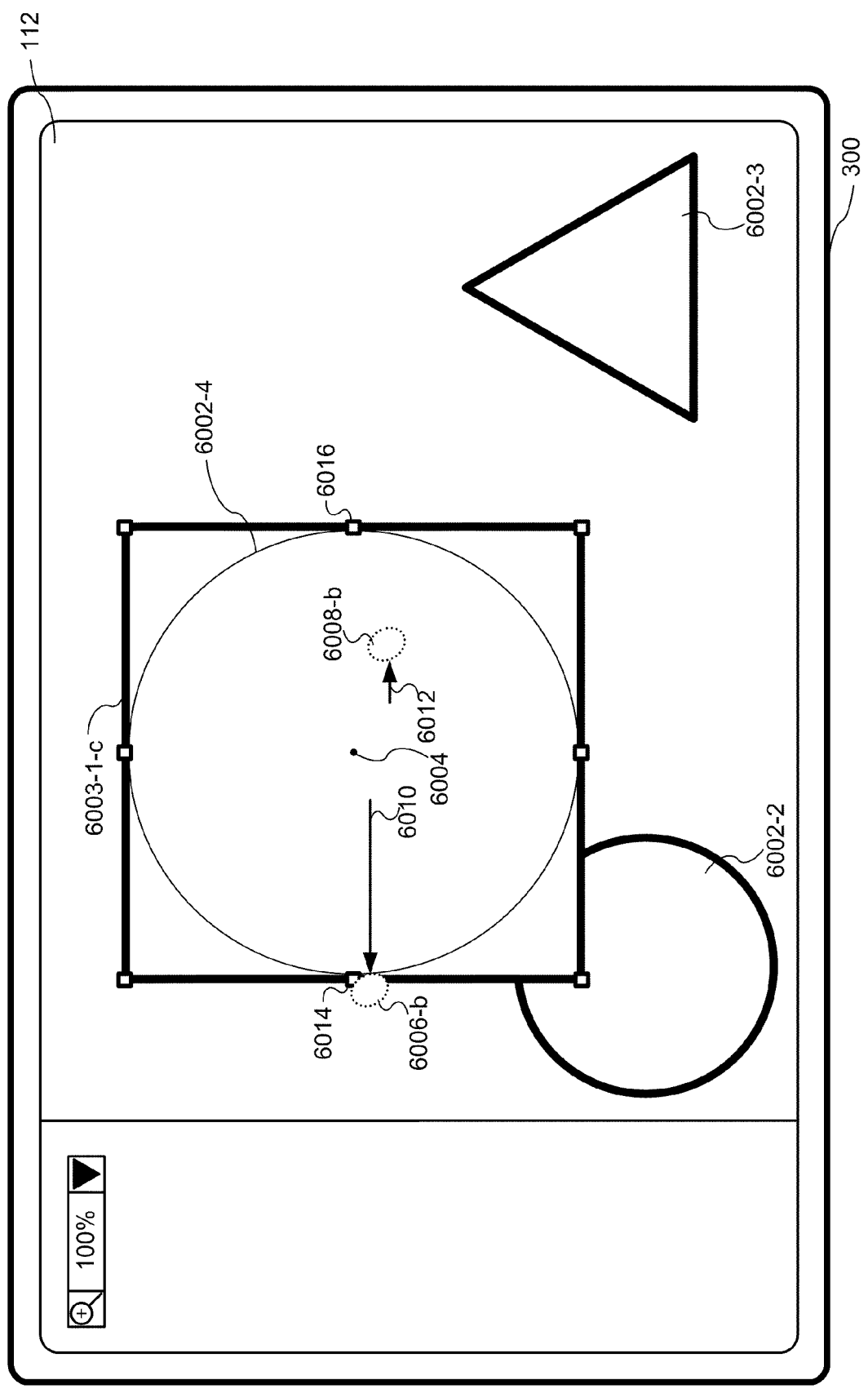

FIGS. 6A and 6C illustrate exemplary user interfaces for symmetrically resizing a bounding box 6003-1 for a first user interface object in two dimensions around an initial centroid 6004 of the user interface object. The device displays a plurality of user interface objects 6002 including a currently selected first user interface object having a bounding box 6003-1-*a* that is displayed with resizing handles. The device detects a first contact 6006-*a* at a location on the touch screen display 112 that is associated with the bounding box 6003-1 for the first user interface object at a first time, and detects a first contact 6008-*a* at a location on the touch screen display 112 that is associated with the bounding box 6003-1 for the first user interface object at a second time in FIG. 6A. In response to detecting a two contact gesture by the two contacts (e.g., a de-pinch gesture including the movement 6010 of the first contact from a first location 6006-*a* to a second location 6006-*b* in FIG. 6C, and the movement 6012 of the second contact from a first location 6008-*a* to a second location 6008-*b* in FIG. 6C), when the difference between the first time and the second time is less than the predefined amount, and the first user interface object is symmetrically resized in two dimensions (e.g., horizontally and vertically) around the initial centroid 6004 of the user interface object, as illustrated by the resized bounding box 6003-1-*c* for the resized user interface object in FIG. 6C. In other words, the centroid of the resized bounding box 6003-1-*c* for the resized user interface object in FIG. 6C is collocated with the initial centroid 6004, even though the user interface object has been resized horizontally and vertically, and despite the asymmetrical nature of the movement (e.g., 6010 or 6012) of the contacts (e.g., 6006 and 6008).

Figure 6D:
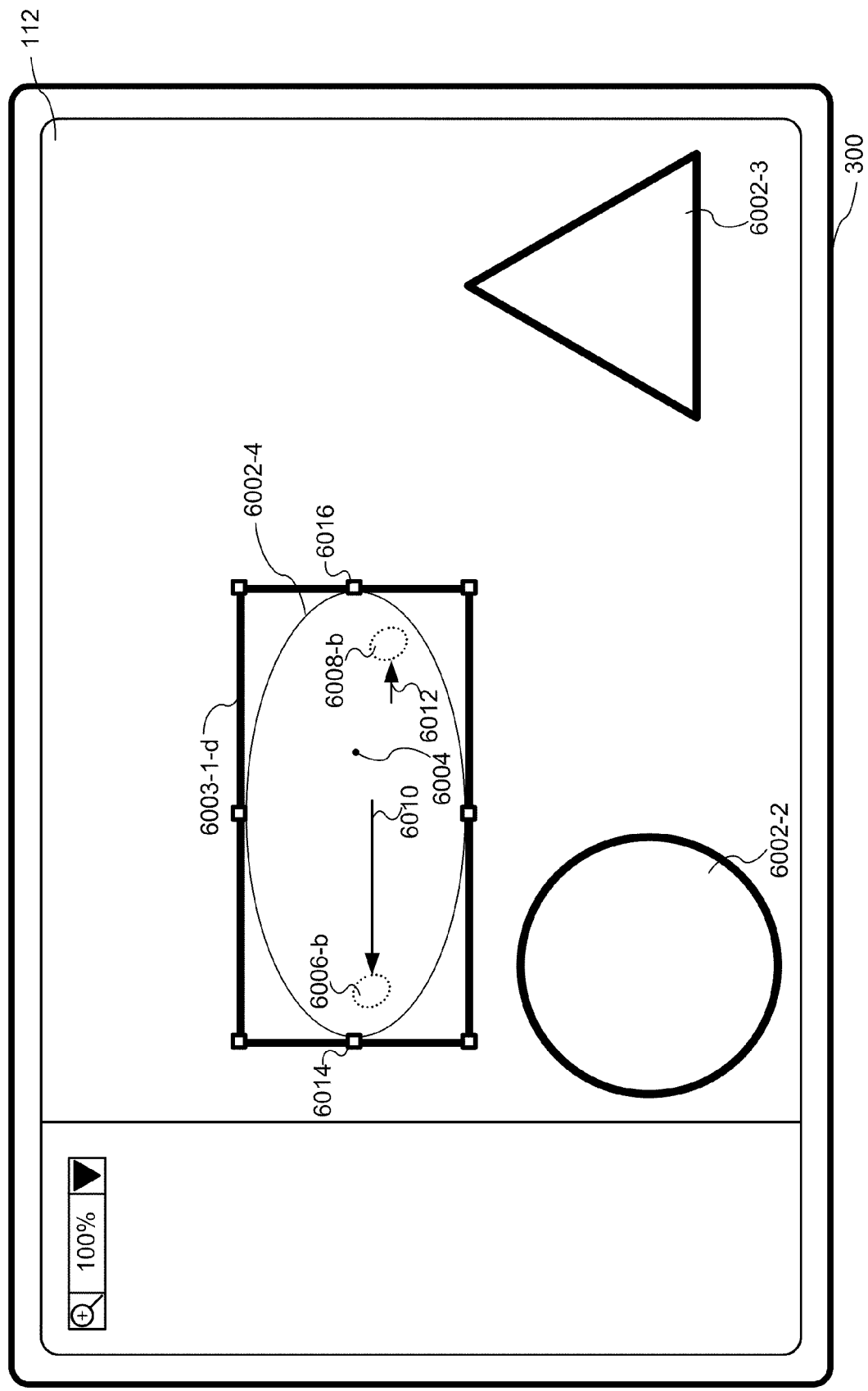

FIGS. 6A and 6D illustrate exemplary user interfaces for asymmetrically resizing a bounding box 6003-1 for the first user interface object in one dimension around an initial centroid 6004 of the user interface object. The device displays a plurality of user interface objects 6002 including a currently selected first user interface object having a bounding box 6003-1-*a* that is displayed with resizing handles. The device detects a first contact 6006-*a* at a location on the touch screen display 112 that is associated with the bounding box 6003-1 for the first user interface object at a first time, and detects a first contact 6008-*a* at a location on the touch screen display 112 that is associated with the bounding box 6003-1 for the first user interface object at a second time in FIG. 6A. In response to detecting a two-contact gesture by the two contacts (e.g., a de-pinch gesture including the movement 6010 of the first contact from a first location 6006-*a* to a second location 6006-*b* in FIG. 6D, and the movement 6012 of the second contact from a first location 6008-*a* to a second location 6008-*b* in FIG. 6D), when the difference between the first time and the second time is greater than the predefined amount, and the first user interface object is asymmetrically resized in one dimension (e.g., horizontally) around the initial centroid 6004 of the user interface object, as illustrated by the resized bounding box 6003-1-*d* for the resized user interface object in FIG. 6D. In other words, the centroid of the resized bounding box 6003-1-*d* for the resized user interface object in FIG. 6D is displaced from the initial centroid 6004 horizontally in accordance with the asymmetrical nature of the movement (e.g., 6010 or 6012) of the contacts (e.g., 6006 and 6008).

Figure 6E:
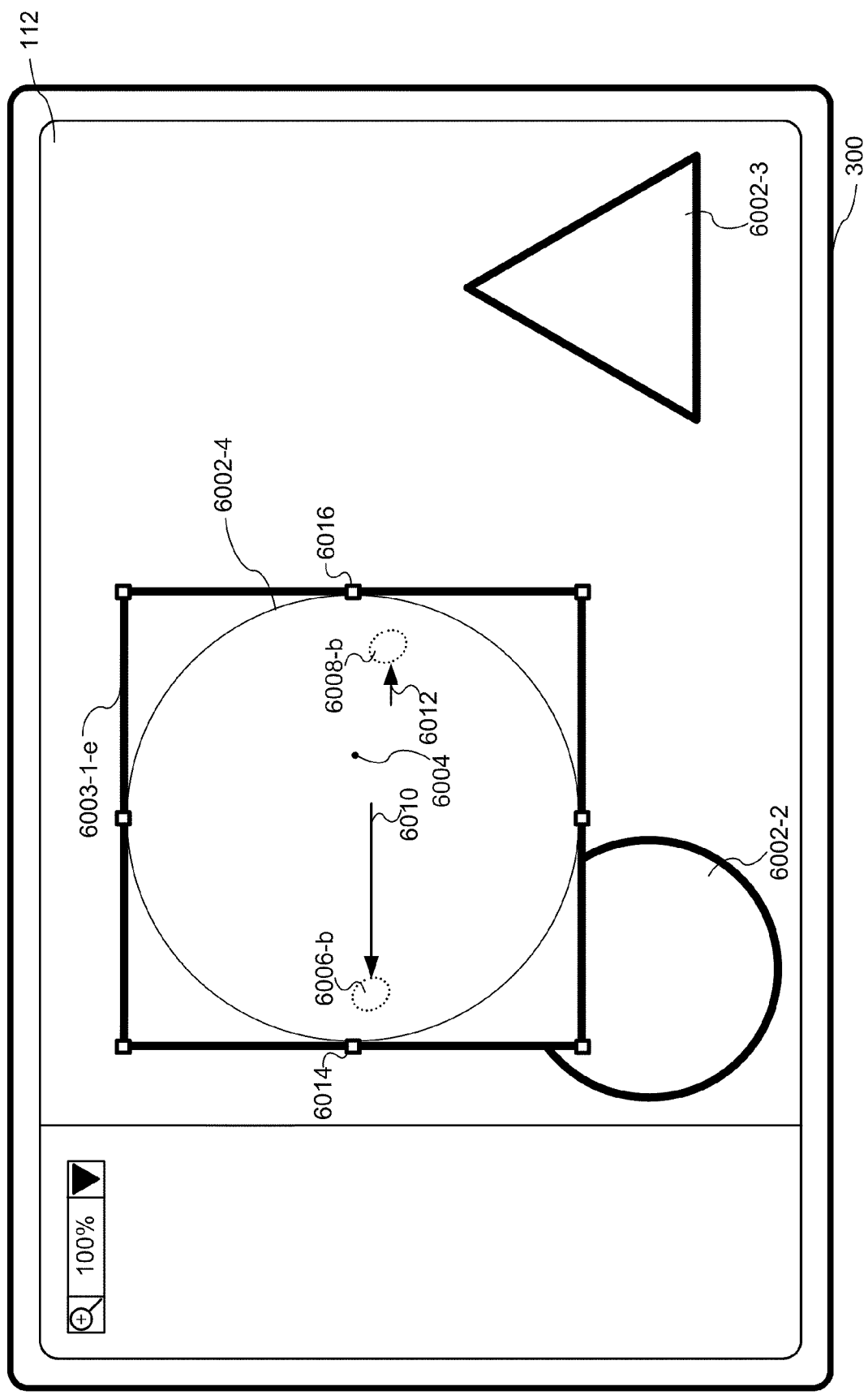

FIGS. 6A and 6E illustrate exemplary user interfaces for asymmetrically resizing a bounding box 6003-1 for a first user interface object in two dimensions around an initial centroid 6004 of the user interface object. The device displays a plurality of user interface objects 6002 including a currently selected first user interface object having a bounding box 6003-1-*a* that is displayed with resizing handles. The device detects a first contact 6006-*a* at a location on the touch screen display 112 that is associated with the bounding box 6003-1 for the first user interface object at a first time, and detects a first contact 6008-*a* at a location on the touch screen display 112 that is associated with the bounding box 6003-1 for the first user interface object at a second time in FIG. 6A. In response to detecting a two contact gesture by the two contacts (e.g., a de-pinch gesture including the movement 6010 of the first contact from a first location 6006-*a* to a second location 6006-*b* in FIG. 6E, and the movement 6012 of the second contact from a first location 6008-*a* to a second location 6008-*b* in FIG. 6E), when the difference between the first time and the second time is greater than the predefined amount, and the first user interface object is asymmetrically resized in two dimensions (e.g., horizontally and vertically) around the initial centroid 6004 of the user interface object, as illustrated by the resized bounding box 6003-1-*e* for the resized user interface object in FIG. 6E. In other words, the centroid of the resized bounding box 6003-1-*e* for the resized user interface object in FIG. 6E is displaced from the initial centroid 6004 horizontally and/or vertically, in accordance with the asymmetrical nature of the movement (e.g., 6010 or 6012) of the contacts (e.g., 6006 and 6008). Although in the present example, the centroid of the resized bounding box 6003-1-*e* for the resized user interface object in FIG. 6E is only displaced from the initial centroid 6004 horizontally, it should be understood that if there were an asymmetrical vertical component to the movement (e.g., 6010 or 6012) of the contacts (e.g., 6006 and 6008), the centroid of the resized bounding box 6003-1-*e* for the resized user interface object in FIG. 6E would be displaced from the initial centroid 6004 vertically as well as horizontally, in accordance with the asymmetrical nature of the vertical component of the movement.

FIGS. 7A-7K illustrate exemplary user interfaces for snapping an object to a plurality of aspect ratios, including a current aspect ratio and a native aspect ratio, in accordance with some embodiments. The user interfaces in these figures are used to illustrate the processes described below, including the processes in FIGS. 11A-11B.

Figure 7A:
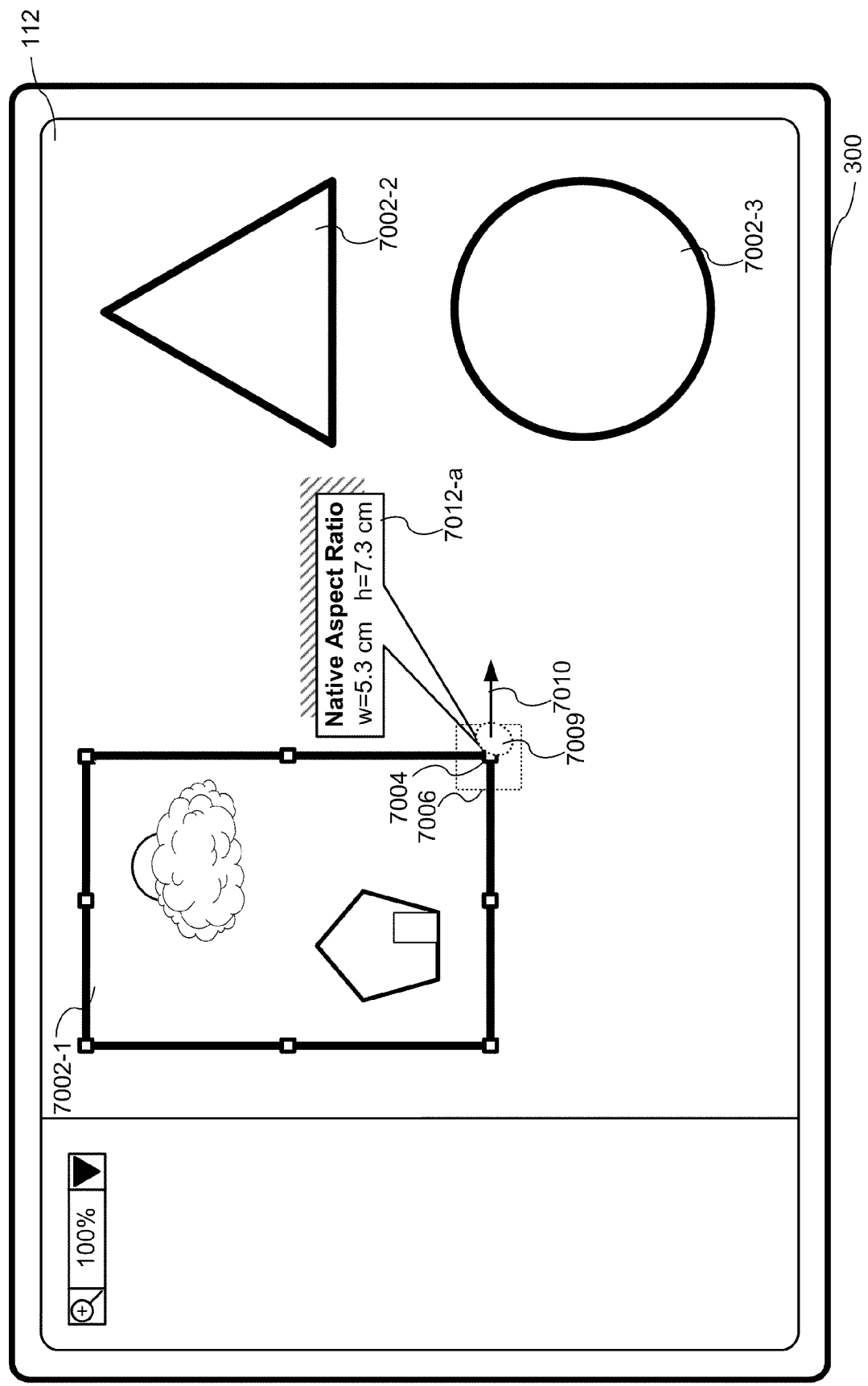
FIGS. 7A-7K illustrate exemplary user interfaces for snapping an object to a plurality of aspect ratios, including a current aspect ratio and a native aspect ratio, in accordance with some embodiments.
Figure 7B:
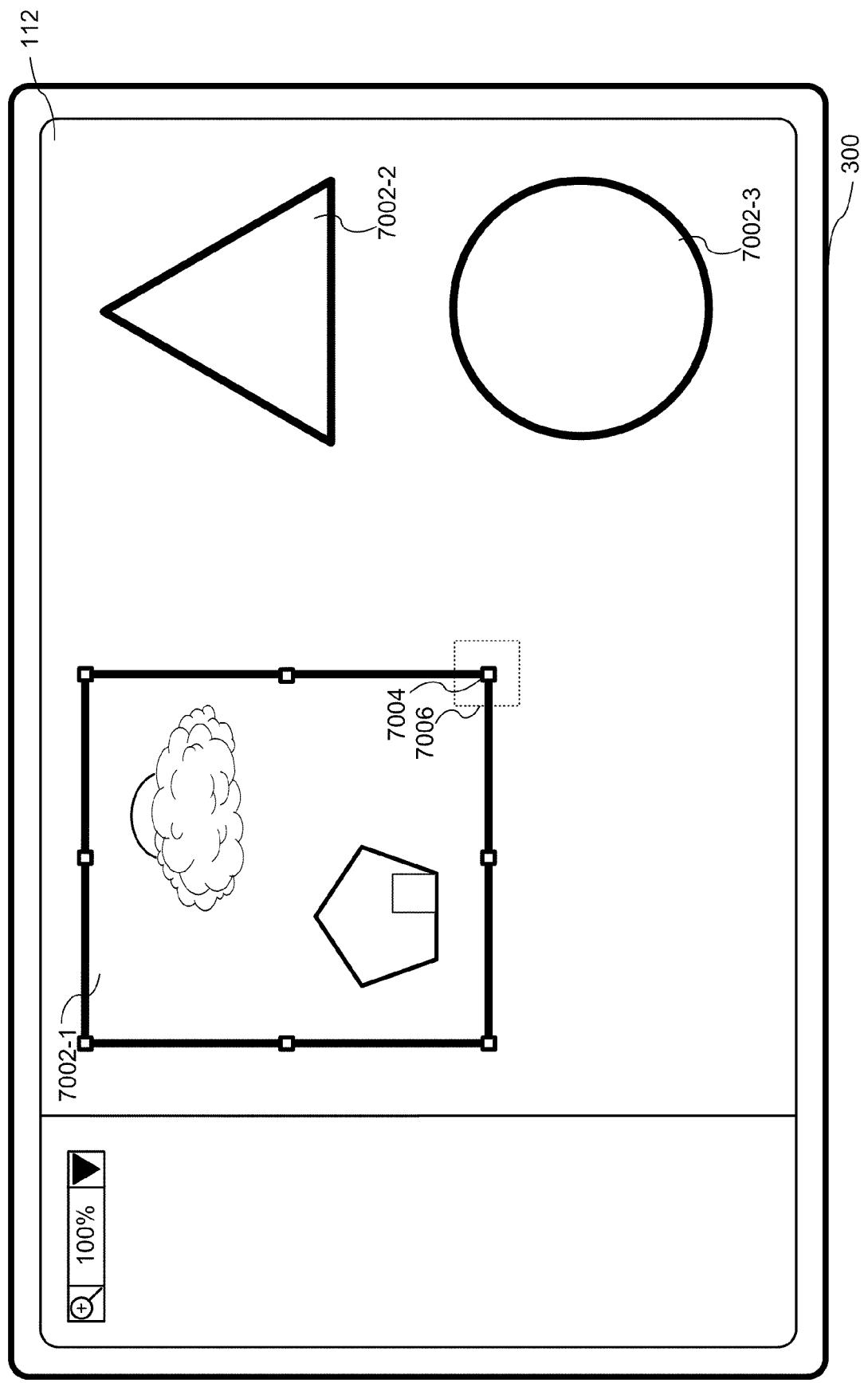

FIGS. 7A-7B illustrate exemplary user interfaces for displaying a plurality of user interface objects 7002 including a interface object that is initially displayed at a native aspect ratio and has a handle 7004 with an activation region 7006 associated with the handle. The user interface object 7002-1 is resized in response to a swipe gesture 7010 with the activation region 7006 associated with the handle, while displaying an indicator 7012 of the instantaneous aspect ratio of the user interface object 7002-1.

Figure 7C:
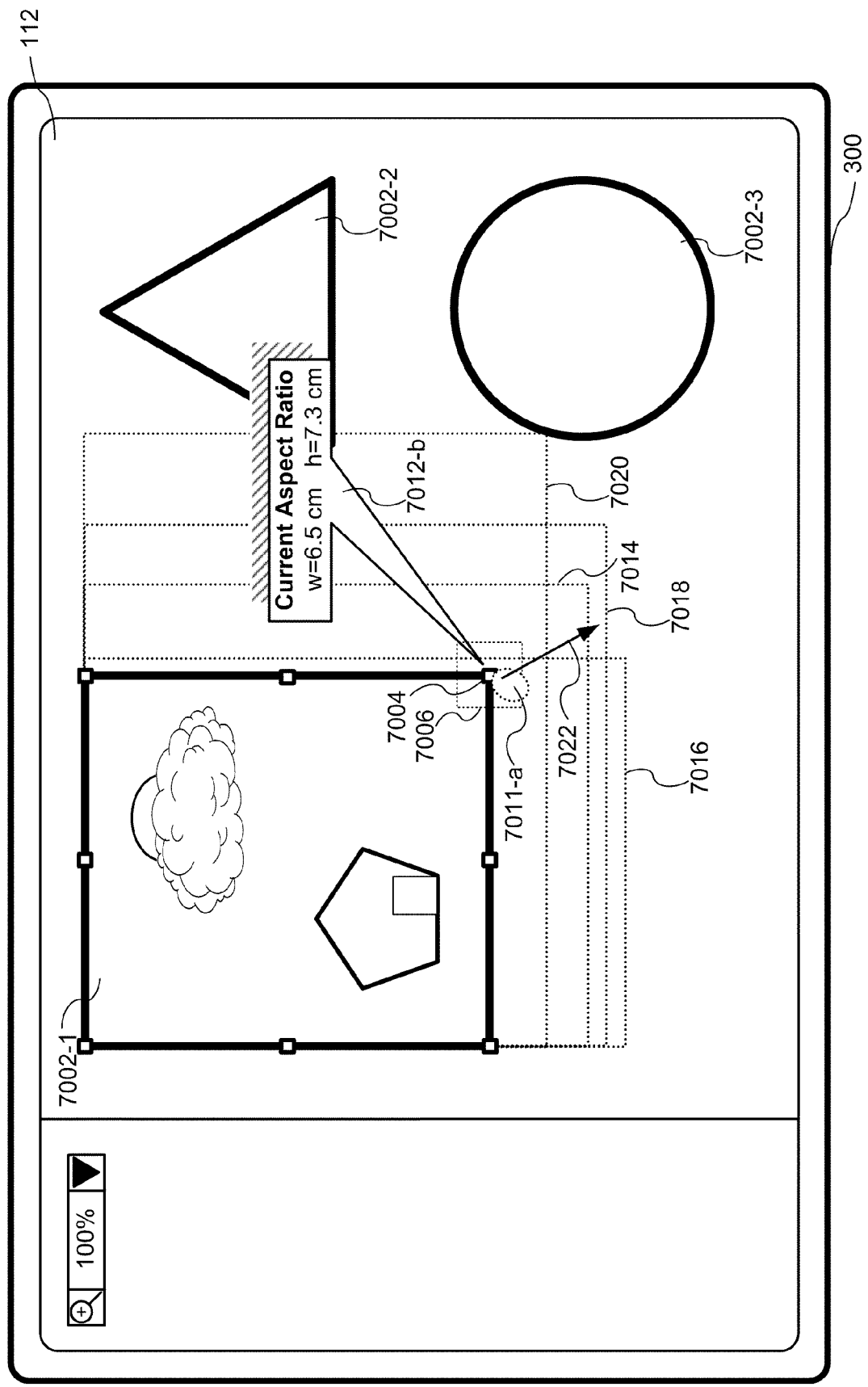
Figure 7D:
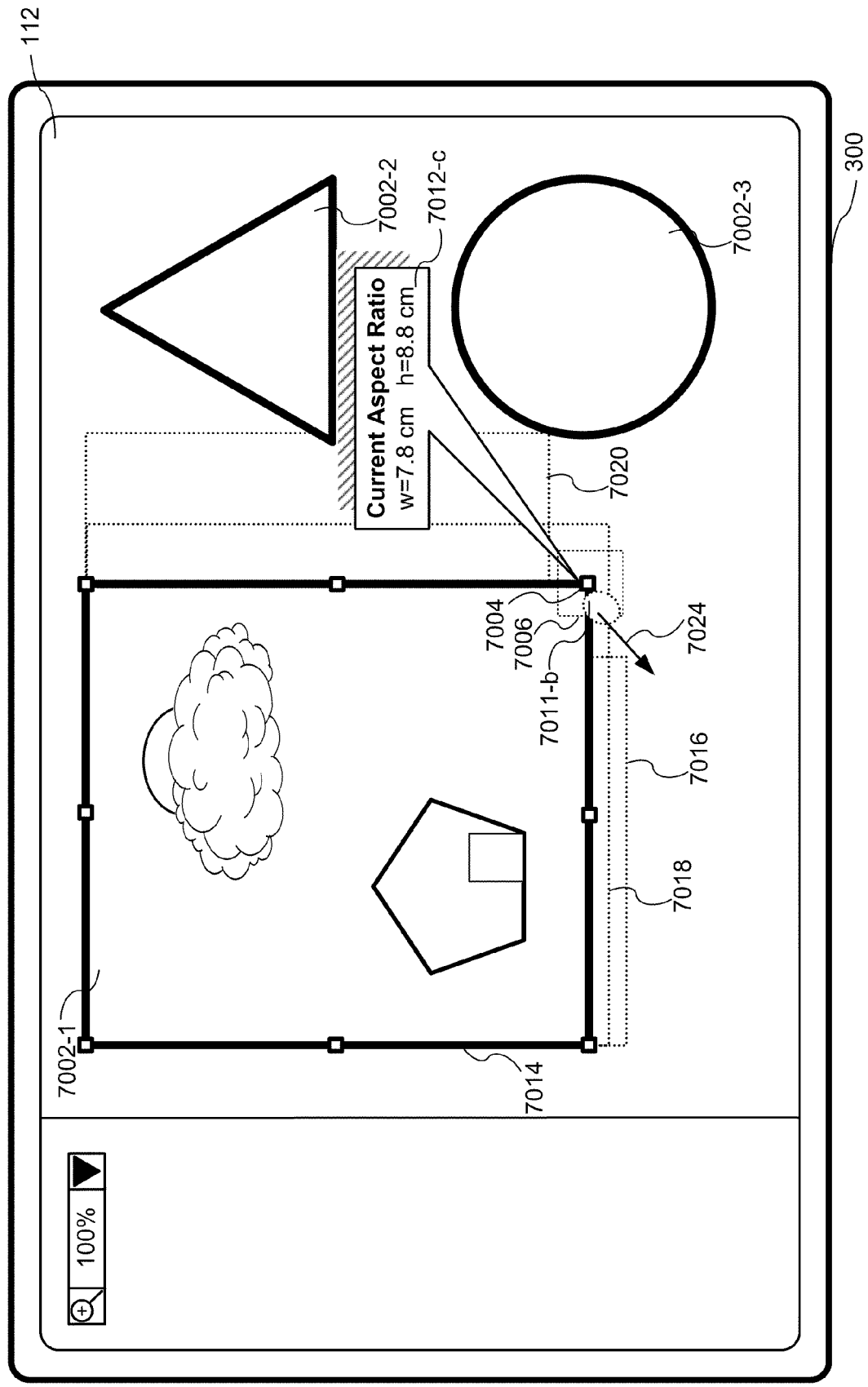
Figure 7E:
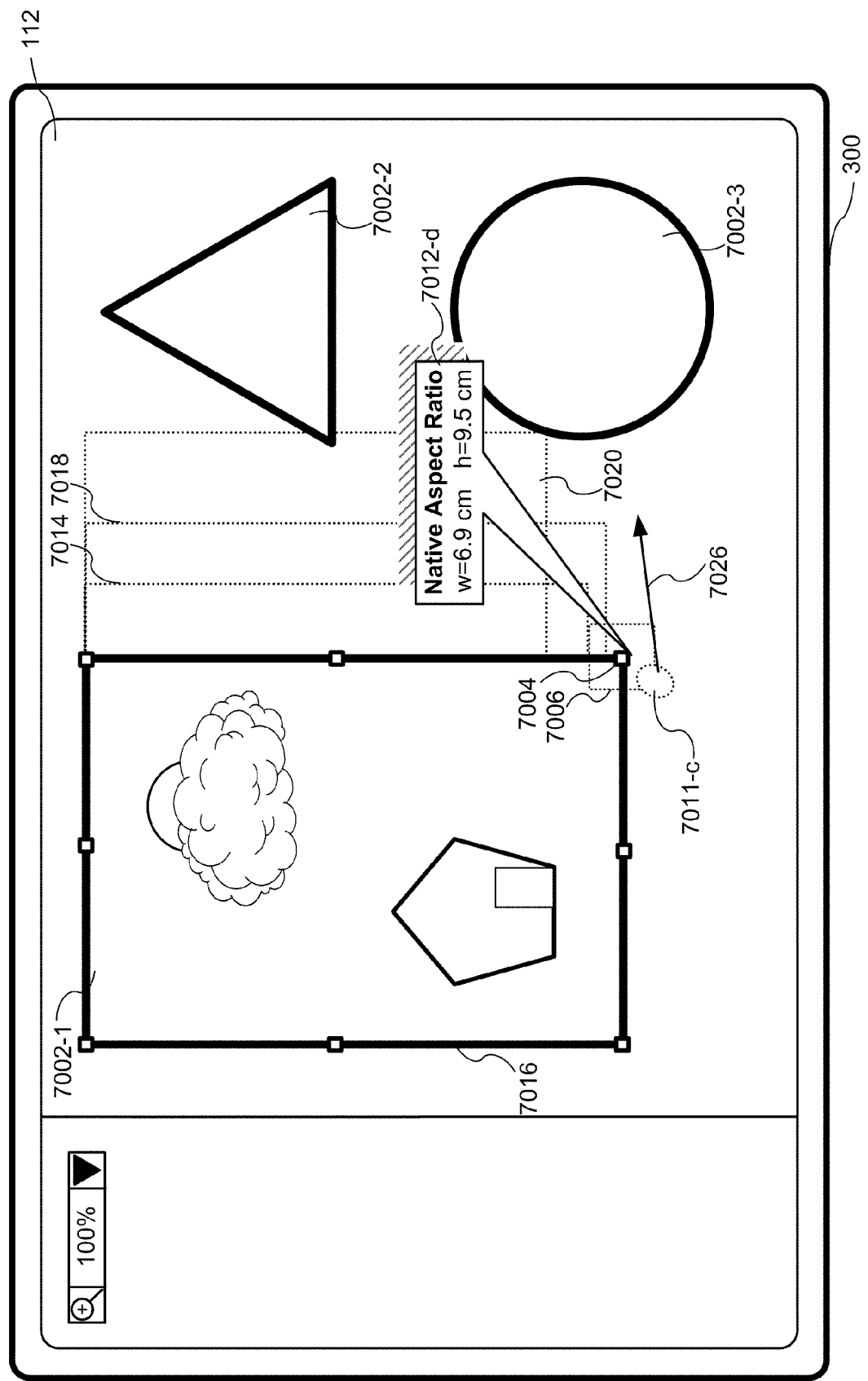
Figure 7F:
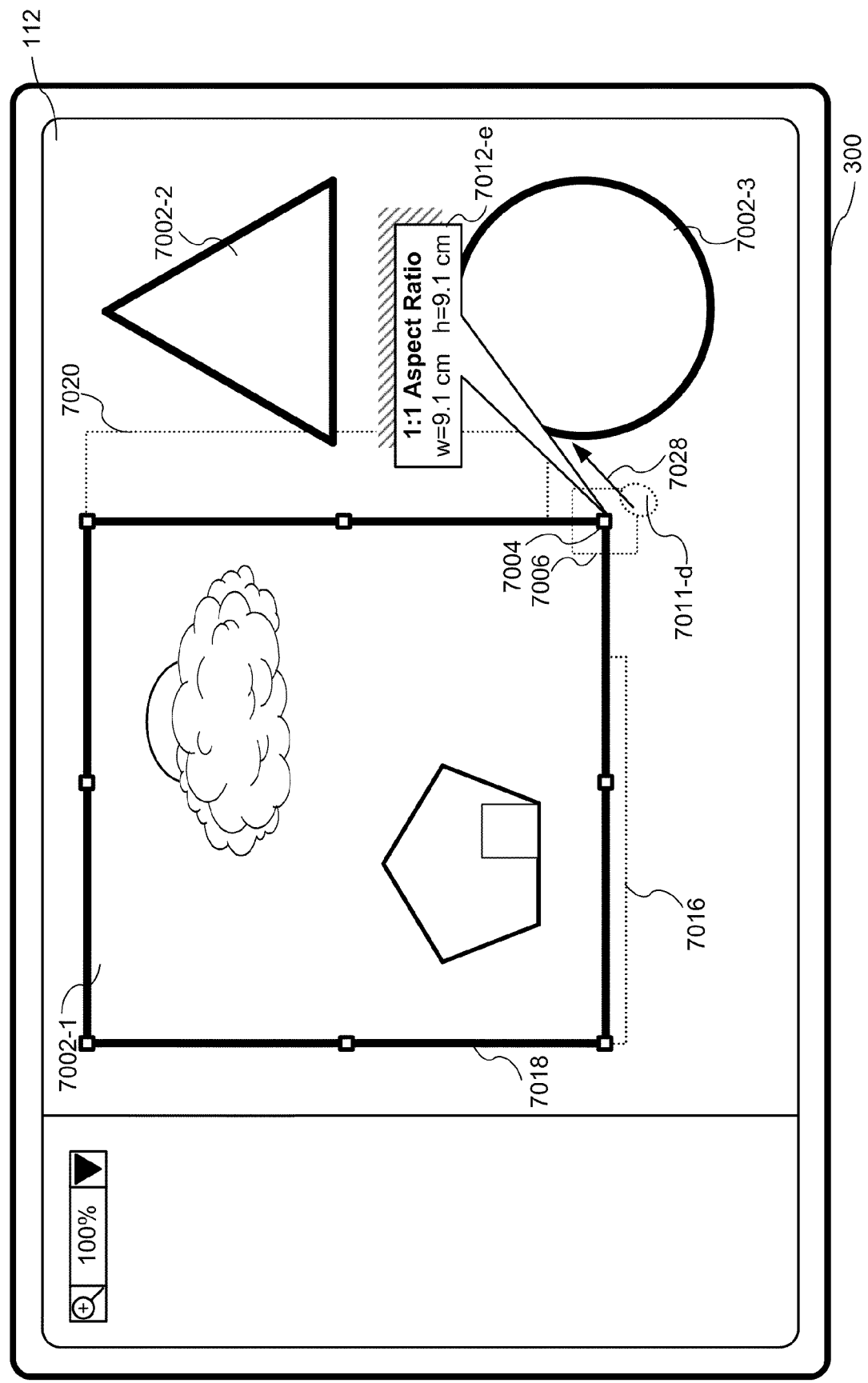
Figure 7G:
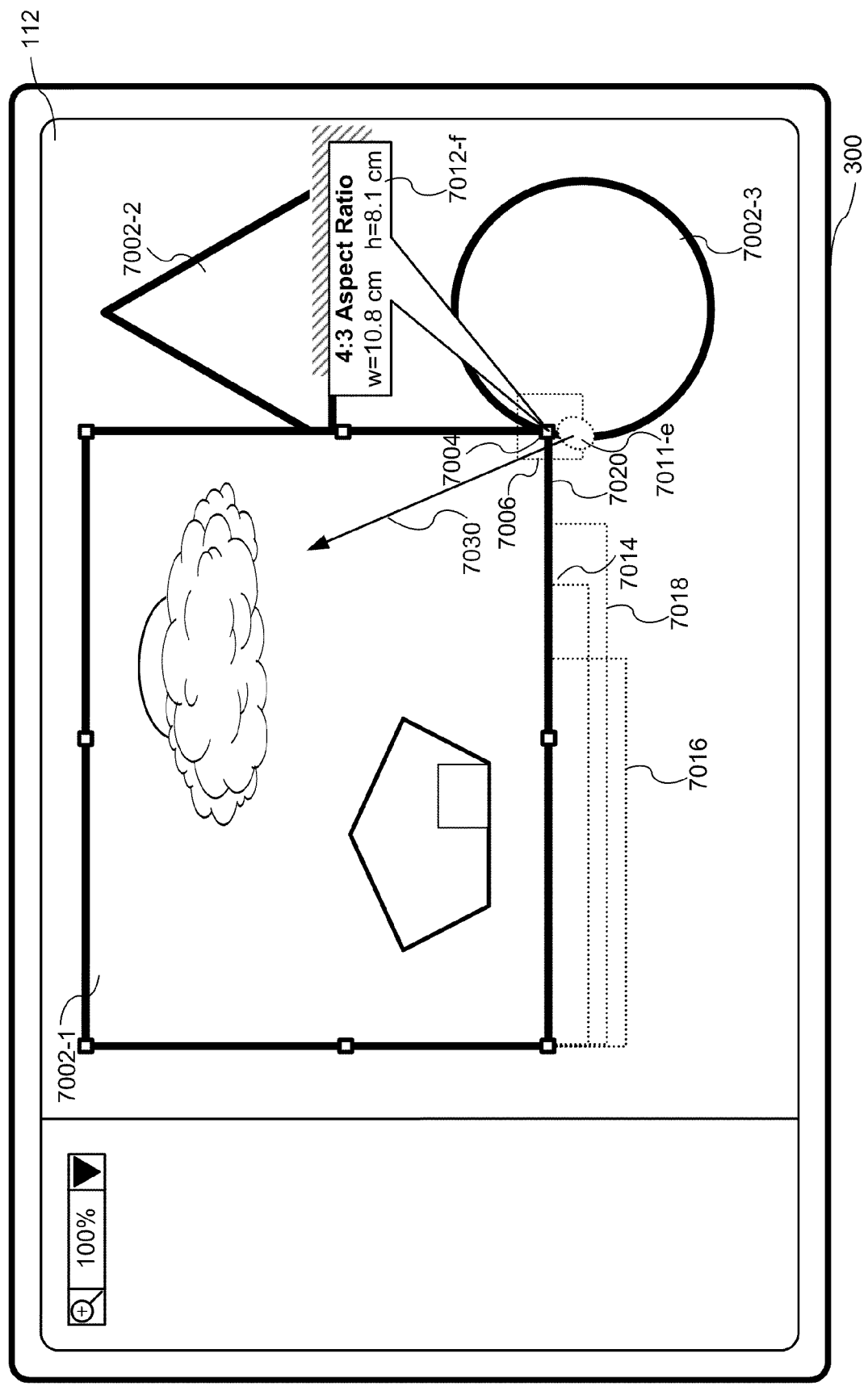

FIGS. 7C-7G illustrate exemplary user interfaces for detecting a first input including contact 7011 and snapping the shape of the currently selected user interface object 7002-1 to a plurality of aspect ratios (e.g., a current aspect ratio 7014, a native aspect ratio 7016, a 1:1 aspect ratio 7018 and a 4:3 aspect ratio 7020), in accordance with some embodiments. For example in response to swipe gesture 7022 in FIG. 7C, the device snaps the shape of the currently selected user interface object 7002-1 to a current aspect ratio 7014, as illustrated in FIG. 7D. As another example, in response to swipe gesture 7024 in FIG. 7D, the device snaps the shape of the currently selected user interface object 7002-1 to a native aspect ratio 7016, as illustrated in FIG. 7E. As another example, in response to swipe gesture 7026 in FIG. 7E, the device snaps the shape of the currently selected user interface object 7002-1 to a 1:1 aspect ratio 7018, as illustrated in FIG. 7F. As another example, in response to swipe gesture 7028 in FIG. 7F, the device snaps the shape of the currently selected user interface object 7002-1 to a 4:3 aspect ratio 7020, as illustrated in FIG. 7G.

Figure 7H:
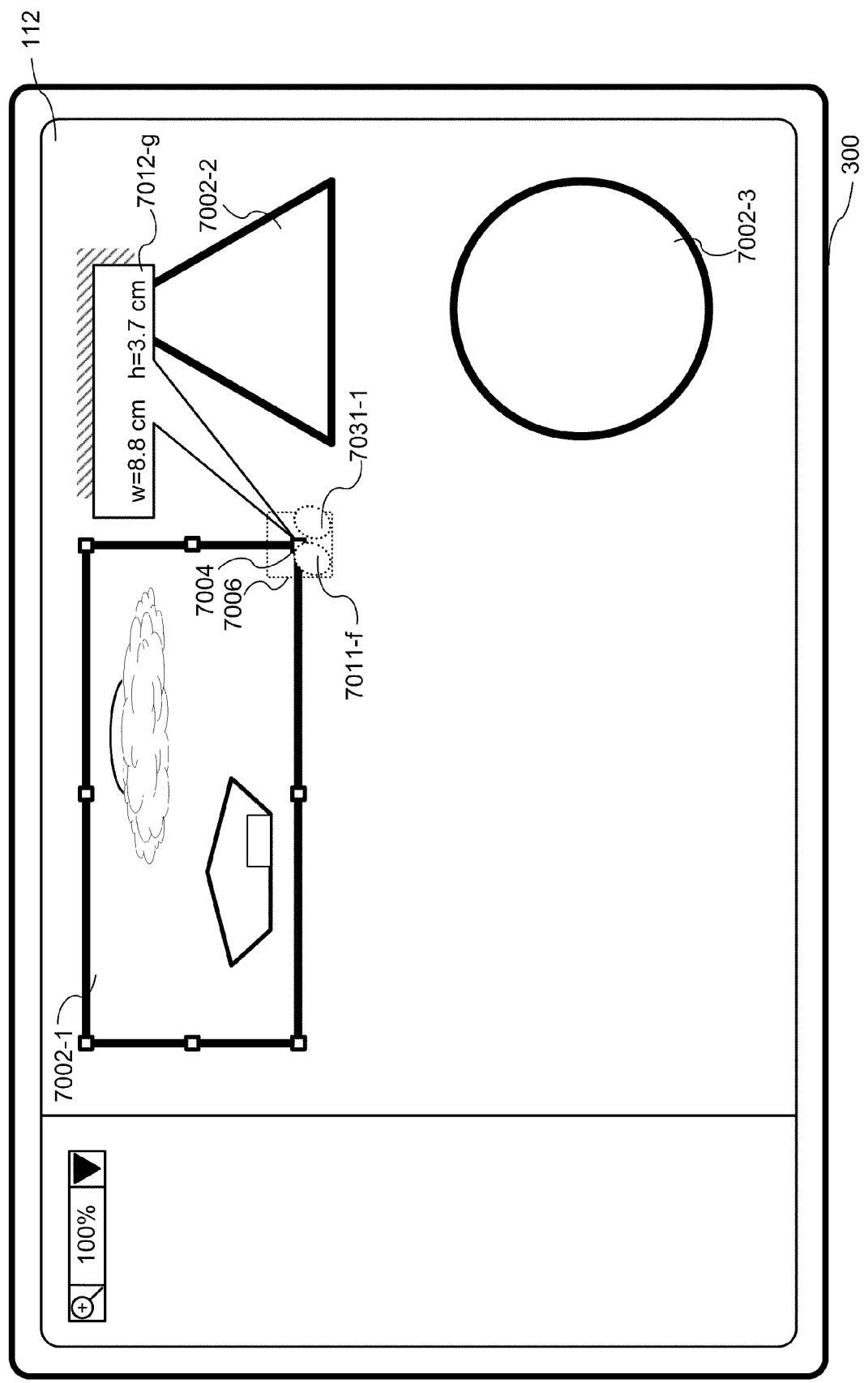

FIGS. 7G-7H illustrate exemplary user interfaces for resizing the shape to a different aspect ratio in response to a swipe gesture 7030 and detecting an end of the first input (e.g., liftoff of contact 7011 used to make the swipe gesture movements 7022, 7024, 7026, 7028, and 7030), thereby changing the current aspect ratio of the currently selected user interface object 7002-1 to an updated current aspect ratio when a second input (e.g., including contact 7031, FIG. 7H) is detected.

Figure 7I:
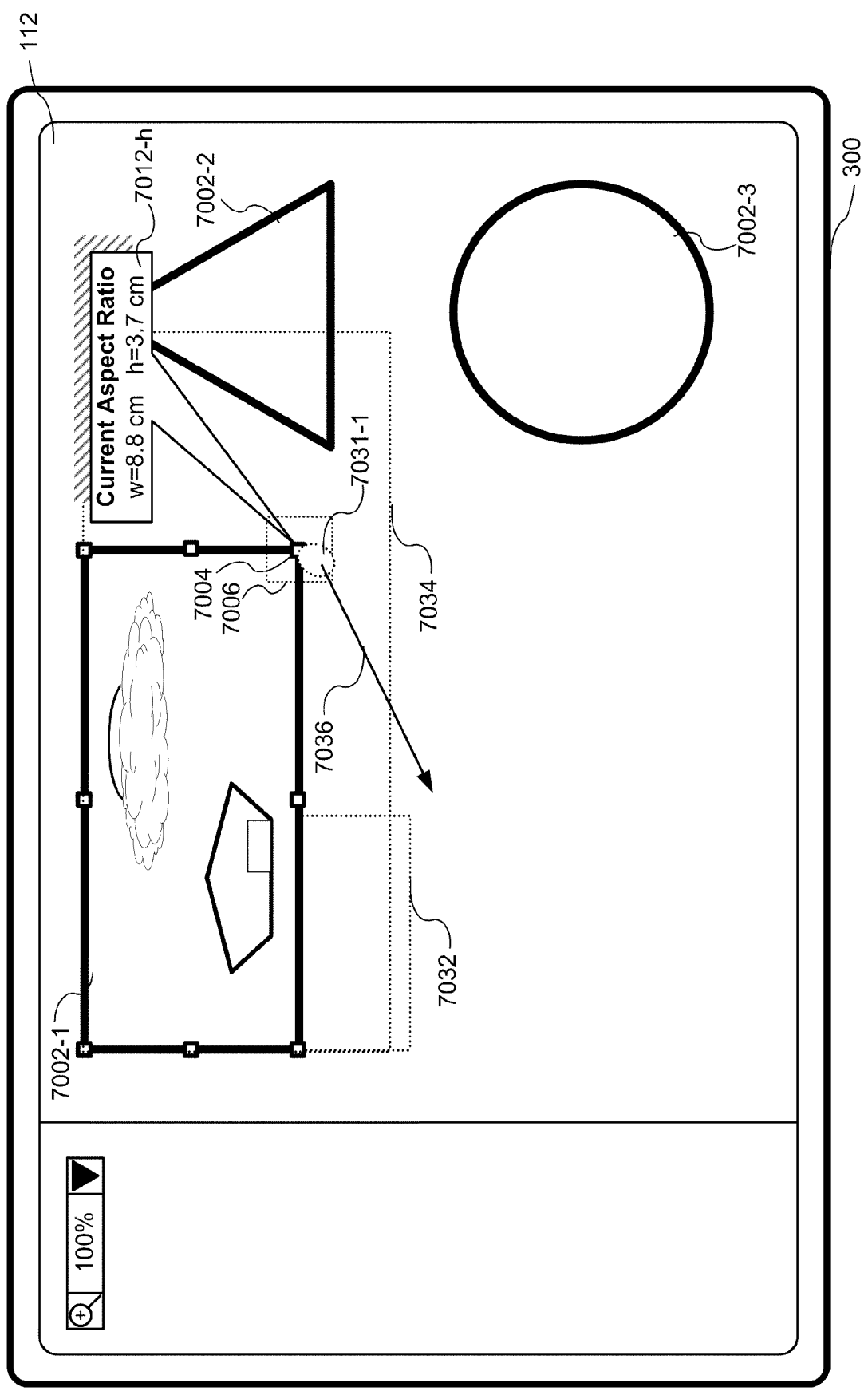
Figure 7J:
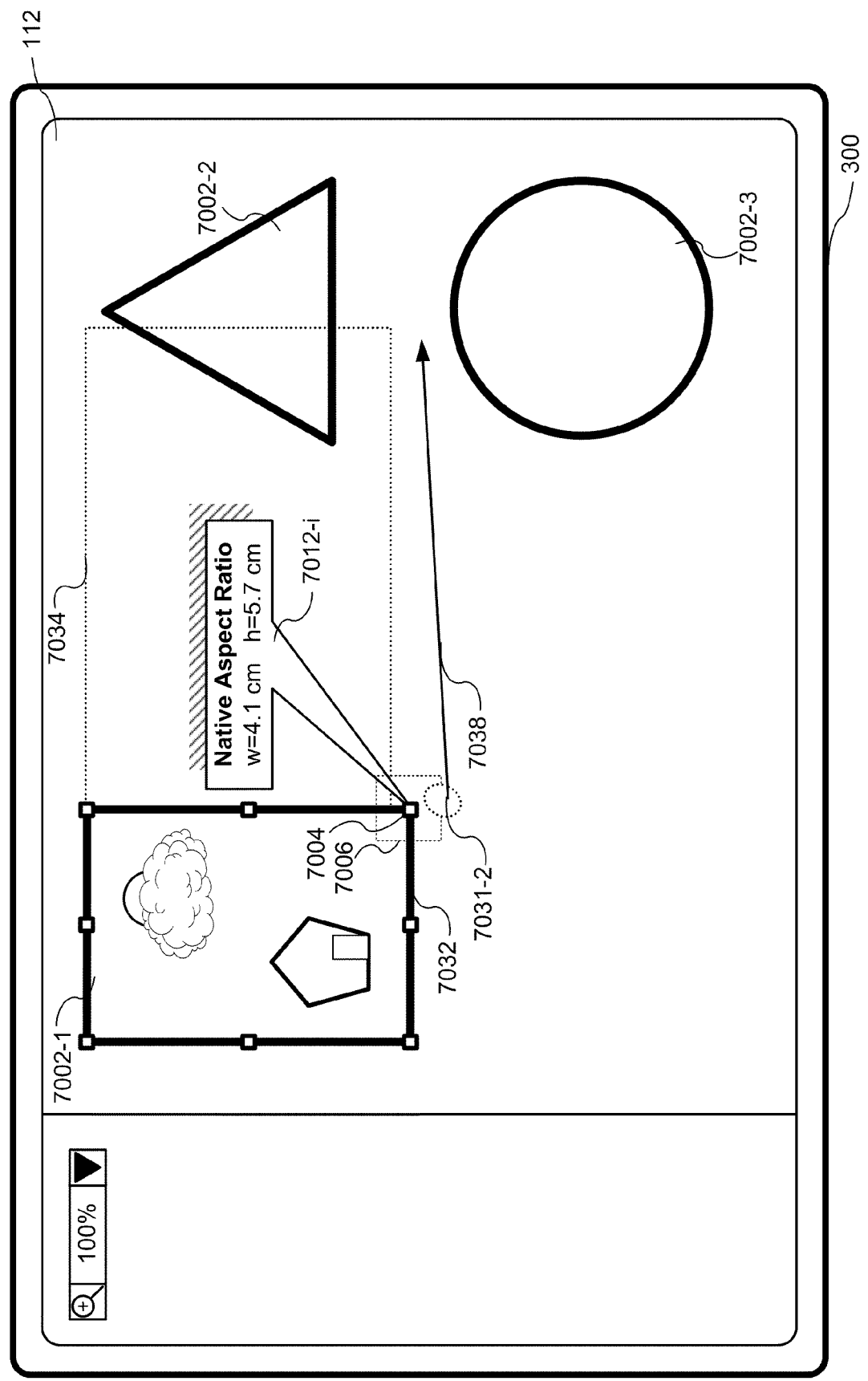
Figure 7K:
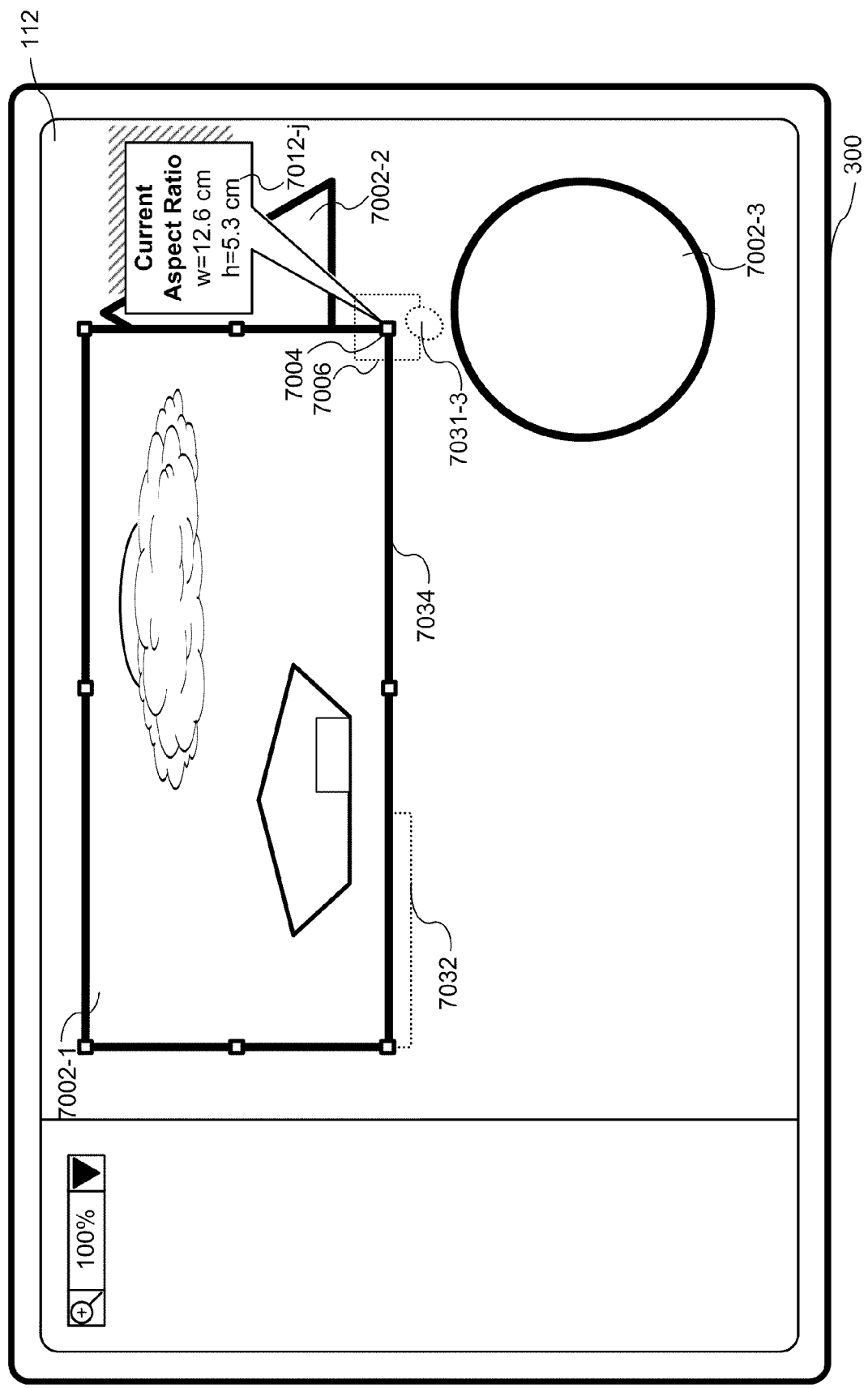

FIGS. 7I-7K illustrate exemplary user interfaces for snapping the shape of the currently selected user interface object 7002-1 to a plurality of aspect ratios (e.g., a native aspect ratio 7032, and a current aspect ratio 7034), in accordance with some embodiments. For example in response to swipe gesture 7036 in FIG. 7I, the device snaps the shape of the currently selected user interface object 7002-1 to a native aspect ratio 7032, as illustrated in FIG. 7J. As another example, in response to swipe gesture 7038 in FIG. 7J, the device snaps the shape of the currently selected user interface object 7002-1 to the updated current aspect ratio 7034, as illustrated in FIG. 7K.

FIGS. 8A-8L illustrate exemplary user interfaces with alignment guides emanating from a user interface object in accordance with some embodiments. The user interfaces in these figures are used to illustrate the processes described below, including the processes in FIGS. 12A-12D.

Figure 8A:
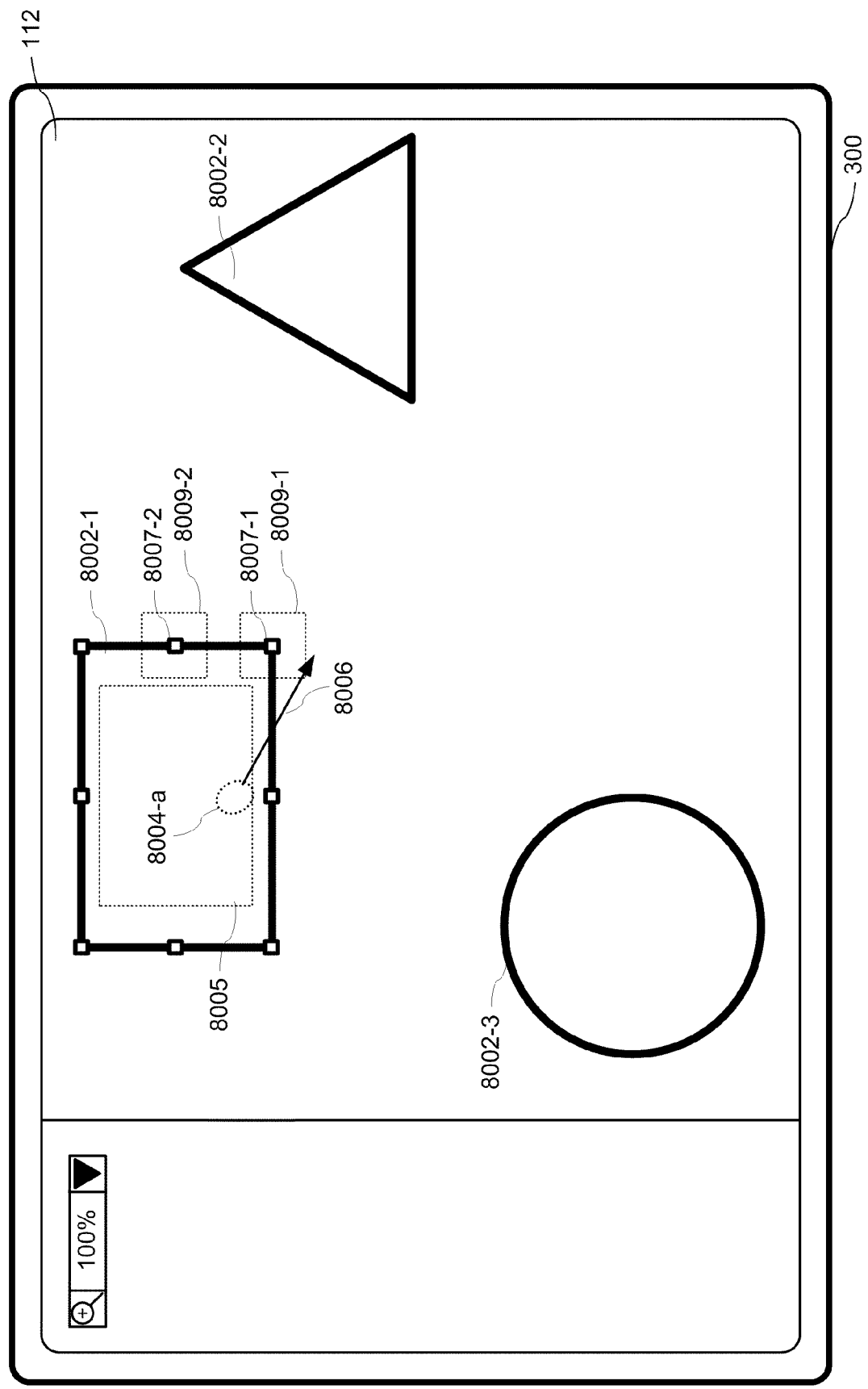
FIGS. 8A-8L illustrate exemplary user interfaces with alignment guides emanating from a user interface object in accordance with some embodiments.

FIG. 8A illustrate display of a plurality of user interface objects 8002, including a currently selected object 8002-1. Contact 8004 is detected with the currently selected object 8002-1. Lateral movement 8006 of contact 8004 is also detected.

FIGS. 8B-8L illustrate various alignment guides emanating from the currently selected object 8002-1.

Figure 9A:
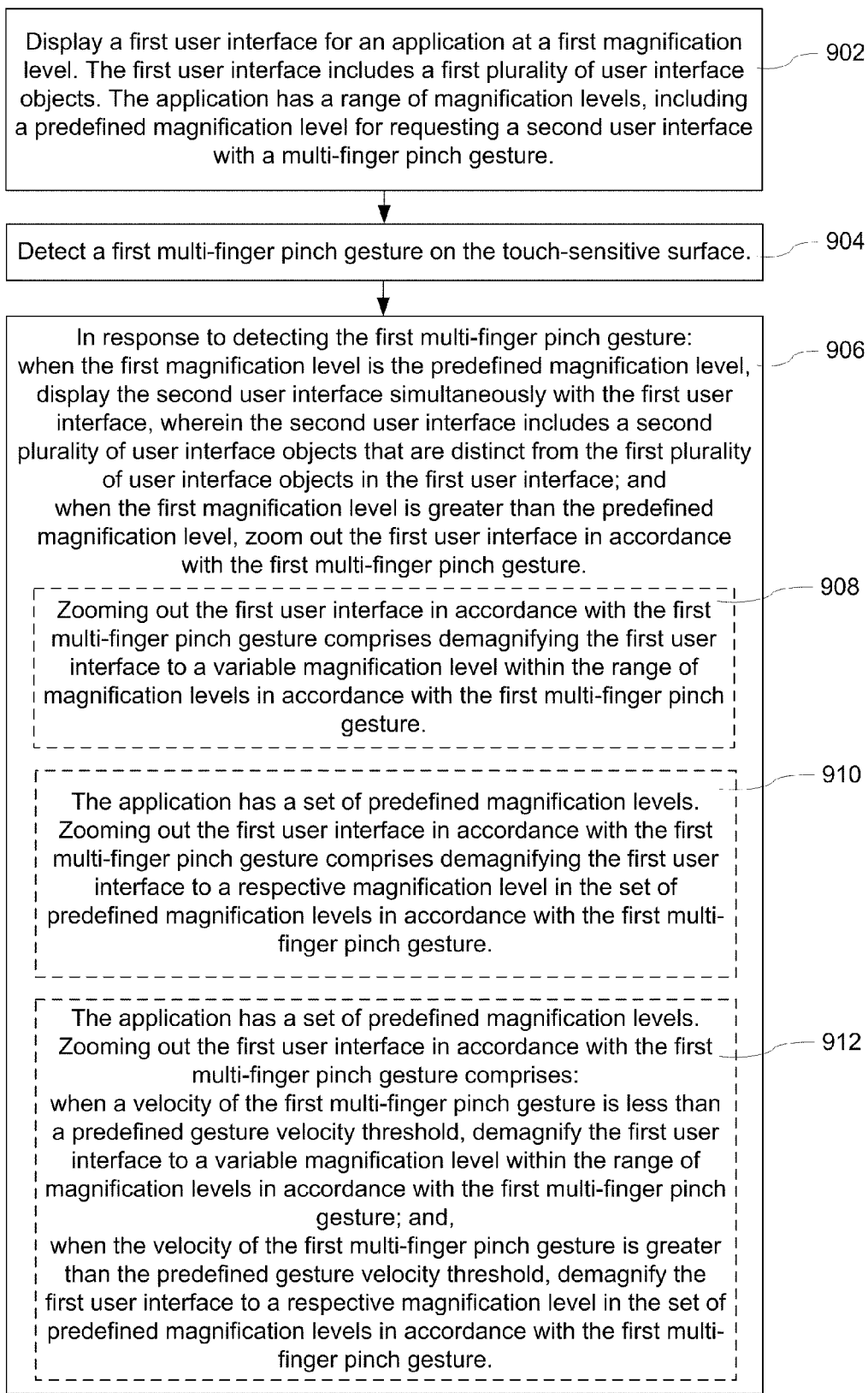
FIGS. 9A-9C are flow diagrams illustrating a method of using a contextual multi-finger pinch gesture in an application in accordance with some embodiments.
Figure 9B:
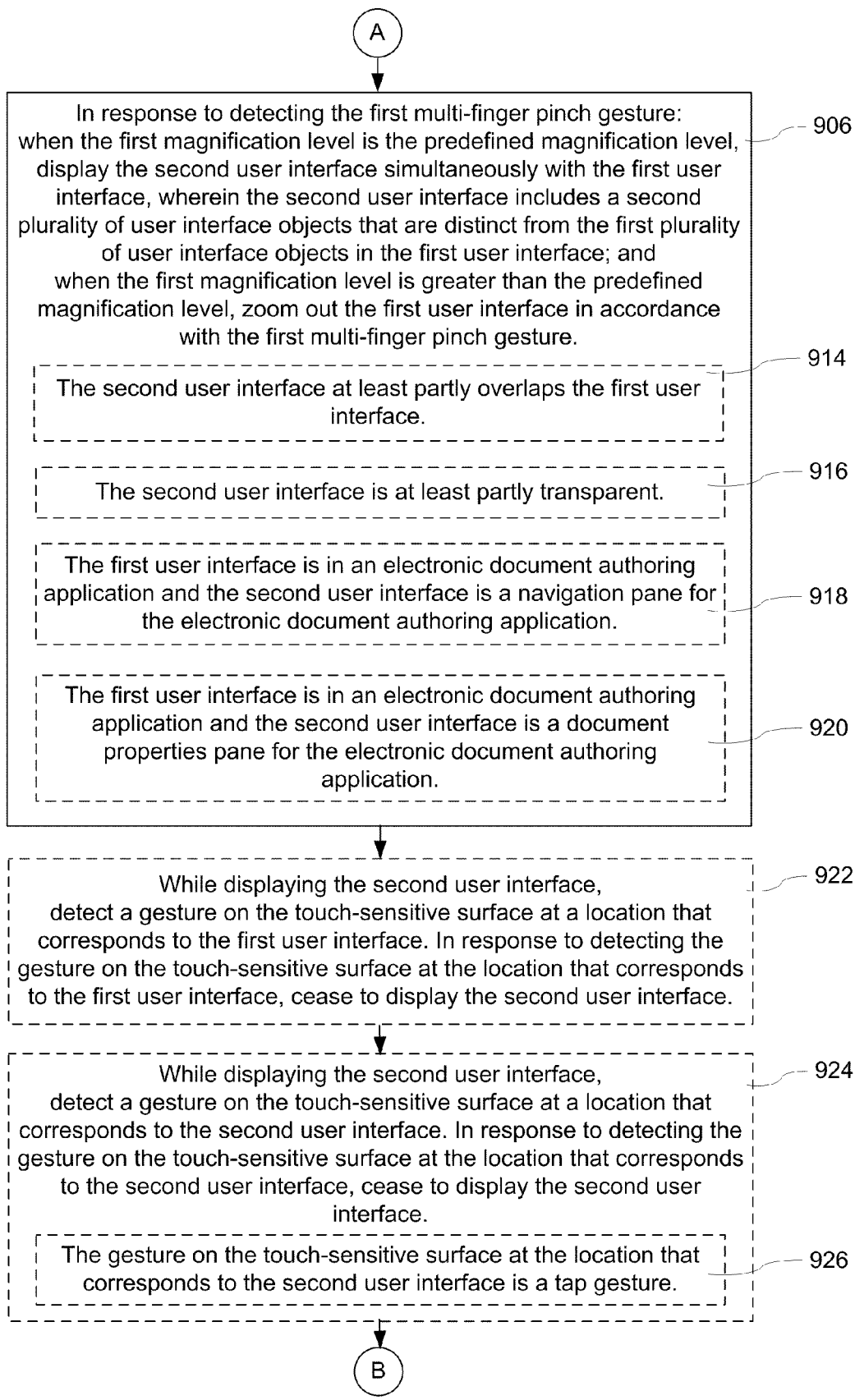
Figure 9C:
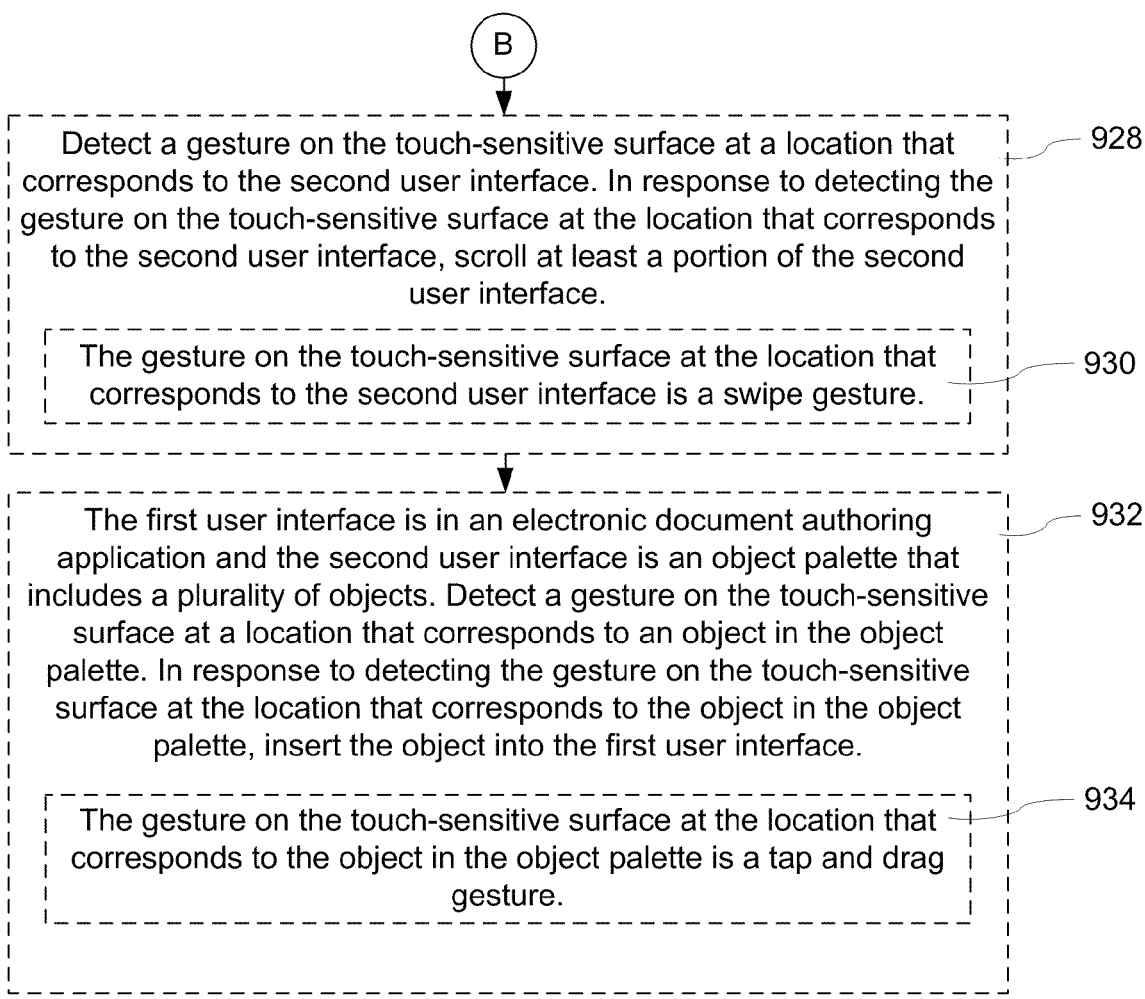

FIGS. 9A-9C are flow diagrams illustrating a method 900 of using a contextual multi-finger pinch gesture in an application in accordance with some embodiments. The method 900 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides an intuitive way to use a multi-finger pinch gesture to either zoom out a first user interface or display a second user interface (e.g., a menu, navigation pane, or object palette) over the first user interface in an application, depending on context. The method reduces the cognitive burden on a user when displaying and manipulating objects in an application, thereby creating a more efficient human-machine interface. For battery-operated computing devices, enabling a user to display and manipulate objects faster and more efficiently conserves power and increases the time between battery charges.

The device displays (902) a first user interface (e.g., 5001, FIG. 5B or FIG. 5C) for an application at a first magnification level.

The first user interface 5001 includes a first plurality of user interface objects (e.g., 5002, FIG. 5B or FIG. 5C). In some embodiments, the user interface objects are shapes in a drawing program, text in a word processing application, graphs or charts in a spreadsheet application, text blocks or images in a presentation creation program, images in an image editing program, or menu buttons.

The application has a range of magnification levels, including a predefined magnification level for requesting a second user interface with a multi-finger pinch gesture. In some embodiments, the predefined magnification level for requesting a second user interface with a multi-finger pinch gesture is the minimum magnification level in the range of magnification levels (e.g., 10% when the range of magnification levels is 10%-500%). In some embodiments, the predefined magnification level for requesting a second user interface with a multi-finger pinch gesture is 100% (e.g., FIG. 5C). In some embodiments, the predefined magnification level for requesting a second user interface with a multi-finger pinch gesture is the magnification level at which an entire object (e.g., an image), rather than just a portion of the object, is displayed.

The device detects (904) a first multi-finger pinch gesture on the touch-sensitive surface (e.g., a two-finger pinch gesture such as 5006 in FIGS. 5B-5C, or 5008 in FIGS. 5C-5D).

In response to detecting the first multi-finger pinch gesture: when the first magnification level is the predefined magnification level (e.g., 100% in FIG. 5C), the device displays the second user interface (e.g., 5010 in FIG. 5E) simultaneously with the first user interface (e.g., 5010 and 5001 in FIG. 5E, 5F, or 5G), wherein the second user interface includes a second plurality of user interface objects that are distinct from the first plurality of user interface objects in the first user interface (e.g., menu in FIG. 5E, pages in FIG. 5F, and objects 5020 in FIG. 5G); and when the first magnification level is greater than the predefined magnification level (e.g., 200% in FIG. 5B), the device zooms out (decreases the magnification level) the first user interface in accordance with the first multi-finger pinch gesture (e.g., gesture 5006, FIG. 5B) (906).

For example, when the predefined magnification level is the minimum magnification level, if the first user interface is already zoomed all the way out to its minimum magnification and the device detects a gesture that would normally zoom the first user interface out further, instead the pinch gesture "pulls in" a menu bar, sidebar or other user interface over the zoomed out first user interface. Otherwise, if the first user interface is not at its minimum magnification level, detecting the gesture results in a zooming out of the first user interface.

As another example, when the predefined magnification is the magnification level at which an entire image, rather than just a portion of the image, is displayed, if the first user interface is already displaying the entire image and the device detects a gesture that would normally zoom the first user interface out further, instead the gesture "pulls in" a menu bar, sidebar or other user interface over the first user interface. Otherwise, if only a portion of the image is displayed, detecting the gesture results in a zooming out of the first user interface to display more of the image.

As another example, when the predefined magnification is the 100% magnification level, if the first user interface is already at the 100% magnification level (e.g., FIG. 5C) and the device detects a gesture (e.g., pinch 5008, FIG. 5C) that would normally zoom the first user interface out further, instead the gesture "pulls in" a menu bar, sidebar or other user interface over the first user interface. Otherwise, if the first user interface is not at the 100% magnification level, detecting the gesture (e.g., pinch 5006, FIG. 5B) results in a zooming out of the first user interface.

In some embodiments, zooming out the first user interface in accordance with the first multi-finger pinch gesture comprises demagnifying (908) the first user interface to a variable magnification level within the range of magnification levels in accordance with the first multi-finger pinch gesture (e.g., from 200% (FIG. 5B) to 139% (FIG. 5D) in accordance with gesture 5006-*a* to 5006-*c*). In some embodiments, the first user interface demagnifies in a continuous manner from the first magnification level to a variable magnification level in accordance with the first multi-finger pinch gesture, unless and until the minimum magnification level is reached, in which case the demagnification ceases.

In some embodiments, the application has a set of predefined magnification levels and zooming out the first user interface in accordance with the first multi-finger pinch gesture comprises demagnifying (910) the first user interface to a respective magnification level in the set of predefined magnification levels in accordance with the first multi-finger pinch gesture (e.g., from 200% (FIG. 5B) to 100% (FIG. 5C) in accordance with gesture 5006-*a* to 5006-*b*). In some embodiments, a series of pinch gestures are used to zoom out the first user interface to a series of predefined magnification levels (e.g., 200%, 100%, 75%, 50%, 25%, and 10%).

In some embodiments, the application has a set of predefined magnification levels and zooming out the first user interface in accordance with the first multi-finger pinch gesture comprises: when a velocity of the first multi-finger pinch gesture is less than a predefined gesture velocity threshold, demagnifying the first user interface to a variable magnification level within the range of magnification levels in accordance with the first multi-finger pinch gesture (e.g., from 200% (FIG. 5B) to 139% (FIG. 5D) in accordance with gesture 5006-*a* to 5006-*c*); and, when the velocity of the first multi-finger pinch gesture is greater than (or equal to) the predefined gesture velocity threshold, demagnifying the first user interface to a respective magnification level in the set of predefined magnification levels in accordance with the first multi-finger pinch gesture (e.g., from 200% (FIG. 5B) to 100% (FIG. 5C) in accordance with gesture 5006-*a* to 5006-*b*) (912).

In some embodiments, if the pinch gesture is made slowly, the first user interface demagnifies in a continuous manner from the first magnification level to a variable magnification level in accordance with the first multi-finger pinch gesture, unless and until the minimum magnification level is reached, in which case the demagnification ceases. Conversely, a quick ("ballistic") pinch gesture is used to zoom out the first user interface to one of a series of predefined zoom levels. But if the first user interface is at the predefined magnification level for requesting a second user interface with a multi-finger pinch gesture, a different operation is performed (e.g., invoking a second, transitory, user interface), as described above. In some embodiments, the gesture velocity, or rate of movement threshold, may be calculated by dividing the distance moved by one or more of the contacts by the duration of the movement(s), and determining that the value is greater than a predefined constant (such as 750 pixels/second). The determination of gesture velocity may use the movement of one contact, both contacts, or the rate at which the contacts approach one another. In some embodiments, the gesture velocity threshold is 500, 750, or 1000 pixels/sec.

In some embodiments, the second user interface 5010 at least partly overlaps (914) the first user interface 5001 (as shown in FIGS. 5E-5G).

In some embodiments, the second user interface 5010 is (916) at least partly transparent (e.g., the second user interface is a heads-up-display).

In some embodiments, the first user interface is in an electronic document authoring application and the second user interface is (918) a navigation pane for the electronic document authoring application (e.g., a pane that displays a list or array of representations of other views, menus, options and/or locations within the electronic document authoring application), as illustrated in FIG. 5F.

In some embodiments, the first user interface is in an electronic document authoring application and the second user interface is (920) a document properties pane for the electronic document authoring application (e.g., a pane that displays a list or array of information associated with the first user interface, such as text size, margins, page number, hue, saturation, brightness, zoom level, etc.), as illustrated schematically by the menu in FIG. 5E.

In some embodiments, while displaying the second user interface, the device detects a gesture (e.g., tap gesture 5018, FIG. 5F) on the touch-sensitive surface at a location that corresponds to the first user interface. In response to detecting the gesture on the touch-sensitive surface at the location that corresponds to the first user interface, the device ceases (922) to display the second user interface (e.g., the heads-up-display is dismissed when the device detects a tap gesture on the first user interface).

In some embodiments, while displaying the second user interface, the device detects (924) a gesture on the touch-sensitive surface at a location that corresponds to the second user interface. In some embodiments, the gesture on the touch-sensitive surface at the location that corresponds to the second user interface is a tap gesture (e.g., tap gesture 5014 or 5016, FIG. 5F) (926).

In response to detecting the gesture on the touch-sensitive surface at the location that corresponds to the second user interface, the device ceases (924) to display the second user interface. For example, the heads-up-display is dismissed when the device detects a gesture on the heads up display. In some embodiments, the gesture is at a location that corresponds to a representation of a view, menu, option or location (e.g., tap gesture 5014 corresponds to Page 4, FIG. 5F) within the electronic document authoring application. In response to detecting the gesture, the device displays the corresponding view, menu, option or location (e.g., Page 4) in the first user interface. In some embodiments, the gesture on the second user interface is at a location that corresponds to an area of the second user interface that does not include a representation of a view, menu, option or location within the electronic document authoring application (e.g., tap gesture 5016 on a blank space in the second user interface, FIG. 5F) and, in response to detecting the gesture, the device ceases to display the second user interface without changing the first user interface. In other words, the second user interface is a transient user interface, and detecting a gesture on the touch-sensitive surface at a location that corresponds to the second user interface other than at a few predefined locations will result in the second user interface ceasing to be displayed.

In some embodiments, the device detects (928) a gesture on the touch-sensitive surface at a location that corresponds to the second user interface. In some embodiments, the gesture on the touch-sensitive surface at the location that corresponds to the second user interface is a swipe gesture (e.g., swipe gesture 5012, FIG. 5F) (930).

In response to detecting the gesture on the touch-sensitive surface at the location that corresponds to the second user interface, the device scrolls (928) at least a portion of the second user interface (e.g., scrolling through a list of thumbnail representations of pages in a navigation pane in a word processing document or a list of thumbnail representations of slides in a navigation pane in a presentation document).

In some embodiments, the first user interface is in an electronic document authoring application and the second user interface is an object palette that includes a plurality of objects (e.g., a shapes palette 5022 (FIG. 5G) that includes basic shapes such as a rectangle, oval, triangle, and line). The device detects (932) a gesture on the touch-sensitive surface at a location that corresponds to an object in the object palette. In response to detecting the gesture on the touch-sensitive surface at the location that corresponds to the object in the object palette, the device inserts (932) the object into the first user interface.

In some embodiments, the gesture on the touch-sensitive surface at the location that corresponds to the object in the object palette is (934) a tap and drag gesture (e.g., gesture 5024 (FIG. 5G), with which the user is able to "drag and drop" the shapes from the second user interface 5010 into the first user interface 5001).

Figure 10A:
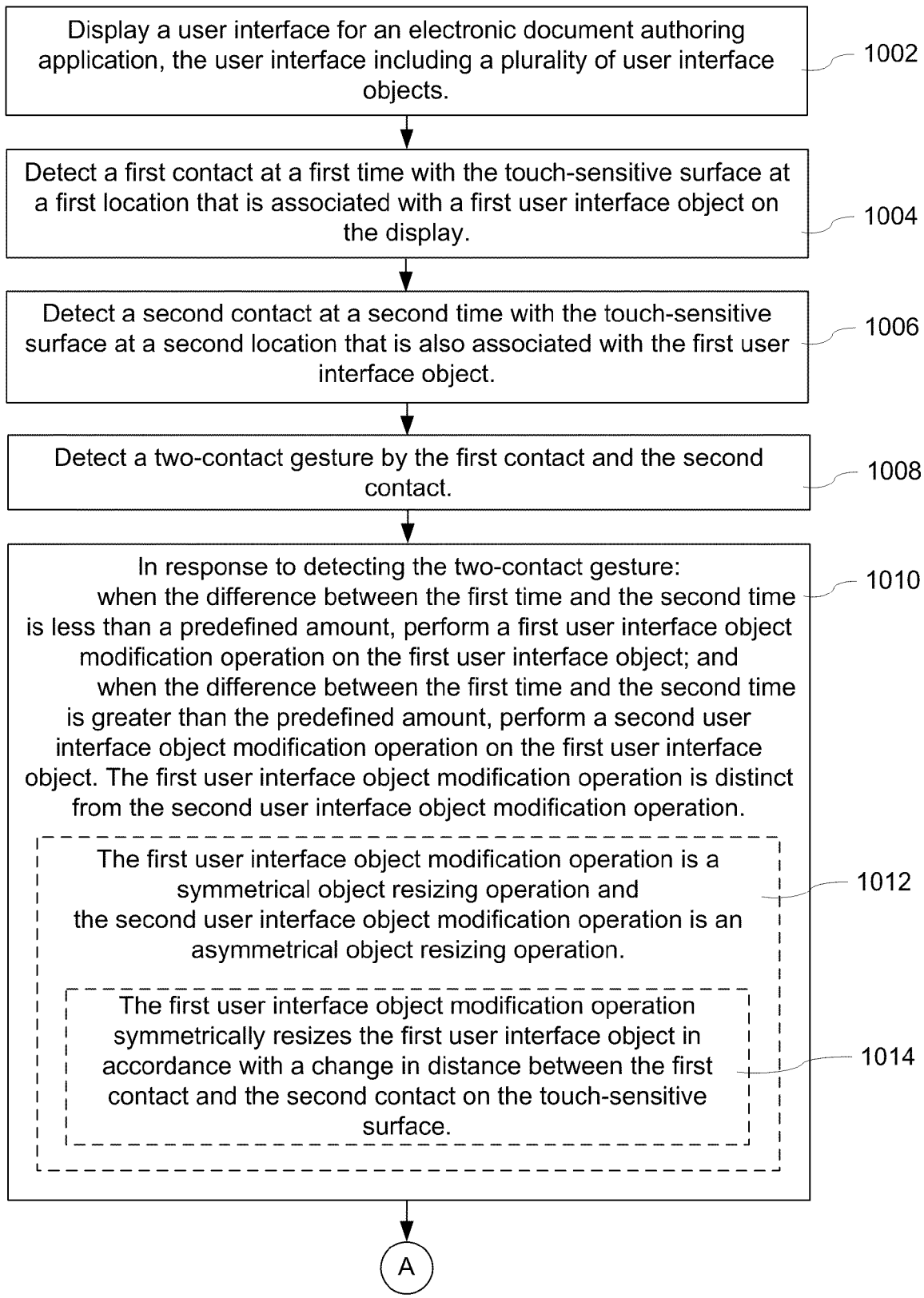
Figure 10B:
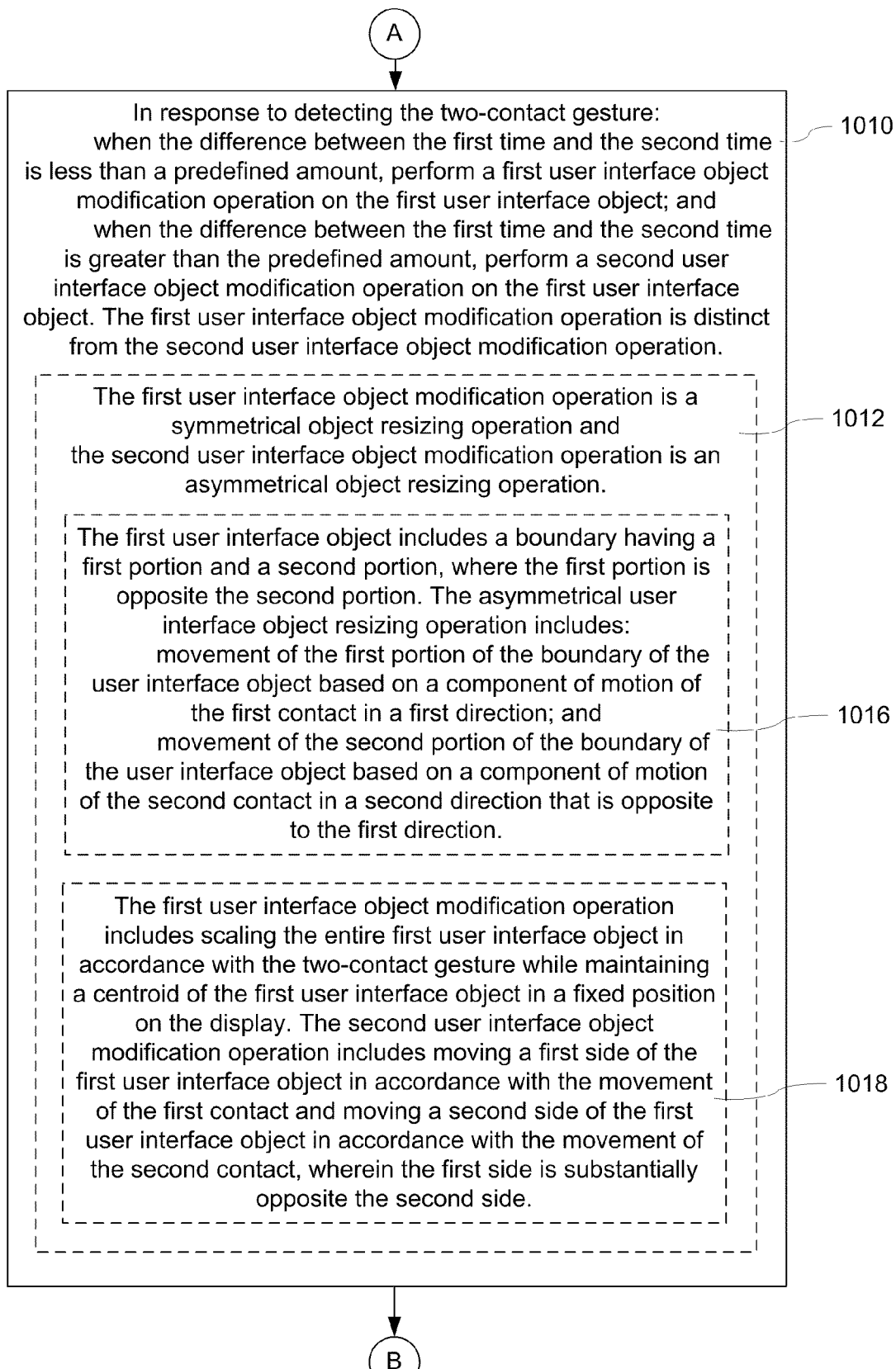

FIGS. 10A-10C are flow diagrams illustrating a method 1000 of modifying an object in response to time-sensitive two-contact gestures in accordance with some embodiments. The method 1000 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, the method 1000 provides an intuitive way to perform two different objects modifications (e.g., symmetrical versus asymmetrical resizing of an object) using two similar two-contact gestures. The method reduces the cognitive burden on a user when modifying an object, thereby creating a more efficient human-machine interface. For battery-operated computing devices, enabling a user to modify objects faster and more efficiently conserves power and increases the time between battery charges.

The device displays (1002) a user interface for an electronic document authoring application (e.g., Keynote, Pages, Numbers, Powerpoint, MS Word, Excel, MS Publisher, Adobe Photoshop, etc.). The user interface includes a plurality of user interface objects (e.g., 6002, FIG. 6A).

The device detect (1004) a first contact (e.g., 6006) at a first time with the touch-sensitive surface at a first location that is associated with a first user interface object (e.g., circle object 6002-4 with bounding box 6003-1) on the display. For example, the first contact is located at a position on the touch-sensitive surface that corresponds to a position on the display that includes the respective user interface object, such as the position of a first handle for the respective user interface object or a handle for a bounding box for the respective user interface object. In some embodiments, the first contact is a finger contact. In some embodiments, the first contact is a stylus contact. It should be understood, that the user interface object manipulations described in greater detail below may be performed on a user interface object (e.g., circle object 6002-4) by manipulating a bounding box (e.g., 6003-1) for the user interface object. Manipulation via a bounding box is particularly advantageous for user interface objects that do not have a regular shape, and are thus more difficult to manipulate.

The device detects (1006) a second contact (e.g., 6008) at a second time with the touch-sensitive surface at a second location that is also associated with the first user interface object (e.g., circle object 6002-4 with bounding box 6003-1). For example, the second contact is located at a position on the touch-sensitive surface that corresponds to another position on the display that includes the respective user interface object, such as the position of a second handle for the respective user interface object or its bounding box. In some embodiments, the second contact is a finger contact. In some embodiments, the second contact is a stylus contact.

The device detects (1008) a two-contact gesture (e.g., a two-finger gesture) by the first contact and the second contact (e.g., movement of the first and/or second contacts).

In response to detecting the two-contact gesture: when the difference between the first time and the second time is less than a predefined amount (e.g., 0.05 seconds, 0.1 seconds, or 0.2 seconds), the device performs a first user interface object modification operation on the first user interface object (e.g., the symmetrical modification operation illustrated in FIGS. 6A and 6B); and when the difference between the first time and the second time is greater than the predefined amount, the device performs a second user interface object modification operation on the first user interface object (1010) (e.g., the asymmetrical modification operation illustrated in FIGS. 6A and 6D). The first user interface object modification operation is distinct from the second user interface object modification operation.

In some embodiments, the first user interface object modification operation is a symmetrical object resizing operation (e.g., the object resizing operation illustrated in FIGS. 6A and 6B or 6A and 6C) and the second user interface object modification operation is an asymmetrical object resizing operation (e.g., the object resizing operation illustrated in FIGS. 6A and 6D or 6A and 6E) (1012).

In some embodiments, the first user interface object modification operation symmetrically resizes the first user interface object in accordance with a change in distance between the first contact 6006 and the second contact 6008 on the touch-sensitive surface (1014) (e.g., as shown in FIGS. 6A and 6B for circle object 6002-4). In some embodiments, the user interface object is resized in accordance with the total change in distance between the two contacts (e.g., the difference in the total distance between 6006-*a* and 6008-*a* in FIG. 6A and the total distance between 6006-*b* and 6008-*b* in any of FIGS. 6B-6E). In some embodiments, the user interface object 6002-4 is resized in accordance with the change in distance between the two contacts in a direction parallel to a predefined axis, such as a horizontal axis (e.g., the change in the horizontal distance between 6006-*a* and 6008-*a* in FIG. 6A and the horizontal distance between 6006-*b* and 6008-*b* in any of FIGS. 6B-6E).

In some embodiments, the centroid of the user interface object maintains its position during the user interface object modification (e.g., the user interface object is resized but not repositioned). In some embodiments, the centroid of the user interface object moves in accordance with the movement of the centroid of the first contact 6006 and the second contact 6008 during the two-contact gesture (e.g., the user interface object is simultaneously resized and repositioned). In some embodiments, the whole user interface object 6002-4 is resized (e.g., proportionally scaled in two dimensions, as illustrated in FIGS. 6A and 6C or 6A and 6E). In some embodiments, the user interface object 6002-4 is resized in one dimension (e.g., stretched in one dimension, as illustrated in FIGS. 6A and 6B or 6A and 6D).

In some embodiments, the first user interface object includes a boundary having a first portion and a second portion, where the first portion is opposite the second portion. In some embodiments, the first portion and the second portion are opposite sides of a bounding box for the first user interface object. In some embodiments, the asymmetrical user interface object resizing operation includes: movement of the first portion of the boundary of the user interface object based on a component of motion of the first contact in a first direction; and movement of the second portion of the boundary of the user interface object based on a component of motion of the second contact in a second direction that is opposite to the first direction (1016). In other words, a first side of the user interface object (e.g., the left side of the bounding box 6003-1) is associated with the first contact 6006 and a second, opposing side of the user interface object (e.g., the right side of the bounding box 6003-1) is associated with the second contact 6008, and the first side moves independently from the second side, as illustrated in FIGS. 6A and 6D.

In some embodiments, the first user interface object modification operation includes scaling the entire first user interface object in accordance with the two-contact gesture while maintaining a centroid (e.g., 6004, FIGS. 6A and 6C) of the first user interface object in a fixed position on the display (e.g., the center of the first user interface object stays in a fixed location while the size of the user interface object is proportionately increased or decreased), as illustrated in FIGS. 6A and 6C. In some embodiments, the second user interface object modification operation includes moving a first side of the first user interface object (e.g., the left side of the bounding box 6003-1) in accordance with the movement of the first contact 6006 and moving a second side of the first user interface object (e.g., the right side of the bounding box 6003-1) in accordance with the movement of the second contact 6008, where the first side is substantially opposite the second side (1018). For example, as illustrated in FIGS. 6A and 6B, the first contact 6006 is associated with a handle 6014 on the first side of the bounding box 6003-1, and the second contact 6008 is associated with a handle 6016 on the second side of the bounding box, and the first handle 6014 moves in accordance with the movement of the first contact (e.g., from 6006-*a* in FIG. 6A to 6006-*b* in FIG. 6B) and the second handle 6016 moves in accordance with the movement of the second contact (e.g., from 6008-*a* in FIG. 6A to 6008-*b* in FIG. 6B).

In some embodiments, the first user interface object has a first axis (e.g., an axis that is horizontal to the display) and a second axis (e.g., an axis that is vertical to the display). The first axis is perpendicular to the second axis. The two-contact gesture has a primary gesture axis that is substantially parallel to the first axis (e.g., within a predefined angle of the first axis, such as 10°, 20°, or 30°). The first user interface object modification operation includes resizing the first user interface object along the first axis and maintaining the size of the user interface object along the second axis, while maintaining a centroid of the user interface object in a fixed position on the display (e.g., the contacts move apart from each other, and the user interface object is symmetrically stretched in just one direction in response to the movement of the contacts, as illustrated in FIGS. 6A and 6B). The second user interface object modification operation includes resizing the user interface object along the first axis (e.g., stretching the user interface object horizontally) and maintaining the size of the user interface object along the second axis, while moving the centroid of the user interface object on the display in accordance with the movement of a centroid of the first contact and the second contact on the touch-sensitive surface (1020), as illustrated in FIGS. 6A and 6D. In other words, for the second user interface object modification operation, the user interface object is translated in two dimensions in accordance with the lateral movement of the centroid of the two contacts, but is only enlarged/stretched in a single direction (e.g., horizontally).

Figure 11A:
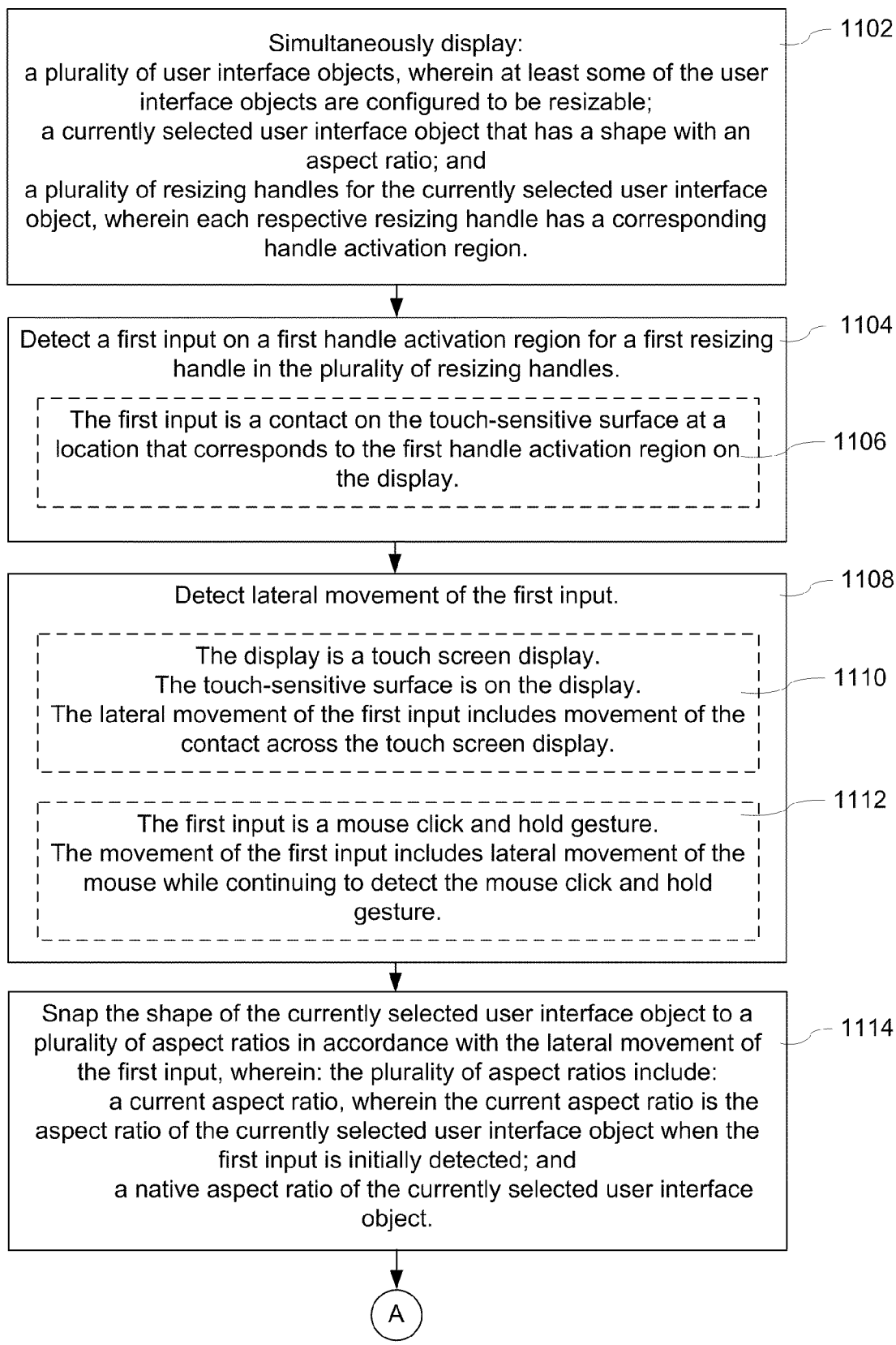
FIGS. 11A-11B are flow diagrams illustrating a method of snapping an object to a plurality of aspect ratios, including a current aspect ratio and a native aspect ratio, in accordance with some embodiments.
Figure 11B:
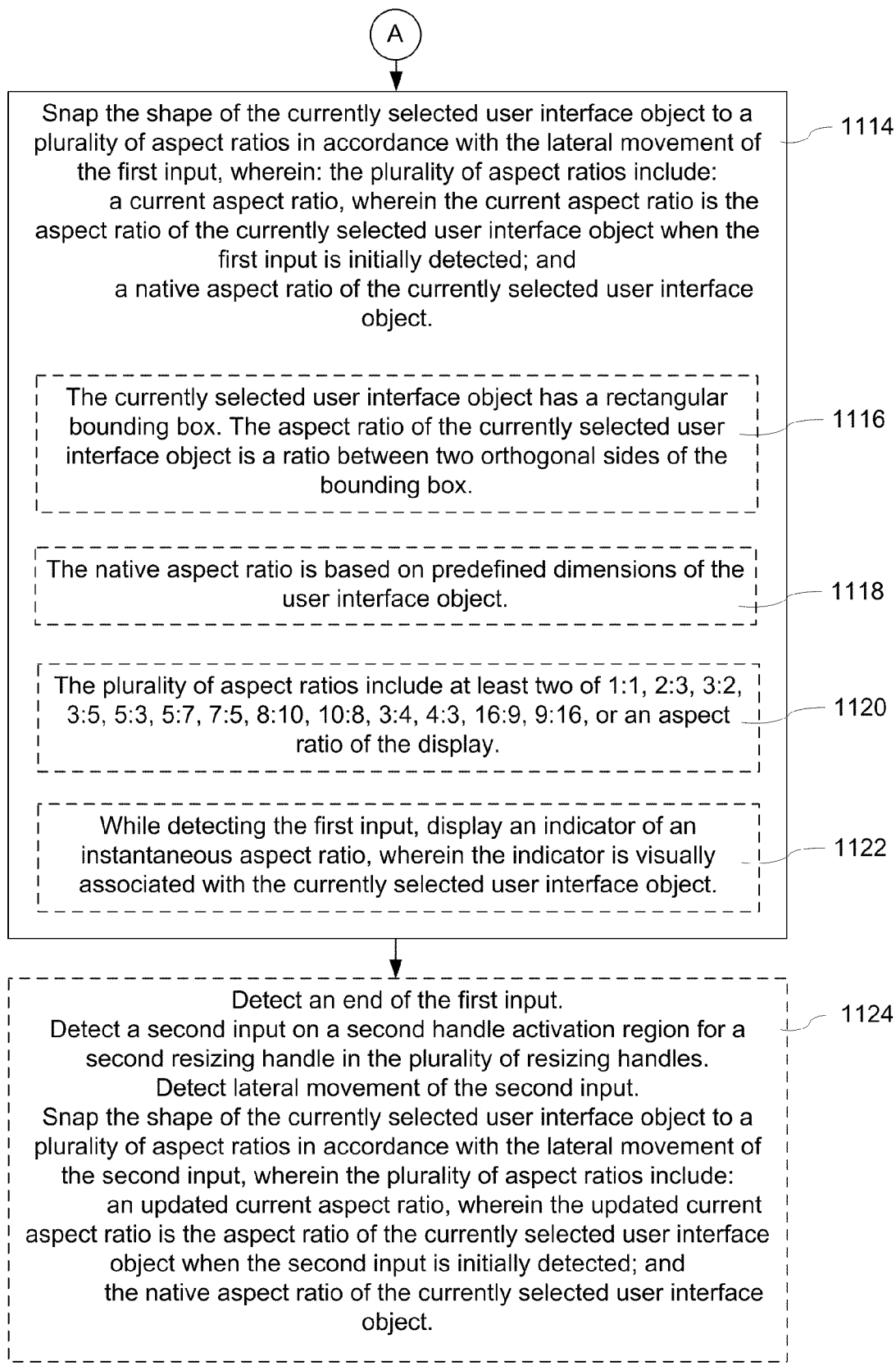
Figure 12A:
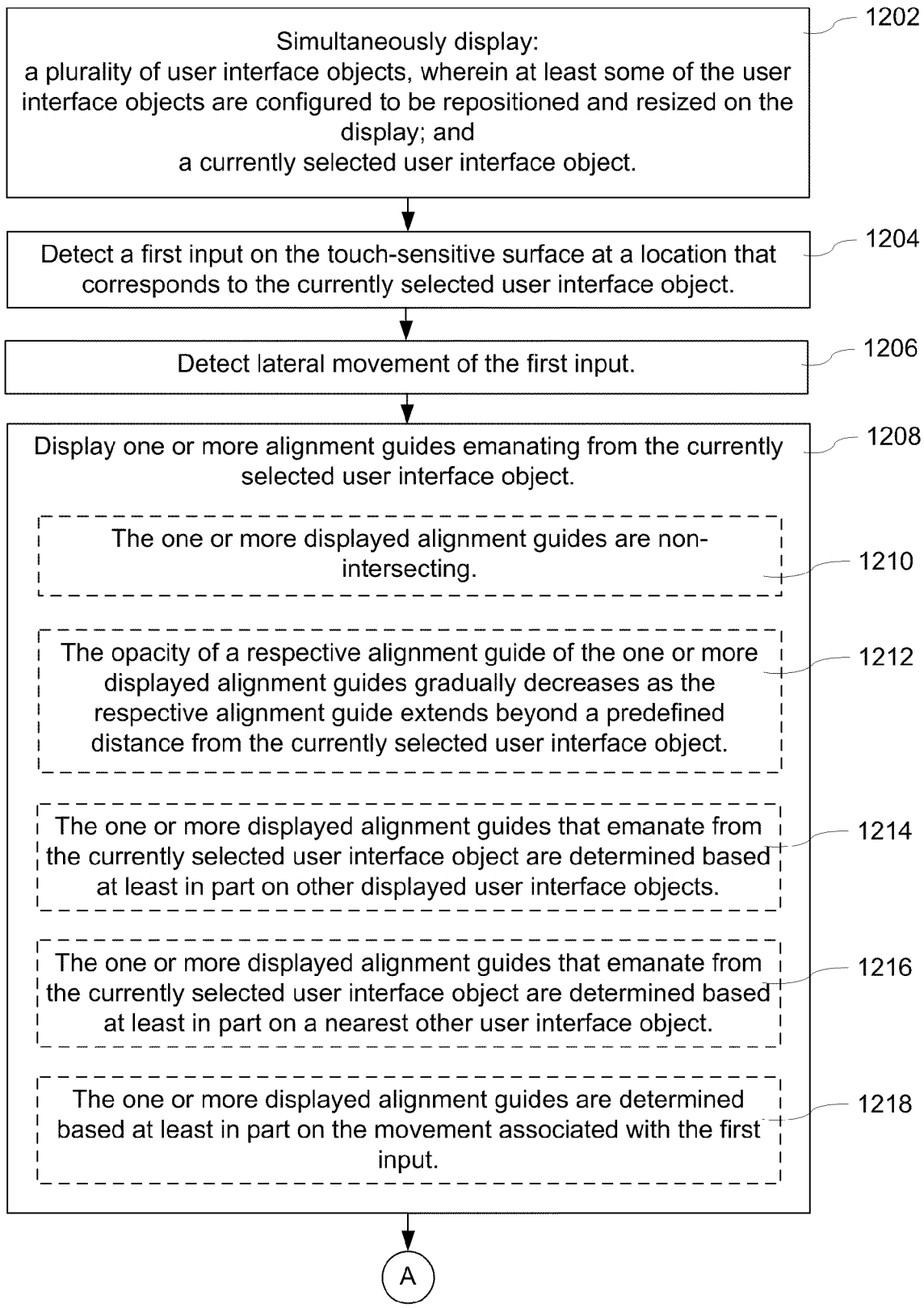
FIGS. 12A-12D are flow diagrams illustrating a method of using alignment guides emanating from a user interface object in accordance with some embodiments.
Figure 12B:
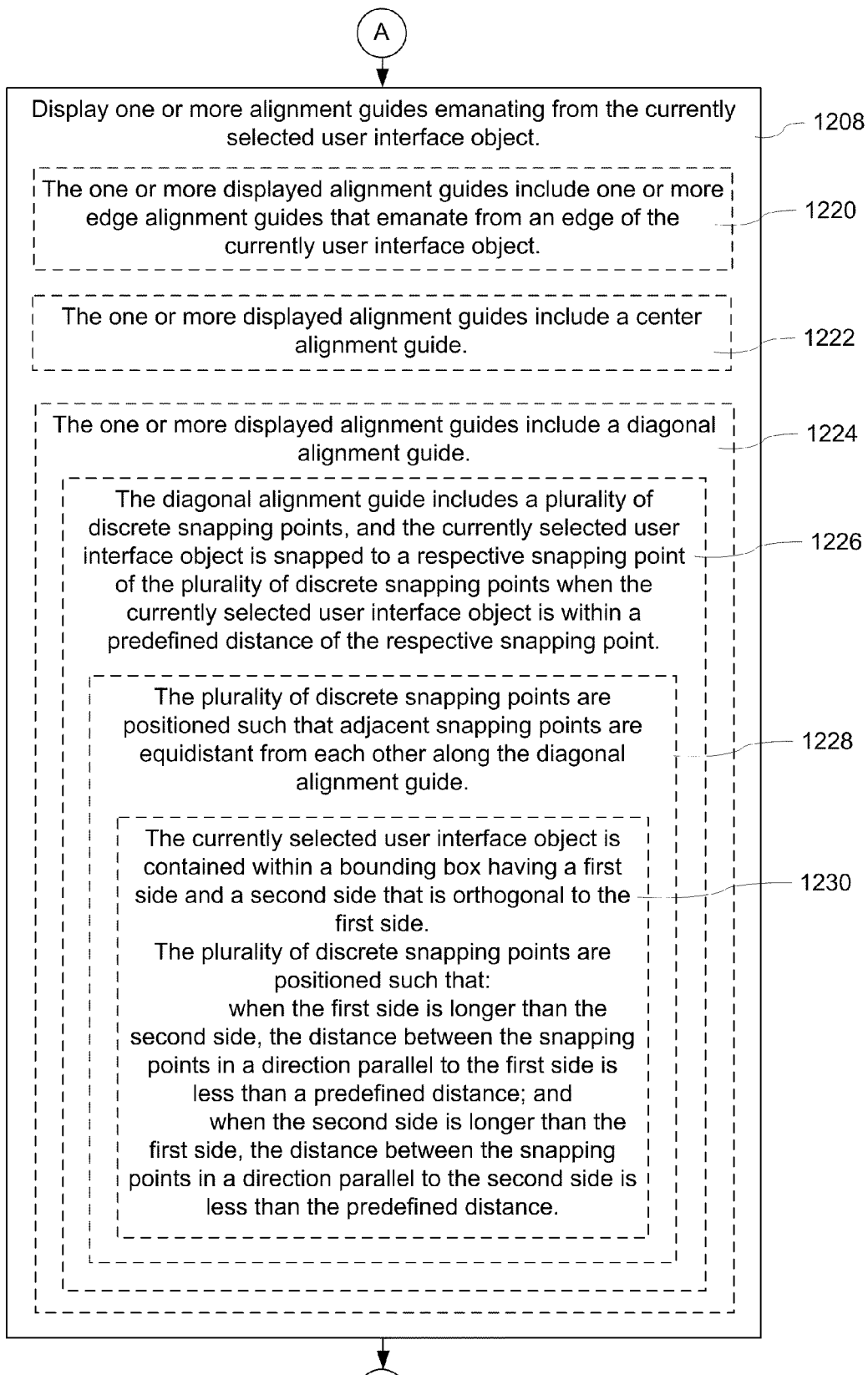
Figure 12C:
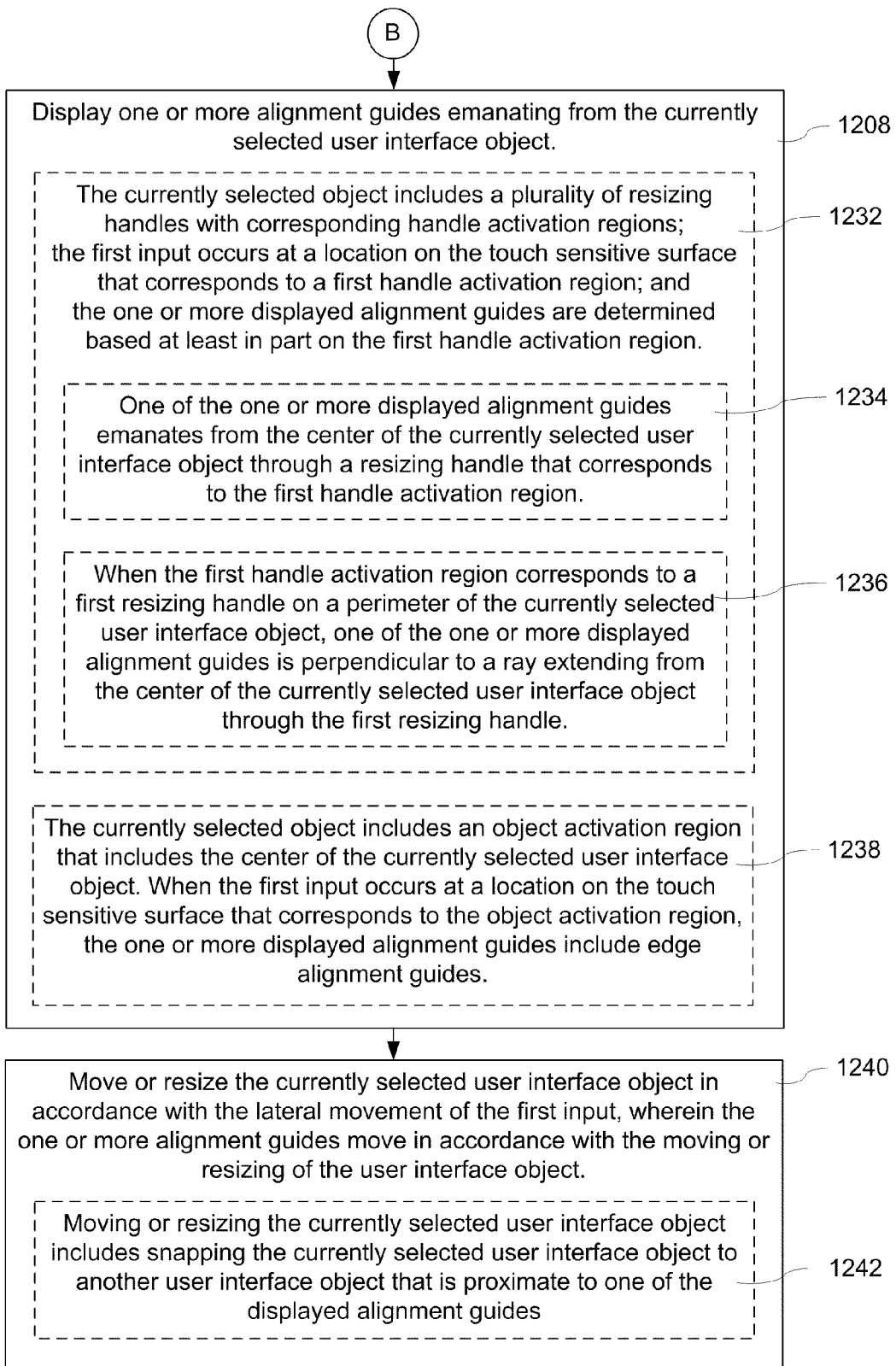
Figure 12D:
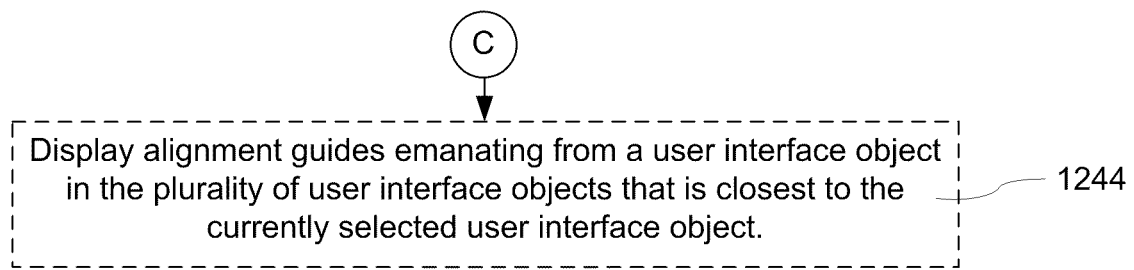

FIGS. 11A-11B are flow diagrams illustrating a method of snapping an object to a plurality of aspect ratios, including a current aspect ratio and a native aspect ratio, in accordance with some embodiments. The method 1100 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1100 may be combined and/or the order of some operations may be changed.

As described below, the method 1100 provides an intuitive way to snap an object to a plurality of aspect ratios, including a current aspect ratio and a native aspect ratio. The method reduces the cognitive burden on a user when adjusting the aspect ratio of the object, thereby creating a more efficient human-machine interface. For battery-operated computing devices, enabling a user to adjust an object's aspect ratio faster and more efficiently conserves power and increases the time between battery charges.

In some embodiments, one or more of user interface objects 7002 are initially displayed. One of the user interface objects (e.g., 7002-1 in FIG. 7A) has a native aspect ratio. For example, a digital image typically has an aspect ratio that is intrinsic to the image (e.g., 600×800 pixels, 1280×1024 pixels, etc.), and if the aspect ratio of the image is adjusted without cropping the image, the image will appear distorted. Similarly, other media including documents, video, etc. may also have a native aspect ratio. Typically, when a new user interface object (e.g., 7002-1 in FIG. 7A) is inserted into an electronic document of an electronic document authoring application, the new user interface object will be initially displayed at its native aspect ratio. In some embodiments, the user interface object (e.g., 7002-1 in FIG. 7A) has a handle 7004 and an activation region 7006 associated with the handle. In some embodiments, the currently selected user interface object 7002-1 is resized in response to a swipe gesture including contact 7009 with the activation region 7006 associated with the handle 7004 and subsequent movement 7010 of the contact 7009 laterally across the display. In some embodiments, an indicator (e.g., 7012-*a* in FIG. 7A) of the instantaneous aspect ratio of the currently selected user interface object 7002-1 is displayed adjacent to the currently selected user interface object 7002-1.

In some embodiments, upon release of the contact 7009, the device sets the instantaneous aspect ratio at the time of release as the current aspect ratio of the user interface object 7002-1 (e.g., as illustrated in FIG. 7B). It should be understood that in embodiments where a newly added user interface object has a native aspect ratio, typically the native aspect ratio is the same as the current aspect ratio. However, once the aspect ratio of the user interface object has been changed from the native aspect ratio to a different aspect ratio (e.g., by the swipe gesture in FIG. 7A) and the change of the aspect ratio has been confirmed (e.g., by releasing the contact 7009 used to perform the swipe gesture, as illustrated in FIG. 7B), the current aspect ratio is distinct from the native aspect ratio.

The device simultaneously displays (1102) on the display: a plurality of user interface objects, wherein at least some of the user interface objects are configured to be resizable (e.g., shapes in a drawing program, graphs or charts in a spreadsheet application, text blocks or images in a presentation creation program, or images in an image editing program); a currently selected user interface object (e.g., 7002-1, FIG. 7C) that has a shape with an aspect ratio (e.g., a user interface object selected in response to a finger tap gesture by a user on a location on the touch-sensitive surface that corresponds to the location of the object on the display); and a plurality of resizing handles for the currently selected user interface object. Each respective resizing handle (e.g., 7004, FIG. 7C) has a corresponding handle activation region (e.g., 7006, FIG. 7C). In some embodiments, as shown in FIG. 7C, the currently selected user interface object 7002-1 includes a bounding box; the resizing handles are located at the corners and in the middle of the sides of the bounding box; and the default handle activation regions are squares that are centered over each of the resizing handles of the bounding box. In this embodiment, the resizing handles are shown on the display and are visible to users. The handle activation areas are typically not shown on the display (as indicated by the dotted lines) and are not visible to users.

The device detects (1104) a first input on or in a first handle activation region (e.g., 7006, FIG. 7C) for a first resizing handle (e.g., 7004, FIG. 7C) in the plurality of resizing handles. In some embodiments, the first input is (1106) a contact (e.g., 7011 in FIGS. 7C-7H) on the touch-sensitive surface at a location that corresponds to the first handle activation region (e.g., 7006, FIG. 7C) on the display. In some embodiments, the contact is a finger contact. In some embodiments, the contact is a stylus contact. In some embodiments, the first input is a mouse click while a cursor is over the first handle activation region.

The device detects (1108) lateral movement of the first input.

In some embodiments, the display is a touch screen display; the touch-sensitive surface is on the display; and the lateral movement of the first input includes movement of the contact across the touch screen display (e.g., swipe 7022, FIG. 7C) (1110).

In some embodiments, the first input is a mouse click and hold gesture and the movement of the first input includes lateral movement of the mouse while continuing to detect the mouse click and hold gesture (1112).

The device snaps (1114) the shape of the currently selected user interface object to a plurality of aspect ratios in accordance with the lateral movement of the first input (e.g., FIGS. 7C-7G and 7I-7K). The plurality of aspect ratios include: a current aspect ratio, wherein the current aspect ratio is the aspect ratio of the currently selected user interface object when the first input is initially detected; and a native aspect ratio of the currently selected user interface object. For example, in response to movement 7022 of the contact 7011 from an initial contact location 7011-*a* in FIG. 7C to a new contact location 7011-*b* in FIG. 7D, the device snaps the user interface object 7002-1 to a current aspect ratio 7014; in response to further movement 7024 of the contact 7011 to a new contact location 7011-*c* in FIG. 7E, the device snaps the user interface object 7002-1 to a native aspect ratio 7016; in response to further movement 7026 of the contact 7011 to a new contact location 7011-*d* in FIG. 7F, the device snaps the user interface object 7002-1 to a 1:1 aspect ratio 7018; in response to further movement 7028 of the contact 7011 to a new contact location 7011-*e* in FIG. 7G, the device snaps the user interface object 7002-1 to a 4:3 aspect ratio 7020; and in response to further movement 7030 of the contact 7011 to a new contact location 7011-*f* in FIG. 7H, the device displays the user interface object 7002-1 at an arbitrary aspect ratio 7014, which is not the native aspect ratio, the current aspect ratio or one of the predefined aspect ratios. It should be understood that throughout these resizing operations, the native aspect ratio and the current aspect ratio of the user interface object 7002-1 remain fixed.

It should be understood that, in accordance with some embodiments, a user interface object (or a bounding box of a user interface object) is only snapped to a respective aspect ratio when a diagonal of the respective aspect ratio (e.g., a line running through a first corner of a bounding box of the user interface object to a location that corresponds to a location that would be occupied by a second corner of the bounding box if the bounding box were to be snapped to the respective aspect ratio) is less than a predefined distance from the current diagonal of the user interface object (or a bounding box of the user interface object). For example, the predefined distance can be measured as the distance that would be moved by the second corner of the bounding box of the user interface object if the bounding box were to be snapped to the respective aspect ratio (e.g., the minimum distance between the diagonal and the current location of the second corner of the user interface object is less than 10 pixels, 15 pixels, 25 pixels or some reasonable distance). In some embodiments, when multiple diagonals that are representative of corresponding aspect ratios are within the predefined distance, the user interface object is snapped to the aspect ratio with the closest diagonal. Additionally, it should be understood that, in some embodiments when no aspect ratio has a diagonal that is within the predefined distance, the user interface object (or the bounding box of the user interface object) is not snapped to any aspect ratio (e.g., the user interface object will be smoothly resized in accordance with the first input).

In some embodiments, the currently selected user interface object has a rectangular bounding box, and the aspect ratio of the currently selected user interface object is a ratio between two orthogonal sides of the bounding box (1116).

In some embodiments, the native aspect ratio is based on predefined dimensions of the user interface object (1118) (e.g., pixels of height and pixels of width for a digital image or media clip, page width and height for a pdf, chart, worksheet, table, or presentation slide).

In some embodiments, the plurality of aspect ratios include at least two of 1:1, 2:3, 3:2, 3:5, 5:3, 5:7, 7:5, 8:10, 10:8, 3:4, 4:3, 16:9, 9:16, or an aspect ratio of the display (1120). In some embodiments, while detecting the first input (e.g., contact 7011 in FIGS. 7C-7H), the device displays (1122) an indicator (e.g., 7012 in FIGS. 7C-7G) of an instantaneous aspect ratio, wherein the indicator is visually associated with the currently selected user interface object (e.g., a number ("3:2") or label ("native aspect ratio") in a box adjacent or proximate to the first resizing handle).

In some embodiments, the device detects an end of the first input (e.g., a lift off of a contact 7011-*f* (FIG. 7H) from the touch-sensitive surface); detects a second input (e.g., contact 7031-1 in FIG. 7I) on a second handle activation region (e.g., handle activation region 7006 for handle 7004) for a second resizing handle in the plurality of resizing handles; detects lateral movement (e.g., 7036 in FIG. 7I and/or 7038 in FIG. 7J) of the second input; and snaps the shape of the currently selected user interface object to a plurality of aspect ratios in accordance with the lateral movement of the second input (1124). The plurality of aspect ratios include: an updated current aspect ratio (e.g., 7034 in FIG. 7K), wherein the updated current aspect ratio is the aspect ratio of the currently selected user interface object when the second input is initially detected (e.g., the aspect ratio of the user interface object 7002-1 in FIG. 7H when contact 7031-1 is detected); and the native aspect ratio (e.g., 7032 in FIG. 7J) of the currently selected user interface object (e.g., 7002-1 in FIGS. 7I-7K).

For example, in response to movement 7036 of the contact 7031 from an initial contact location 7031-1 in FIG. 7I to a new contact location 7031-2 in FIG. 7J, the device snaps the user interface object 7002-1 to a native aspect ratio 7032; and in response to further movement 7038 of the contact 7031 to a new contact location 7031-3 in FIG. 7K, the device snaps the user interface object 7002-1 to the updated current aspect ratio 7034.

FIGS. 12A-12D are flow diagrams illustrating a method 1200 of using alignment guides emanating from a user interface object in accordance with some embodiments. The method 1200 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 1200 may be combined and/or the order of some operations may be changed.

As described below, the method 1200 provides an intuitive way to align a selected object with other objects. The method reduces the cognitive burden on a user when aligning objects, thereby creating a more efficient human-machine interface. For battery-operated computing devices, enabling a user to align objects faster and more efficiently conserves power and increases the time between battery charges. A particular advantage of alignment guides that emanate from the currently selected object is that a user can readily see which part of the currently selected object will be aligned with other elements in the user interface without unnecessarily confusing the user. Such alignment guides (e.g., alignment guides which emanate from the currently selected object) are more likely to be displayed near the objects which the user would like to align and are less likely to obscure relevant parts of the user interface. In contrast, alignment guides which are associated with other user interface objects or are permanently displayed on the user interface add clutter and confusion to the user interface and may cause the currently selected user interface object to snap to unintended positions and make it more difficult for the user to accurately position the user interface object.

The device simultaneously displays (1202) on the display: a plurality of user interface objects (e.g., 8002, FIG. 8A), wherein at least some of the user interface objects are configured to be repositioned and resized on the display (e.g., shapes in a drawing program, graphs or charts in a spreadsheet application, text blocks or images in a presentation creation program, or images in an image editing program); and a currently selected user interface object (e.g., 8002-1 (FIG. 8A), a user interface object selected in response to a finger tap gesture by a user on a location on the touch-sensitive surface that corresponds to the location of the object on the display).

The device detects (1204) a first input (e.g., contact 8004, FIG. 8A) on the touch-sensitive surface at a location that corresponds to the currently selected user interface object (e.g., a finger contact or stylus contact at a location on the touch-sensitive surface that corresponds to the currently selected user interface object, or a mouse click while a cursor is over the currently selected user interface object). In some embodiments, the currently selected object includes an object activation region (e.g., 8005 in FIGS. 8A-8D) and a plurality of resizing handles (e.g., 8007-1 and 8007-2, in FIG. 8A) with corresponding handle activation regions (e.g., 8009-1 and 8009-2 in FIG. 8A). Different activation regions are associated with different user interface object modification operations. For example, movement associated with movement of a handle activation region (e.g., 8009-1 in FIG. 8A) for a corner resizing handle (e.g., 8007-1 in FIG. 8A) of the user interface object (e.g., 8002-1 in FIG. 8A) moves the two sides associated with the corner of the user interface object (e.g., the right side and the bottom of the selected user interface object 8002-1 in FIG. 8A), while movement associated with movement of a handle activation region (e.g., 8009-2 in FIG. 8A) for a side resizing handle (e.g., 8007-2 in FIG. 8A) of the user interface object moves the corresponding side of the user interface object (e.g., the right side of the selected user interface object 8002-1 in FIG. 8A), and movement associated with movement of an object activation region (e.g., 8005) in the center of the user interface object moves the entire user interface object (e.g., the movement 8006 of contact 8004 with the currently selected user interface object 8002-1 in FIG. 8A moves the currently selected user interface object 8002-1 to a new position on the display, as illustrated in FIG. 8B).

The device detects (1206) lateral movement of the first input (e.g., movement 8006, FIG. 8A).

Figure 8B:
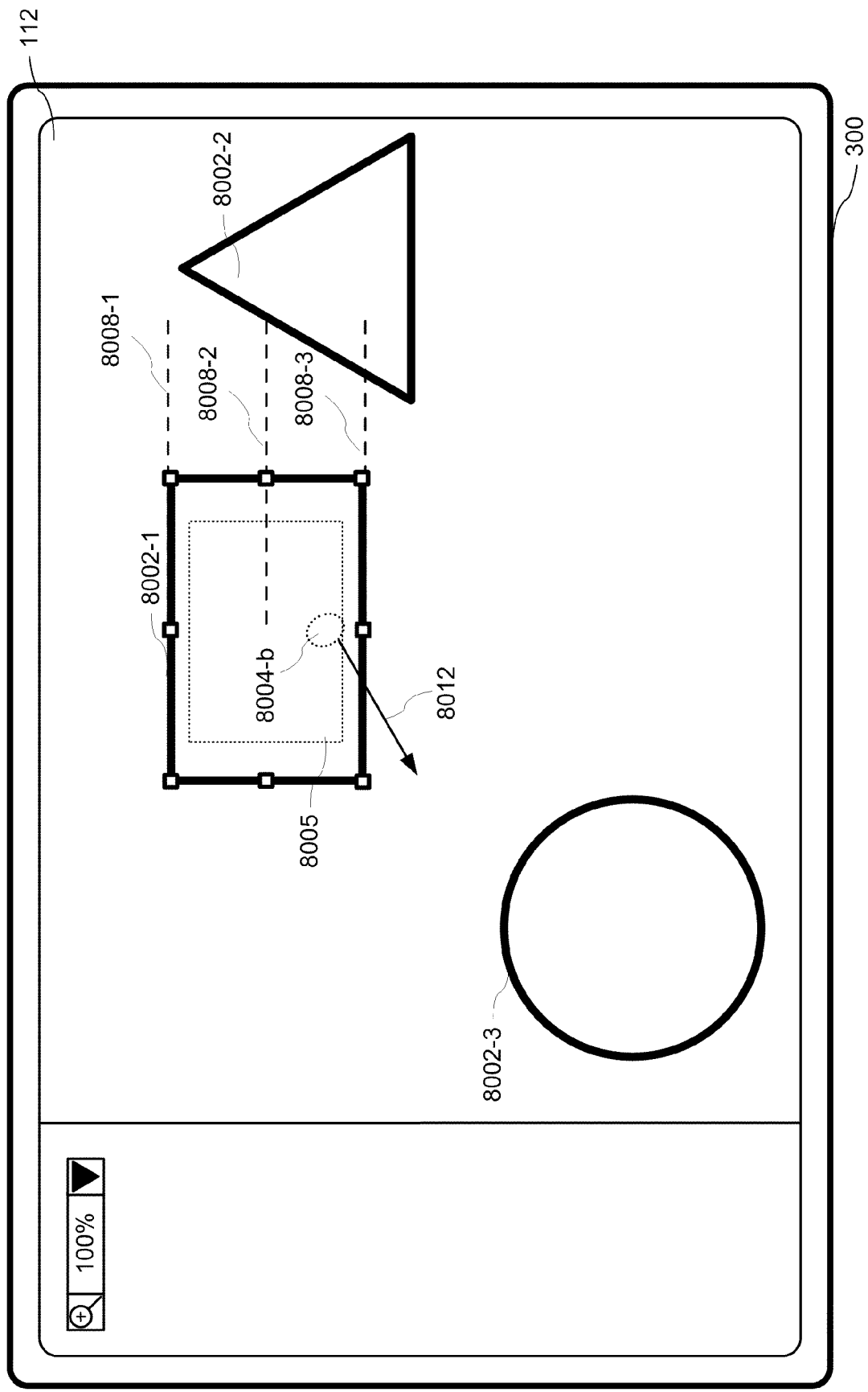

The device displays (1208) one or more alignment guides (e.g., 8008, FIG. 8B) emanating from (or contiguous with) the currently selected user interface object (e.g., 8002-1, FIG. 8B).

In some embodiments, the one or more displayed alignment guides are non-intersecting (1210). In some embodiments, the one or more displayed alignment guides are parallel lines emanating from the currently selected user interface object (e.g., the alignment guides 8008-1, 8008-2 and 8008-3 as shown in FIG. 8B).

In some embodiments, the opacity of a respective alignment guide of the one or more displayed alignment guides gradually decreases (1212) as the respective alignment guide extends beyond a predefined distance from the currently selected user interface object (e.g., beyond a predefined distance from a perimeter of the currently selected user interface object). In other words, the alignment guides fade out with distance from the currently selected user interface object.

In some embodiments, the one or more displayed alignment guides that emanate from the currently selected user interface object are determined (1214) based at least in part on other displayed user interface objects. For example, the alignment guides are displayed so that they emanate from the currently selected user interface object (e.g., 8002-1 in FIG. 8B) towards other user interface objects (e.g., user interface object 8002-2 in FIG. 8B and/or user interface object 8002-3 in FIG. 8C). For example, if the currently selected user interface object is a rectangle and a circle is displayed below the user interface object and a triangle is displayed to the right of the rectangle, the displayed alignment guides will emanate from the right side and/or the bottom of the rectangle, towards the triangle and the circle, respectively, as illustrated in FIGS. 8B and 8C, respectively.

In some embodiments, the one or more displayed alignment guides that emanate from the currently selected user interface object are determined (1216) based at least in part on a nearest other user interface object. For example, the displayed alignment guides are displayed so that they emanate from the currently selected user interface object (e.g., 8002-1 in FIG. 8B) only towards the nearest other user interface object (e.g., 8002-2 in FIG. 8B, or 8002-3 in FIG. 8C). For example, if the user interface object is a rectangle and a circle is displayed below the user interface object and a triangle is displayed to the right of the rectangle and the circle is nearest to the rectangle, the displayed alignment guides (e.g., 8008-8, 8008-9, and 8008-10 in FIG. 8C) will emanate only from the bottom of the rectangle (e.g., user interface object 8002-1 in FIG. 8C), as shown in FIG. 8C.

In some embodiments, the one or more displayed alignment guides are determined (1218) based at least in part on the movement associated with the first input. For example, if the currently selected user interface object is moving to the right in accordance with the movement associated with first input (e.g., in response to detecting lateral movement 8006, FIG. 8A), the displayed alignment guides (e.g., 8008-1, 8008-2 and 8008-3 in FIG. 8B) will emanate from the right side of the currently user interface object (e.g., 8002-1 in FIG. 8B), as shown in FIG. 8B. Conversely, if the currently selected user interface object is moving to the left, the displayed alignment guides will emanate from the left side of the currently selected user interface object.

Figure 8C:
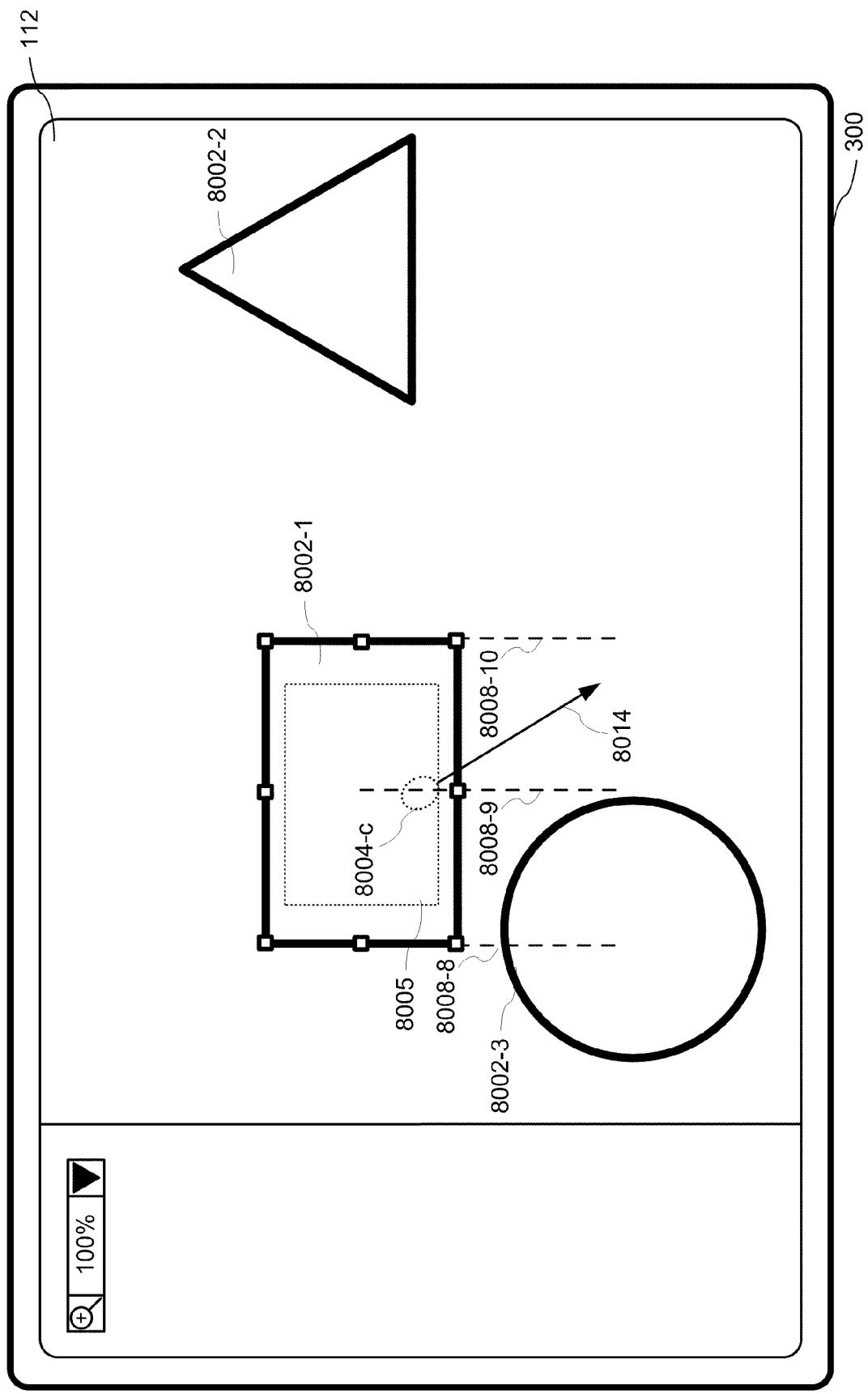
Figure 8D:
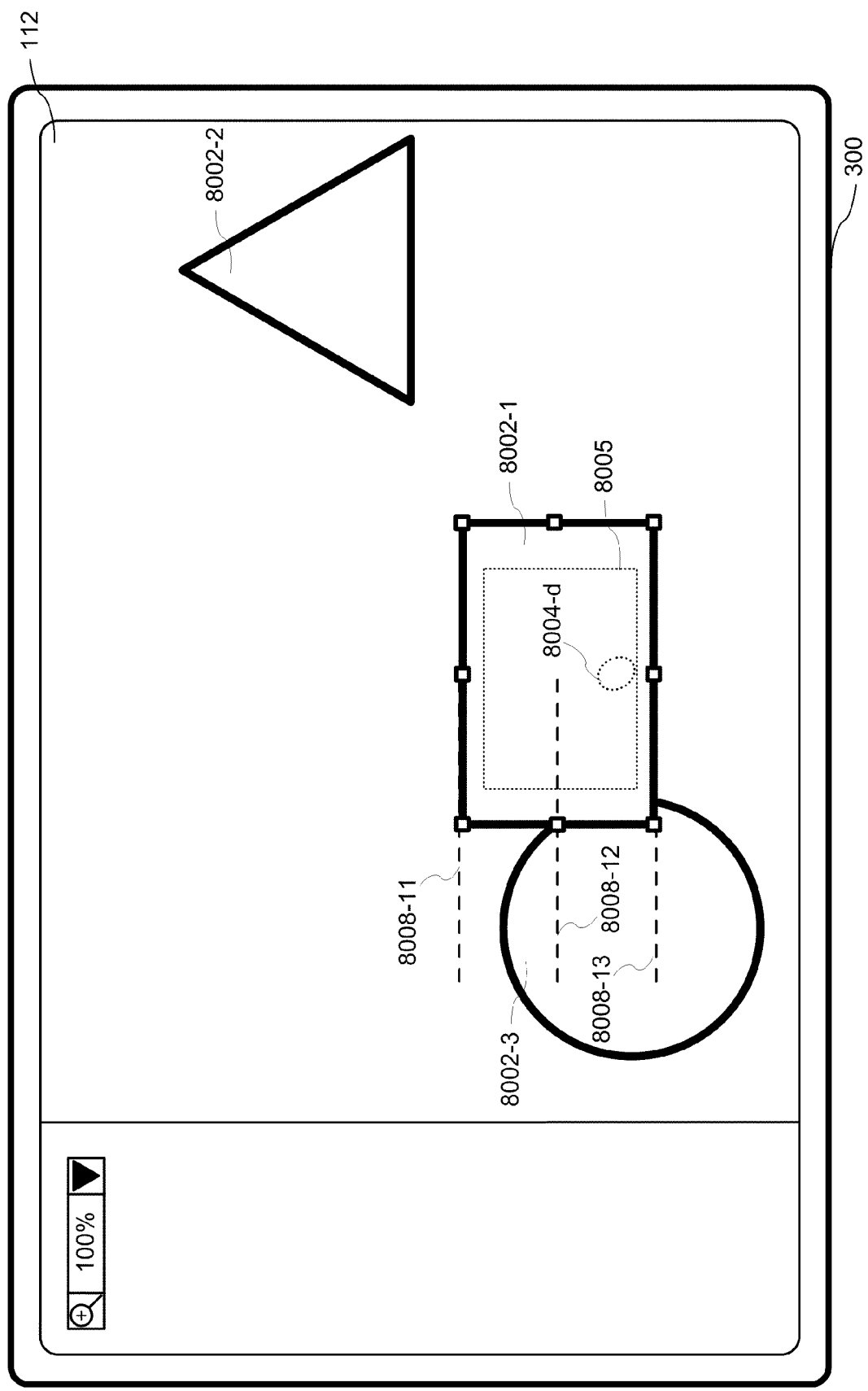
Figure 8E:
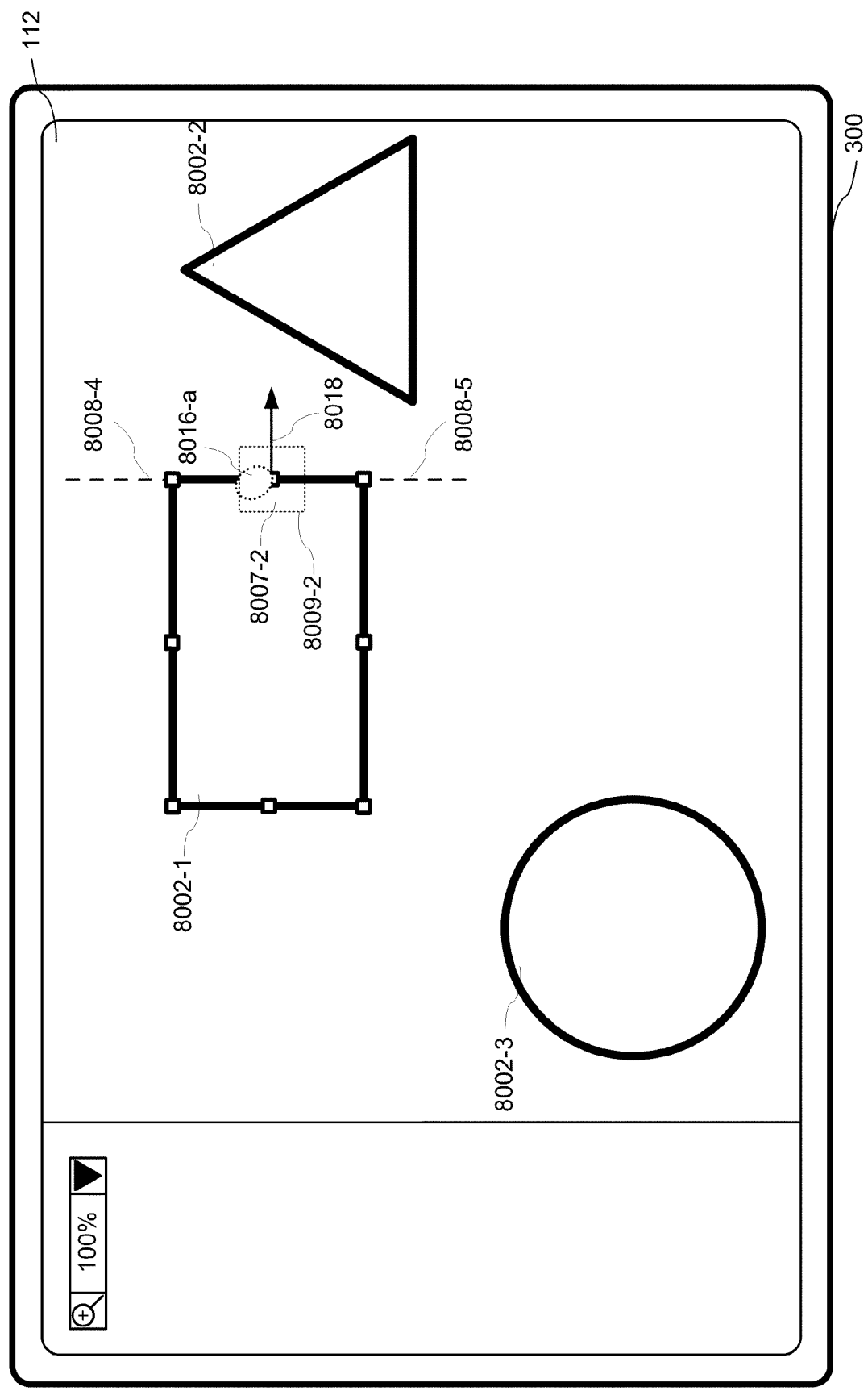

In some embodiments, the alignment guides change dynamically as the position of the currently selected object (e.g., 8002-1 in FIGS. 8A-8D) moves relative to the other user interface objects (e.g., 8002-2 and 8002-3 in FIGS. 8A-8D). For example, in FIG. 8A, the device detects a contact 8004 with the object manipulation region 8005 of the currently selected user interface object 8002-1 and subsequently detects lateral movement 8006 of the contact 8004 to a new contact location 8004-*b* in FIG. 8B, and responds by moving the currently selected user interface object 8002-1 in accordance with the detected lateral movement 8006, as illustrated in FIG. 8B. During the of the currently selected movement the user interface object, while the currently selected user interface object (e.g., 8002-1 in FIG. 8B) is proximate to another user interface object (e.g., 8002-2 in FIG. 8B), alignment guides (e.g. 8008-1, 8008-2 and 8008-3 in FIG. 8B) are displayed emanating from the right side of the currently selected user interface object 8002-1. Continuing this example, in FIG. 8B, the device detects further lateral movement 8012 of the contact 8004 to a new contact location 8004-*c* in FIG. 5C, and responds by moving the currently selected user interface object 8002-1 in accordance with the detected lateral movement 8012, as illustrated in FIG. 8C. During the movement of the currently selected user interface object, while the bottom of the currently selected user interface object (e.g., 8002-1 in FIG. 8C) is proximate to another user interface object (e.g., 8002-3 in FIG. 8C), alignment guides (e.g. 8008-8, 8008-9 and 8008-10 in FIG. 8C) are displayed emanating from the bottom side of the currently selected user interface object 8002-1. Continuing this example, in FIG. 8C, the device detects further lateral movement 8014 of the contact 8004 to a new contact location 8004-*d*, and responds by moving the currently selected user interface object 8002-1 in accordance with the detected lateral movement 8014, as illustrated in FIG. 8D. During the movement the currently selected user interface object, while the left side of the currently selected user interface object (e.g., 8002-1 in FIG. 8D) is proximate to another user interface object (e.g., 8002-3 in FIG. 8D), alignment guides (e.g. 8008-11, 8008-12 and 8008-13 in FIG. 8D) are displayed emanating from the left side of the currently selected user interface object 8002-1. Thus, in this example, the alignment guides change dynamically during the course of a continuous movement of a single continuous contact associated with the currently selected user interface object. While the preceding example has been given with reference to the movement of a single contact, it should be understood that in other examples one or more of the movements of the contact could be preceded by a lift-off of the contact and the detection of a new contact.

It should be understood that, in accordance with some of these embodiments, the one or more displayed alignment guides are determined based at least in part on the location of the other user interface object relative to the currently selected user interface object. For example, in FIG. 8C, the circle 8002-3 is located below the currently selected user interface object (e.g., rectangle 8002-1), and the alignment guides (e.g., 8008-8, 8008-9 and 8008-10 in FIG. 8C) emanate from the bottom of the rectangle, while in FIG. 8D, when the currently selected user interface object 8002-1 has moved so that it is on the right side of the circle 8002-3, the alignment guides (e.g., 8008-11, 8008-12, 8008-13) emanate from the left side of the currently selected user interface object (e.g., 8002-1 in FIG. 8D).

In some embodiments, the one or more displayed alignment guides include one or more edge alignment guides (e.g., 8008-1 and 8008-3, FIG. 8B, or 8008-4 and 8008-5, FIG. 8E) that emanate from an edge of the currently user interface object (1220) (e.g., the edge alignment guides extend the edges of the currently selected user interface object so that the edge of the currently selected user interface object can be aligned with other user interface objects even when the edge of the currently selected user interface object is not immediately adjacent to the other user interface objects). For example, when the device detects an input (e.g., contact 8016 in FIG. 8E) with an activation handle (e.g., 8007-2 in FIGS. 8E-8F) or activation region (e.g., 8009-2 in FIGS. 8E-8F) associated with the activation handle of the currently selected user interface object (e.g., 8002-1 in FIG. 8E), the device displays one or more alignment guides (e.g., 8008-4 and 8008-5 in FIG. 8E). In this example, the device detects subsequent movement 8018 of the contact 8016 from an initial position (e.g., 8016-*a* in FIG. 8E) to a current position (e.g., 8016-*b* in FIG. 8F), which is proximate to another user interface object (e.g., 8002-2 in FIG. 8F). In response to this subsequent movement, the device snaps the alignment guide to the other user interface object (e.g., 8002-2 in FIG. 8F). When the device snaps the alignment guide to the other user interface object (e.g., 8002-2 in FIG. 8F), the currently selected user interface object (e.g., 8002-1 in FIG. 8F) is moved and/or resized as necessary so that the alignment guide (e.g., 8008-5 in FIG. 8F) maintains its orientation and position with respect to the currently selected user interface object (e.g., 8002-1 in FIG. 8F) as well as the orientation and position that it has "snapped to" with respect to the other user interface object (e.g., 8002-2 in FIG. 8F).

In some embodiments, the one or more displayed alignment guides include a center alignment guide (1222) (e.g., an alignment guide 8008-2 that emanates from or goes through the center of the currently selected user interface object 8002-1 in FIG. 8B).

In some embodiments, the one or more displayed alignment guides include a diagonal alignment guide (1224). In some embodiments, a diagonal alignment guide (e.g., 8008-6 in FIG. 8G or 8008-7 in FIGS. 8H-8J) emanates from a vertex of the currently selected user interface object (e.g., the lower right corner of the currently selected user interface object 8002-1 in FIG. 8G) at a diagonal angle (rather than being purely horizontal or purely vertical). In some embodiments, a diagonal alignment guide emanates from the center of the currently selected user interface object and passes through a vertex of the currently selected user interface object (e.g., the lower right corner of the currently selected user interface object 8002-1 in FIG. 8H), as illustrated by alignment guide 8008-7 in FIG. 8H. It should be understood that, in accordance with some embodiments, this diagonal alignment guide is adjusted so as to continue to emanate from the same vertex of the currently selected user interface object, even as the aspect ratio, position and/or size of the currently selected user interface object changes. For example, in FIG. 8H, in response to detecting a contact 8020 with the lower right corner of the currently selected user interface object 8002-1, and subsequent movement 8022 of the contact from an initial position (e.g., 8020-*a* in FIG. 8H) to a current position (e.g., 8020-*b* in FIG. 8I), the device resizes the currently selected user interface object and adjusts the diagonal alignment guide 8008-7 so that the diagonal alignment guide 8008-7 emanates from the lower right corner of the currently selected user interface object 8002-1 in FIG. 8I. In some embodiments, the diagonal alignment guide is a continuous line. In some embodiments, the diagonal alignment guide is configured to snap the currently selected user interface object to other nearby user interface objects (e.g., during lateral movement of the first input).

Figure 8F:
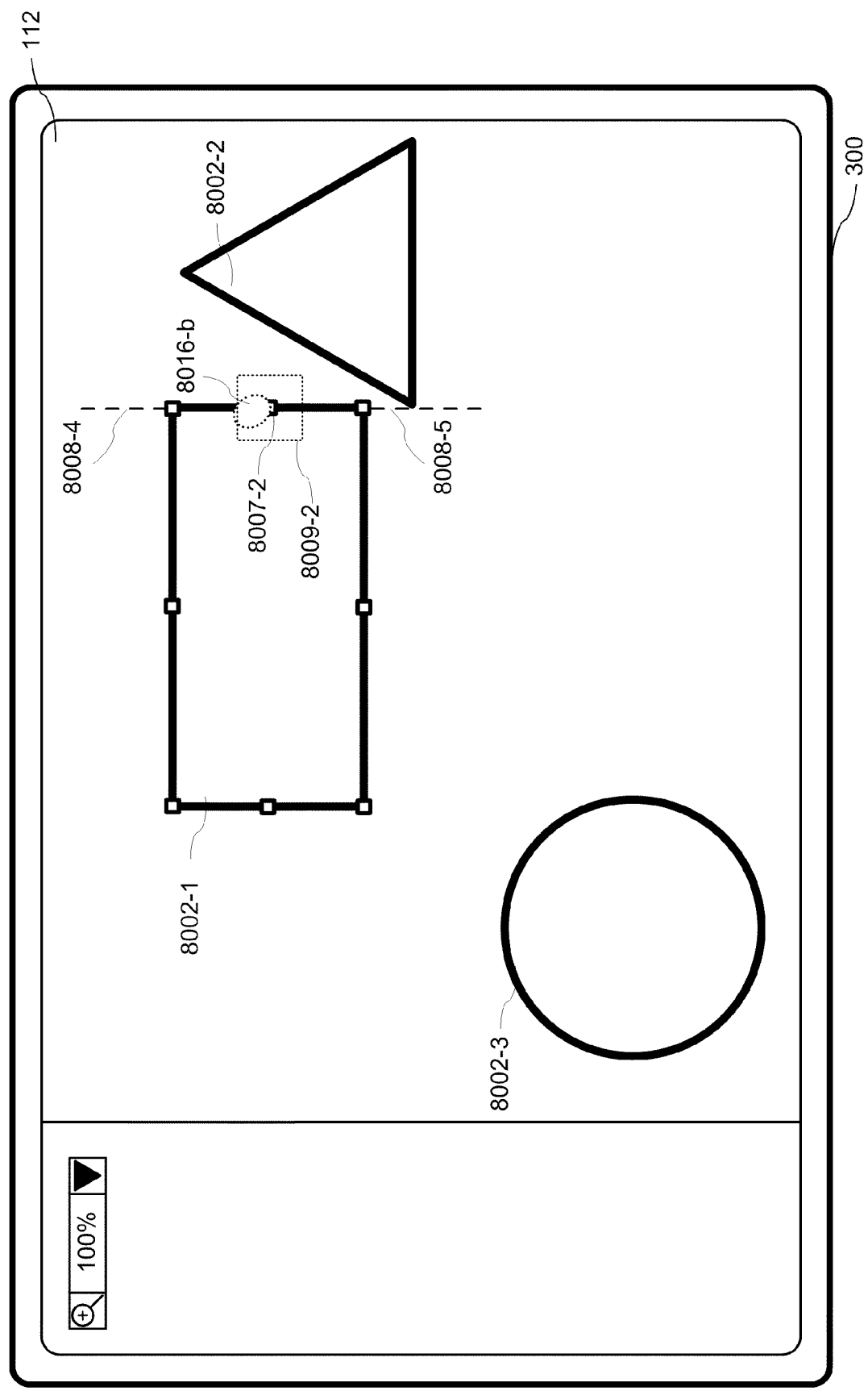
Figure 8G:
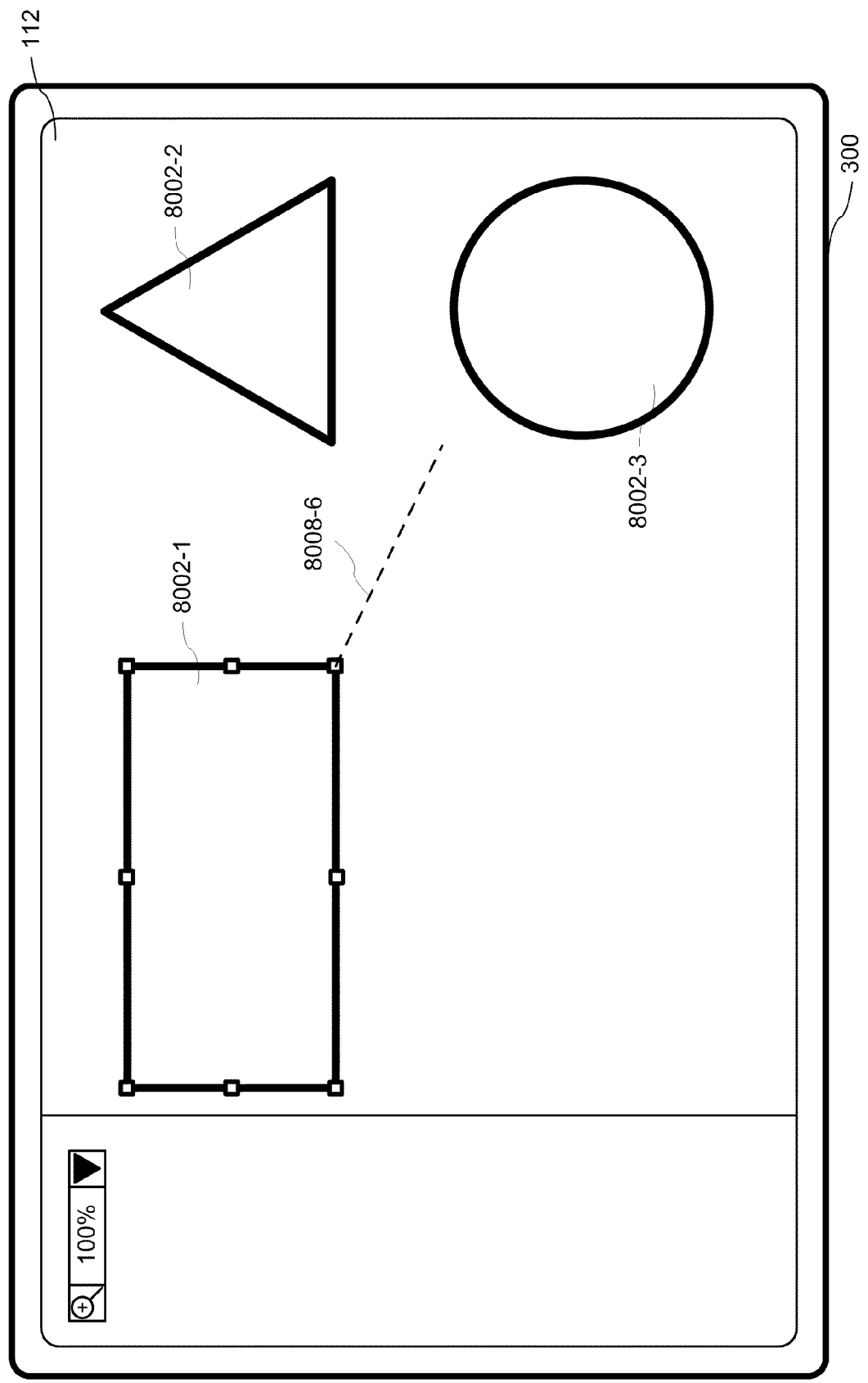
Figure 8H:
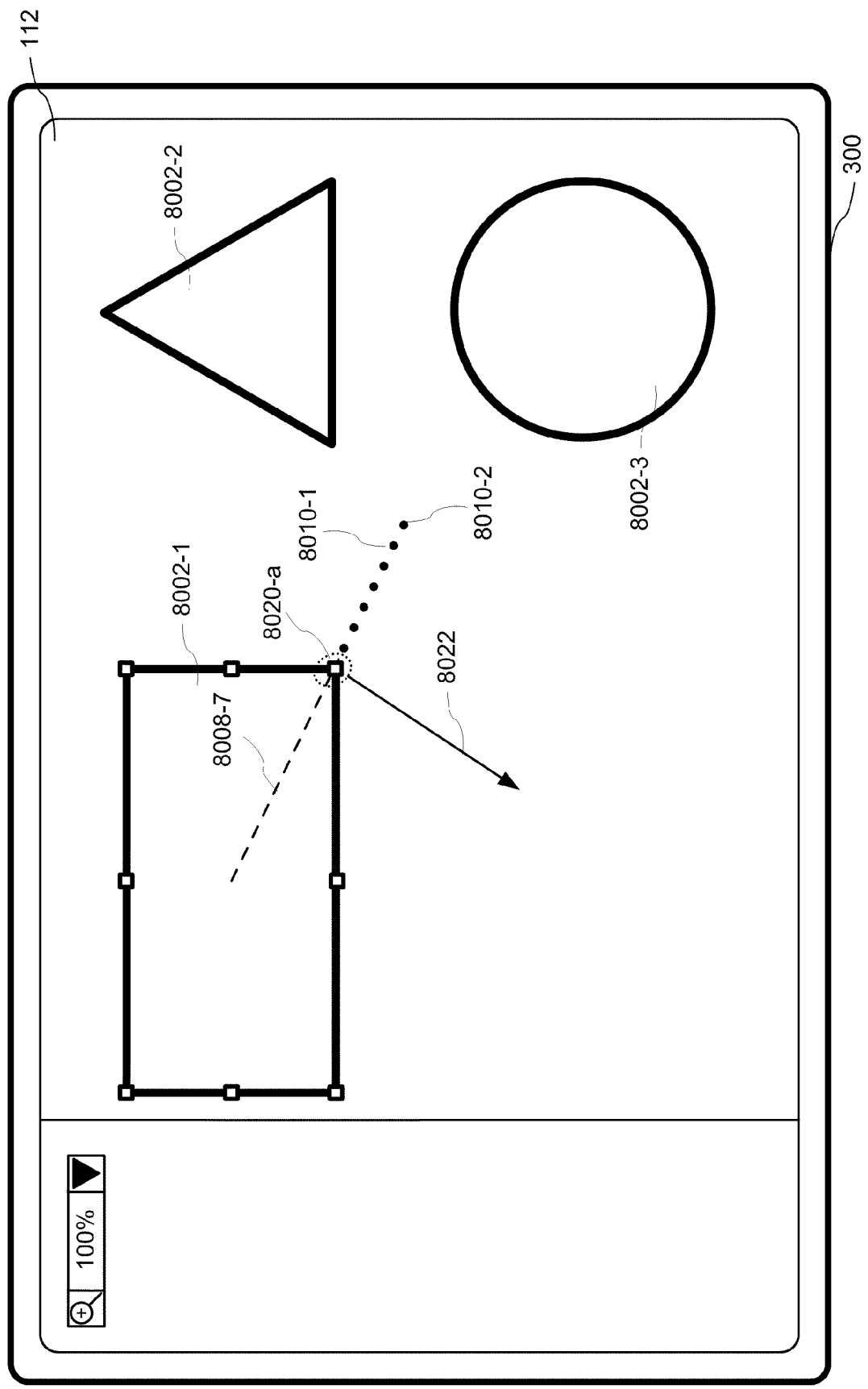
Figure 8I:
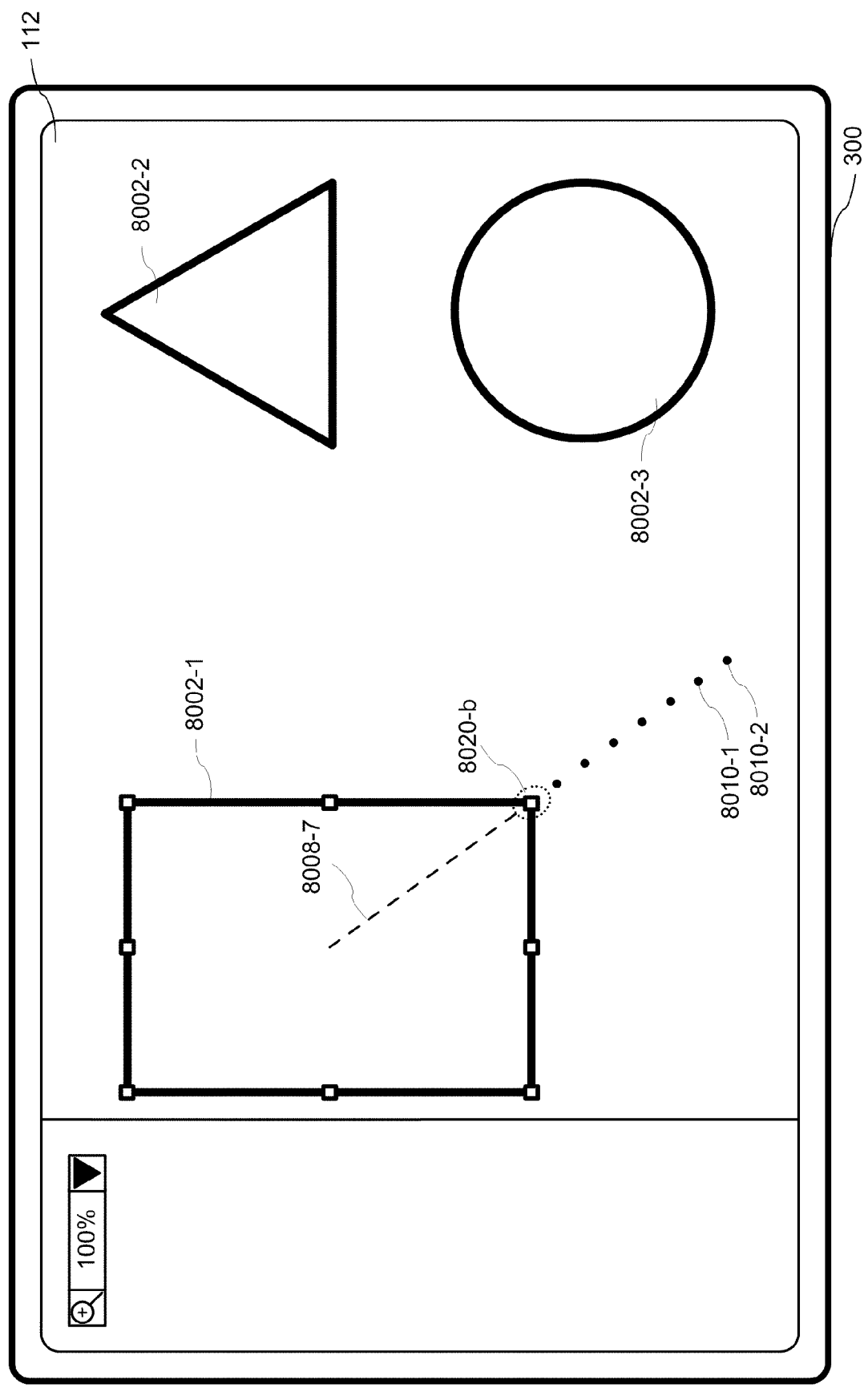
Figure 8J:
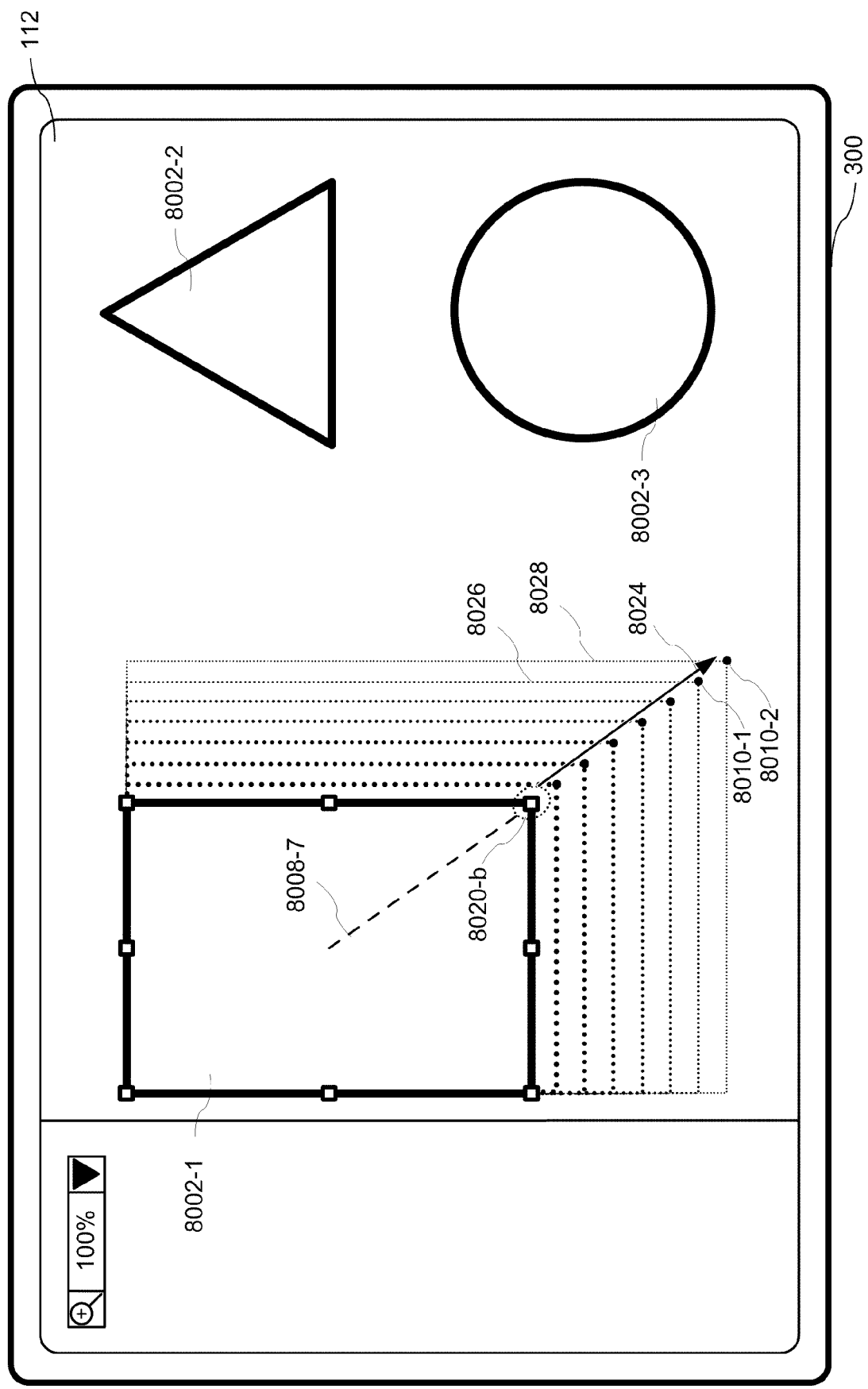

In some embodiments, the diagonal alignment guide includes a plurality of discrete snapping points (e.g., 8010, FIG. 8H), and the currently selected user interface object is snapped to a respective snapping point of the plurality of discrete snapping points when the currently selected user interface object is within a predefined distance of the respective snapping point (1226), as illustrated in FIG. 8J. For example, in FIG. 8J, when the device detects a contact 8020 with an activation handle for the currently selected user interface object 8002-1, and subsequent movement 8024 of the contact along the diagonal alignment guide 8008-7 that includes the snapping points (e.g., 8010-1 and 8010-2 in FIG. 8J), the device snaps the corner of the currently selected user interface object 8002-1 to the snapping points (e.g., 8010-1 and 8010-2, etc.) along the diagonal alignment guide. Thus, in this example, when the contact 8020 is proximate to a first snapping point (e.g., 8010-1) the currently selected user interface object 8002-1 is snapped to a first size (e.g., 8026 in FIG. 8J) associated with the first snapping point (e.g., 8010-1), and when the contact 8020 is proximate to a second snapping point (e.g., 8010-2) the currently selected user interface object 8002-1 is snapped to a second size (e.g., 8028 in FIG. 8J) associated with the second snapping point (e.g., 8010-2). It should be understood that, in some embodiments, as illustrated in FIG. 8J a similar snapping action is performed in response to moving the corner of the currently selected user interface object proximate to any of the discrete snapping points in the diagonal alignment guide 8008-7.

In some embodiments, the diagonal alignment guide indicates an aspect ratio (e.g., 1:1 or 2:3), and the individual snapping points along the diagonal alignment guide indicate sizes of the currently selected user interface object that conform to that aspect ratio, where one of the dimensions is an integer multiple of some predefined length (e.g., 50 pixels, 1 centimeter, 0.5 inches, etc.). For example, when the currently selected user interface object is a rectangle with a 2:3 aspect ratio that is 200×300 pixels, the diagonal alignment guide shows other possible sizes that have the 2:3 aspect ratio, and the diagonal alignment guide includes snapping points along the diagonal alignment guide at locations where the user interface object would have the dimensions of 233×350 pixels, 266×400 pixels, 300×450 pixels and 333×500 pixels. In some embodiments, only the snapping points are displayed.

In some embodiments, the plurality of discrete snapping points 5010 are positioned such that adjacent snapping points are equidistant from each other along the diagonal alignment guide (1228), as illustrated in FIGS. 8H-8I.

In some embodiments, the currently selected user interface object is contained within a bounding box having a first side and a second side that is orthogonal to the first side. The plurality of discrete snapping points are positioned such that: when the first side is longer than the second side, the distance between the snapping points in a direction parallel to the first side is less than a predefined distance; and when the second side is longer than the first side, the distance between the snapping points in a direction parallel to the second side is less than the predefined distance (1230). In some embodiments, when the first side is longer than the second side, the distance between the snapping points in a direction parallel to the first side is substantially equal to the predefined distance. In some embodiments, when the second side is longer than the first side, the distance between the snapping points in a direction parallel to the second side is substantially equal to the predefined distance. For example, if the predefined distance is 1 centimeter, then the snapping points are always less than 1 centimeter apart in both the horizontal direction and the vertical direction. This arrangement can also be understood as snapping points which are arranged on the intersections between the alignment guide and the gridlines of a grid, where the origin of the grid is at the vertex from which the alignment guide emanates and the gridlines are the predefined distance (e.g., 1 centimeter) apart in the vertical direction and the predefined distance (e.g., 1 centimeter) apart in the horizontal direction; in this example, the snapping points are located at the intersections of the alignment guide with either the vertical gridlines or the horizontal gridlines, whichever results in snapping points that are closer together.

In some embodiments, the currently selected object includes a plurality of resizing handles with corresponding handle activation regions; the first input occurs at a location on the touch sensitive surface that corresponds to a first handle activation region; and the one or more displayed alignment guides are determined based at least in part on the first handle activation region (1232). In some embodiments, the type of alignment guide that is displayed depends on which handle activation region/resizing handle the first input makes contact with. For example, when a corner is being repositioned so as to resize the user interface object, the displayed alignment guides may include a diagonal alignment guide (e.g., 8008-7 in FIGS. 8H-8I) that indicates the aspect ratio of the currently selected user interface object (as illustrated in FIGS. 8H-8J). As another example, when an edge is being moved, edge alignment guides are displayed which emanate from the ends of the side to indicate what the edge is currently aligned with (e.g., as shown in FIG. 8F, where alignment guide 8008-5 is aligned with the leftmost vertex of a triangular user interface object 8002-2).

In some embodiments, one of the one or more displayed alignment guides emanates (1234) from the center of the currently selected user interface object through a resizing handle that corresponds to the first handle activation region (e.g., alignment guide 8008-12 in FIG. 8D). In some embodiments, when the first handle activation region corresponds to a first resizing handle on a perimeter of the currently selected user interface object, one of the one or more displayed alignment guides is perpendicular to a ray extending from the center of the currently selected user interface object through the first resizing handle (1236). For example, if the first resizing handle is in the center of an edge of a rectangle, then the displayed alignment guide is parallel to the edge of the rectangle (e.g., as illustrated by alignment guides 8008-4 and 8008-5 in FIGS. 8E-8F). As another example, if the first resizing handle is on the perimeter of a circle, then the alignment guide is a line tangent to the circle at the first resizing handle.

In some embodiments, the currently selected object includes an object activation region that includes the center of the currently selected user interface object (e.g., 8005 in FIGS. 8A-8D). The object activation region is for selecting and moving the user interface object, rather than resizing the user interface object, as illustrated in FIGS. 8A-8D. When the first input occurs at a location on the touch sensitive surface that corresponds to the object activation region, the one or more displayed alignment guides include edge alignment guides (1238), as illustrated in FIGS. 8A-8D.

The device moves or resizes (1240) the currently selected user interface object in accordance with the lateral movement of the first input. The one or more alignment guides move in accordance with the moving or resizing of the user interface object (e.g., the displayed alignment guides move as if they are a part of the user interface object), as illustrated in FIGS. 8E-8F and 8K-8L.

In some embodiments, moving or resizing the currently selected user interface object includes adjusting a shape, size, and/or rotation of the user interface object. For example, in FIGS. 8E-8F, the size of the currently selected user interface object 8002-1 is increased by stretching the currently selected user interface 8002-1 object horizontally. As another example, in FIGS. 8H-8I, the size and aspect ratio of the currently selected user interface object 8002-1 is changed as a result of repositioning the lower right corner of the currently selected user interface object 8002-1.

In some embodiments, moving or resizing the currently selected user interface object includes snapping (1242) the currently selected user interface object to another user interface object that is proximate to one of the displayed alignment guides. In some embodiments, the currently selected user interface object is snapped to other user interface objects in accordance with the one or more displayed alignment guides (e.g., as shown in FIGS. 8K and 8L).

Figure 8K:
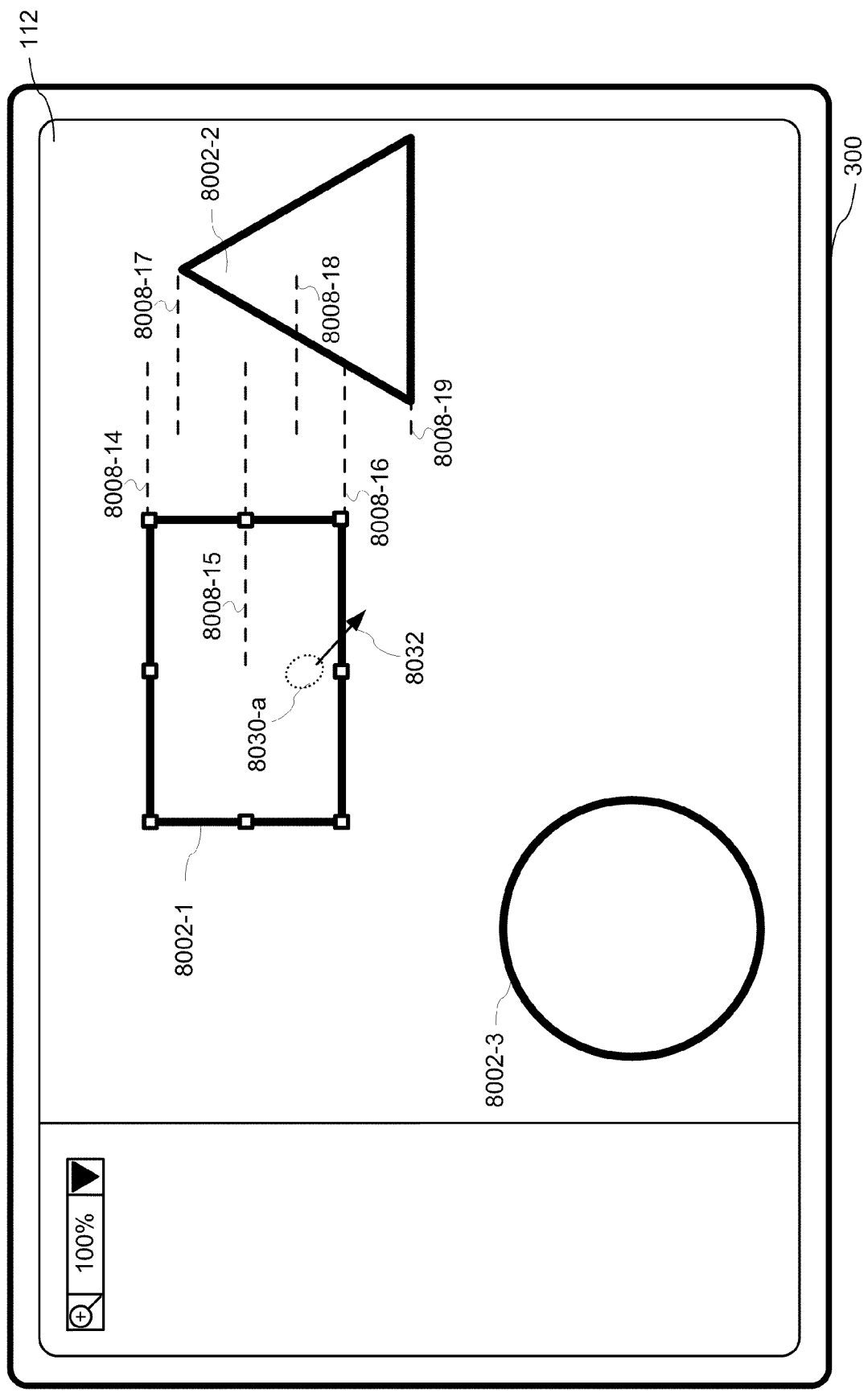
Figure 8L:
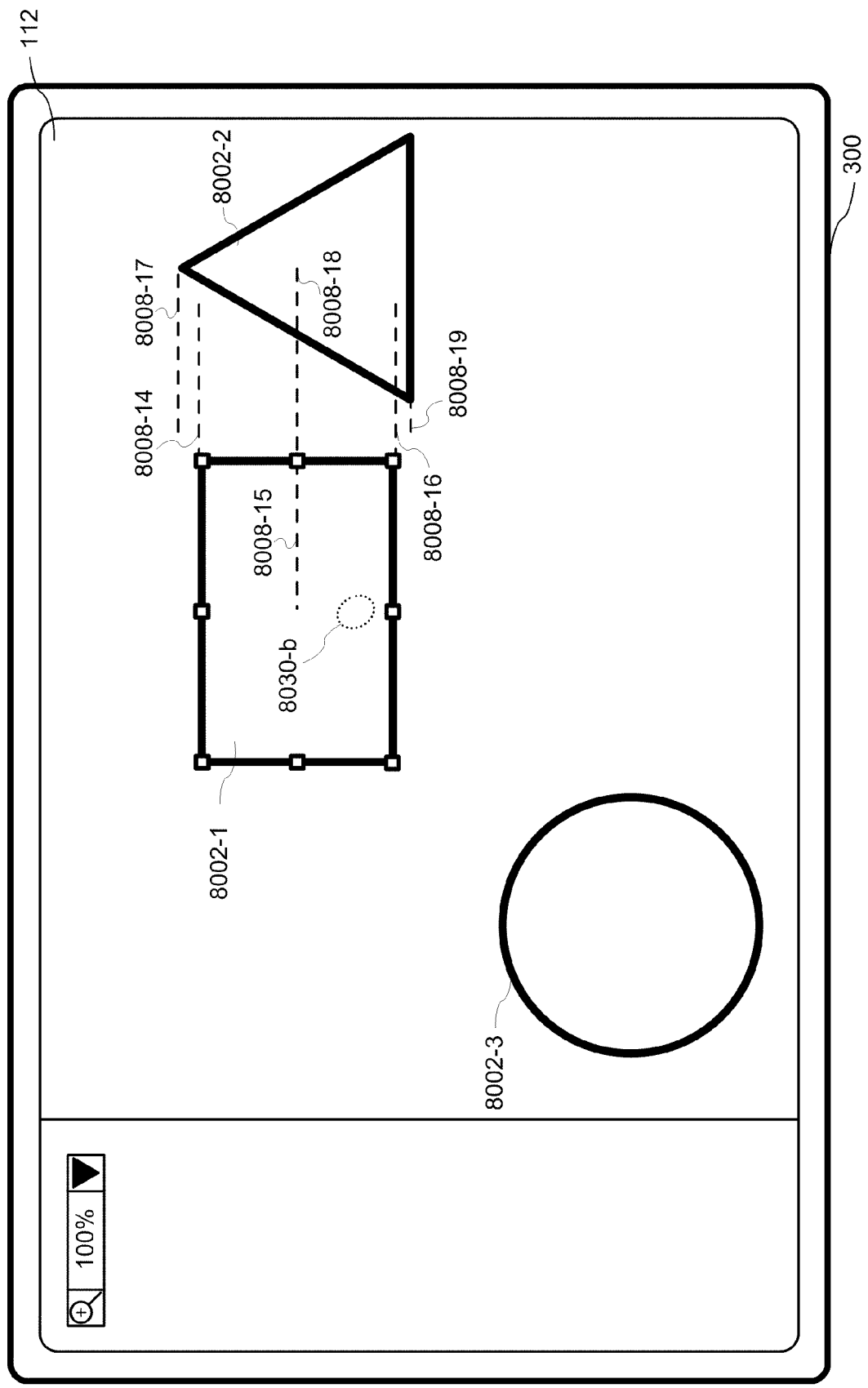

In some embodiments, the device displays (1244) alignment guides emanating from a user interface object in the plurality of user interface objects (e.g., a user interface object 8002-2 other than the currently selected user interface object 8002-1 in FIGS. 8K-8L) that is closest to the currently selected user interface object, as shown in FIGS. 8K-8L. For example, in FIG. 8K, the currently selected user interface object 8002-1 includes a plurality of alignment guides (e.g., 8008-14, 8008-15 and 8008-16) displayed emanating from the currently selected user interface object 8002-1 towards the closest other user interface object 8002-2; likewise, the closest other user interface object 8002-2 also includes a plurality of alignment guides (e.g., 8008-17, 8008-18 and 8008-19) displayed emanating from the closest other user interface object 8002-2 towards the currently selected user interface object 8002-1. In this example, the device detects an input (e.g., contact 8030, and subsequent movement 8032 of the contact from an initial position 8030-a to a current position 8030-b on the touch-sensitive surface) that is indicative of a command to laterally move the currently selected user interface object towards alignment guides (e.g., 8008-17, 8008-18 and 8008-19) emanating from the closest other user interface object 8002-2. In response to this input, the device snaps the currently selected user interface object 8002-1 to the alignment guides (e.g., 8008-17, 8008-18 and 8008-19) emanating from the closest other user interface object 8002-2.

It should be understood that, in some embodiments, the snapping interactions of the currently selected user interface object 8002-1 with the alignment guides (e.g., 8008-17, 8008-18 and 8008-19) emanating from the closest other user interface object 8002-2 are in addition to any snapping interactions of the currently selected user interface object 8002-1 with the alignment guides (e.g., 8008-14, 8008-15, 8008-16) emanating from the currently selected user interface object 8002-1. Exemplary snapping interactions with the alignment guides (e.g., 8008-14, 8008-15, 8008-16) emanating from the currently selected user interface object 8002-1 are discussed in greater detail above with reference to FIGS. 8A-8J). Additionally, in some embodiments, alignment guides are displayed emanating from a plurality of the one or more other user interface objects towards the currently selected user interface object, rather than merely being displayed emanating from a single user interface object, as discussed in greater detail above with reference to FIGS. 8K-8L.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 9A-9C, 10A-10C, 11A-11B, and 12A-12D may be implemented by components depicted in FIGS. 1A-1C. For example, detection operation 904, second user interface display or first user interface zoom operation 906, and object modification operation 1010 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176, object updater 177 or GUI updater 178 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A multifunction device, comprising:
a display;
a touch-sensitive surface;
one or more processors;
memory; and
one or more programs, wherein the one or more programs are stored in the memory and configured to be executed by the one or more processors, the one or more programs including instructions for:
displaying a first user interface for an application at a first magnification level, wherein:
the first user interface is in an electronic document authoring application;
the first user interface includes a first plurality of user interface objects; and
the application has a range of magnification levels, including a predefined magnification level for requesting a second user interface with a multi-finger pinch gesture;
detecting a first multi-finger pinch gesture on the touch-sensitive surface;
in response to detecting the first multi-finger pinch gesture:
when the first magnification level is the predefined magnification level, maintaining the first user interface at the predefined magnification level and displaying the second user interface simultaneously with the first user interface, wherein the second user interface includes a second plurality of user interface objects that are distinct from the first plurality of user interface objects in the first user interface; and
when the first magnification level is greater than the predefined magnification level, zooming out the first user interface in accordance with the first multi-finger pinch gesture;
while displaying the second user interface simultaneously with the first user interface, detecting a gesture on the touch-sensitive surface at a location that corresponds to a user interface object in the second plurality of user interface objects; and,
in response to detecting the gesture on the touch-sensitive surface at the location that corresponds to the user interface object in the second plurality of user interface objects, inserting the user interface object into the first user interface.

2. The device of claim 1, wherein zooming out the first user interface in accordance with the first multi-finger pinch gesture comprises demagnifying the first user interface to a variable magnification level within the range of magnification levels in accordance with the first multi-finger pinch gesture.

3. The device of claim 1, wherein:
the application has a set of predefined magnification levels; and
zooming out the first user interface in accordance with the first multi-finger pinch gesture comprises demagnifying the first user interface to a respective magnification level in the set of predefined magnification levels in accordance with the first multi-finger pinch gesture.

4. The device of claim 1, wherein the second user interface is a navigation pane for the electronic document authoring application that displays a list or array of representations of other views, menus, options, and/or locations within the electronic document authoring application.

5. The device of claim 1, further comprising instructions for, while displaying the second user interface:
detecting a gesture on the touch-sensitive surface at a location that corresponds to the first user interface; and,
in response to detecting the gesture on the touch-sensitive surface at the location that corresponds to the first user interface, ceasing to display the second user interface.

6. The device of claim 1, wherein the second user interface is an object palette.

7. A multifunction device, comprising:
a display;
a touch-sensitive surface;
one or more processors;
memory; and
one or more programs, wherein the one or more programs are stored in the memory and configured to be executed by the one or more processors, the one or more programs including instructions for:
displaying a first user interface for an application at a first magnification level, wherein:
the first user interface includes a first plurality of user interface objects; and
the application has a range of magnification levels, including a predefined magnification level for requesting a second user interface with a multi-finger pinch gesture;
detecting a first multi-finger pinch gesture on the touch-sensitive surface; and,
in response to detecting the first multi-finger pinch gesture:
when the first magnification level is the predefined magnification level, maintaining the first user interface at the predefined magnification level and displaying the second user interface simultaneously with the first user interface, wherein the second user interface includes a second plurality of user interface objects that are distinct from the first plurality of user interface objects in the first user interface; and
when the first magnification level is greater than the predefined magnification level, zooming out the first user interface in accordance with the first multi-finger pinch gesture; wherein:
the application has a set of predefined magnification levels; and
zooming out the first user interface in accordance with the first multi-finger pinch gesture comprises:
when a velocity of the first multi-finger pinch gesture is less than a predefined gesture velocity threshold, demagnifying the first user interface to a variable magnification level within the range of magnification levels in accordance with the first multi-finger pinch gesture; and,
when the velocity of the first multi-finger pinch gesture is greater than the predefined gesture velocity threshold, demagnifying the first user interface directly to a respective magnification level in the set of predefined magnification levels in accordance with the first multi-finger pinch gesture.

8. A multifunction device, comprising:
a display;
a touch-sensitive surface;
one or more processors;
memory; and
one or more programs, wherein the one or more programs are stored in the memory and configured to be executed by the one or more processors, the one or more programs including instructions for:
displaying a first user interface for an application at a first magnification level, wherein:
the first user interface includes a first plurality of user interface objects; and
the application has a range of magnification levels, including a predefined magnification level for requesting a second user interface with a multi-finger pinch gesture;

detecting a first multi-finger pinch gesture on the touch-sensitive surface; and,
in response to detecting the first multi-finger pinch gesture:
when the first magnification level is the predefined magnification level, maintaining the first user interface at the predefined magnification level and displaying the second user interface simultaneously with the first user interface, wherein the second user interface includes a second plurality of user interface objects that are distinct from the first plurality of user interface objects in the first user interface; and
when the first magnification level is greater than the predefined magnification level, zooming out the first user interface in accordance with the first multi-finger pinch gesture;
wherein the first user interface is in an electronic document authoring application and the second user interface is a document properties pane for the electronic document authoring application that displays a list or array of document property information associated with the first user interface including at least one of text size, margins, page number, hue, saturation, brightness, and zoom level.

9. A method, comprising:
at a multifunction device with a display and a touch-sensitive surface:
displaying a first user interface for an application at a first magnification level, wherein:
the first user interface is in an electronic document authoring application;
the first user interface includes a first plurality of user interface objects; and
the application has a range of magnification levels, including a predefined magnification level for requesting a second user interface with a multi-finger pinch gesture;
detecting a first multi-finger pinch gesture on the touch-sensitive surface;
in response to detecting the first multi-finger pinch gesture:
when the first magnification level is the predefined magnification level, maintaining the first user interface at the predefined magnification level and displaying the second user interface simultaneously with the first user interface, wherein the second user interface includes a second plurality of user interface objects that are distinct from the first plurality of user interface objects in the first user interface; and
when the first magnification level is greater than the predefined magnification level, zooming out the first user interface in accordance with the first multi-finger pinch gesture;
while displaying the second user interface simultaneously with the first user interface, detecting a gesture on the touch-sensitive surface at a location that corresponds to a user interface object in the second plurality of user interface objects; and,
in response to detecting the gesture on the touch-sensitive surface at the location that corresponds to the user interface object in the second plurality of user interface objects, inserting the user interface object into the first user interface.

10. The method of claim 9, wherein zooming out the first user interface in accordance with the first multi-finger pinch gesture comprises demagnifying the first user interface to a variable magnification level within the range of magnification levels in accordance with the first multi-finger pinch gesture.

11. The method of claim 9, wherein:
the application has a set of predefined magnification levels; and
zooming out the first user interface in accordance with the first multi-finger pinch gesture comprises demagnifying the first user interface to a respective magnification level in the set of predefined magnification levels in accordance with the first multi-finger pinch gesture.

12. The method of claim 9, wherein the second user interface is a navigation pane for the electronic document authoring application that displays a list or array of representations of other views, menus, options, and/or locations within the electronic document authoring application.

13. The method of claim 9, further comprising, while displaying the second user interface:
detecting a gesture on the touch-sensitive surface at a location that corresponds to the first user interface; and,
in response to detecting the gesture on the touch-sensitive surface at the location that corresponds to the first user interface, ceasing to display the second user interface.

14. The method of claim 9, wherein the second user interface is an object palette.

15. A non-transitory computer readable storage medium having stored therein instructions, which when executed by a multifunction device with a display and a touch-sensitive surface, cause the device to:
display a first user interface for an application at a first magnification level, wherein:
the first user interface is in an electronic document authoring application;
the first user interface includes a first plurality of user interface objects; and
the application has a range of magnification levels, including a predefined magnification level for requesting a second user interface with a multi-finger pinch gesture;
detect a first multi-finger pinch gesture on the touch-sensitive surface;
in response to detecting the first multi-finger pinch gesture:
when the first magnification level is the predefined magnification level, maintain the first user interface at the predefined magnification level and display the second user interface simultaneously with the first user interface, wherein the second user interface includes a second plurality of user interface objects that are distinct from the first plurality of user interface objects in the first user interface; and
when the first magnification level is greater than the predefined magnification level, zoom out the first user interface in accordance with the first multi-finger pinch gesture;
while displaying the second user interface simultaneously with the first user interface, detect a gesture on the touch-sensitive surface at a location that corresponds to a user interface object in the second plurality of user interface objects; and,
in response to detecting the gesture on the touch-sensitive surface at the location that corresponds to the user interface object in the second plurality of user interface objects, insert the user interface object into the first user interface.

16. The computer readable storage medium of claim 15, wherein zooming out the first user interface in accordance with the first multi-finger pinch gesture comprises demagnifying the first user interface to a variable magnification level within the range of magnification levels in accordance with the first multi-finger pinch gesture.

17. The non-transitory computer readable storage medium of claim 15, wherein:
the application has a set of predefined magnification levels; and
zooming out the first user interface in accordance with the first multi-finger pinch gesture comprises demagnifying the first user interface to a respective magnification level in the set of predefined magnification levels in accordance with the first multi-finger pinch gesture.

18. The non-transitory computer readable storage medium of claim 15, wherein the second user interface is a navigation pane for the electronic document authoring application that displays a list or array of representations of other views, menus, options, and/or locations within the electronic document authoring application.

19. The non-transitory computer readable storage medium of claim 15, further comprising instructions which cause the device to, while displaying the second user interface:
detect a gesture on the touch-sensitive surface at a location that corresponds to the first user interface; and,
in response to detecting the gesture on the touch-sensitive surface at the location that corresponds to the first user interface, cease to display the second user interface.

20. The non-transitory computer readable storage medium of claim 15, wherein the second user interface is an object palette.

21. A graphical user interface on a multifunction device with a display, a touch-sensitive surface, a memory, and one or more processors to execute one or more programs stored in the memory, the graphical user interface comprising:
a first user interface for an application at a first magnification level;
wherein:
the first user interface is in an electronic document authoring application;
the first user interface includes a first plurality of user interface objects;
the application has a range of magnification levels, including a predefined magnification level for requesting a second user interface with a multi-finger pinch gesture;
in response to detecting a first multi-finger pinch gesture on the touch-sensitive surface:
when the first magnification level is the predefined magnification level, the first user interface is maintained at the predefined magnification level and the second user interface is displayed simultaneously with the first user interface, wherein the second user interface includes a second plurality of user interface objects that are distinct from the first plurality of user interface objects in the first user interface; and
when the first magnification level is greater than the predefined magnification level, the first user interface is zoomed out in accordance with the first multi-finger pinch gesture; and
while displaying the second user interface simultaneously with the first user interface, in response to detecting a gesture on the touch-sensitive surface at a location that corresponds to a user interface object in the second plurality of user interface objects, the user interface object is inserted into the first user interface.

22. A method, comprising:
at a multifunction device with a display and a touch-sensitive surface:
displaying a first user interface for an application at a first magnification level, wherein:
the first user interface includes a first plurality of user interface objects; and
the application has a range of magnification levels, including a predefined magnification level for requesting a second user interface with a multi-finger pinch gesture;
detecting a first multi-finger pinch gesture on the touch-sensitive surface; and,
in response to detecting the first multi-finger pinch gesture:
when the first magnification level is the predefined magnification level, maintaining the first user interface at the predefined magnification level and displaying the second user interface simultaneously with the first user interface, wherein the second user interface includes a second plurality of user interface objects that are distinct from the first plurality of user interface objects in the first user interface; and
when the first magnification level is greater than the predefined magnification level, zooming out the first user interface in accordance with the first multi-finger pinch gesture; wherein:
the application has a set of predefined magnification levels; and
zooming out the first user interface in accordance with the first multi-finger pinch gesture comprises:
when a velocity of the first multi-finger pinch gesture is less than a predefined gesture velocity threshold, demagnifying the first user interface to a variable magnification level within the range of magnification levels in accordance with the first multi-finger pinch gesture; and,
when the velocity of the first multi-finger pinch gesture is greater than the predefined gesture velocity threshold, demagnifying the first user interface directly to a respective magnification level in the set of predefined magnification levels in accordance with the first multi-finger pinch gesture.

23. A method, comprising:
at a multifunction device with a display and a touch-sensitive surface:
displaying a first user interface for an application at a first magnification level, wherein:
the first user interface includes a first plurality of user interface objects; and
the application has a range of magnification levels, including a predefined magnification level for requesting a second user interface with a multi-finger pinch gesture;
detecting a first multi-finger pinch gesture on the touch-sensitive surface; and,
in response to detecting the first multi-finger pinch gesture:
when the first magnification level is the predefined magnification level, maintaining the first user interface at the predefined magnification level and displaying the second user interface simultaneously with the first user interface, wherein the second user interface includes a second plurality of user interface objects that are distinct from the first plurality of user interface objects in the first user interface; and when the first magnification level is greater than the predefined magnification level, zooming out the first user interface in accordance with the first multi-finger pinch gesture;

wherein the first user interface is in an electronic document authoring application and the second user interface is a document properties pane for the electronic document authoring application that displays a list or array of document property information associated with the first user interface including at least one of text size, margins, page number, hue, saturation, brightness, and zoom level.

24. A non-transitory computer readable storage medium having stored therein instructions, which when executed by a multifunction device with a display and a touch-sensitive surface, cause the device to:

display a first user interface for an application at a first magnification level, wherein:
   the first user interface includes a first plurality of user interface objects; and
   the application has a range of magnification levels, including a predefined magnification level for requesting a second user interface with a multi-finger pinch gesture;

detect a first multi-finger pinch gesture on the touch-sensitive surface; and, in response to detecting the first multi-finger pinch gesture:
   when the first magnification level is the predefined magnification level, maintain the first user interface at the predefined magnification level and display the second user interface simultaneously with the first user interface, wherein the second user interface includes a second plurality of user interface objects that are distinct from the first plurality of user interface objects in the first user interface; and
   when the first magnification level is greater than the predefined magnification level, zoom out the first user interface in accordance with the first multi-finger pinch gesture; wherein:

the application has a set of predefined magnification levels; and zooming out the first user interface in accordance with the first multi-finger pinch gesture comprises:
   when a velocity of the first multi-finger pinch gesture is less than a predefined gesture velocity threshold, demagnifying the first user interface to a variable magnification level within the range of magnification levels in accordance with the first multi-finger pinch gesture; and,
   when the velocity of the first multi-finger pinch gesture is greater than the predefined gesture velocity threshold, demagnifying the first user interface directly to a respective magnification level in the set of predefined magnification levels in accordance with the first multi-finger pinch gesture.

25. A non-transitory computer readable storage medium having stored therein instructions, which when executed by a multifunction device with a display and a touch-sensitive surface, cause the device to:

display a first user interface for an application at a first magnification level, wherein:
   the first user interface includes a first plurality of user interface objects; and
   the application has a range of magnification levels, including a predefined magnification level for requesting a second user interface with a multi-finger pinch gesture;

detect a first multi-finger pinch gesture on the touch-sensitive surface; and, in response to detecting the first multi-finger pinch gesture:
   when the first magnification level is the predefined magnification level, maintain the first user interface at the predefined magnification level and display the second user interface simultaneously with the first user interface, wherein the second user interface includes a second plurality of user interface objects that are distinct from the first plurality of user interface objects in the first user interface; and
   when the first magnification level is greater than the predefined magnification level, zoom out the first user interface in accordance with the first multi-finger pinch gesture;

wherein the first user interface is in an electronic document authoring application and the second user interface is a document properties pane for the electronic document authoring application that displays a list or array of document property information associated with the first user interface including at least one of text size, margins, page number, hue, saturation, brightness, and zoom level.

* * * * *

UNITED STATES PATENT AND TRADEMARK OFFICE
CERTIFICATE OF CORRECTION

PATENT NO.        : 8,766,928 B2
APPLICATION NO.   : 12/768623
DATED             : July 1, 2014
INVENTOR(S)       : Christopher D. Weeldreyer et al.

Page 1 of 2

It is certified that error appears in the above-identified patent and that said Letters Patent is hereby corrected as shown below:

Title Page, item (56)

On the page 4, in column 1, under "Other Publications", line 37, delete "Couturier et ai.," and insert -- Couturier et al., --, therefor.

On the page 4, in column 1, under "Other Publications", line 49, delete "Computerworig," and insert -- Computerworld, --, therefor.

On the page 4, in column 1, under "Other Publications", line 50, delete "_Ico..." and insert -- _Ioo... --, therefor.

On the page 4, in column 1, under "Other Publications", line 56, delete "Touchstrearn" and insert -- TouchStream --, therefor.

On the page 4, in column 2, under "Other Publications", line 44, delete ""Imagng" and insert -- "Imagining --, therefor.

On the page 4, in column 2, under "Other Publications", line 49, delete "Caiifornia," and insert -- California, --, therefor.

On the page 5, in column 2, under "Other Publications", line 30, delete "YouTude" and insert -- YouTube --, therefor.

On the page 6, in column 1, under "Other Publications", line 20, delete "(Nictor)." and insert -- (Victor). --, therefor.

Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,766,928 B2

On the page 6, in column 2, under "Other Publications", line 13, delete "Aciton" and insert -- Action --, therefor.